United States Patent
Jeon et al.

(10) Patent No.: US 10,298,557 B2
(45) Date of Patent: May 21, 2019

(54) METHOD OF SHARING KEY BETWEEN DEVICES USING PHYSICAL ACCESS RESTRICTION

(71) Applicants: SAMSUNG ELECTRONICS CO., LTD., Suwon-si (KR); Research & Business Foundation SUNGKYUNKWAN UNIVERSITY, Suwon-si (KR)

(72) Inventors: Sang Hoon Jeon, Hwaseong-si (KR); Hyoung Shick Kim, Suwon-si (KR); Min Soo Kim, Seoul (KR); Kyung Won Park, Suwon-si (KR); Jun Sung Cho, Suwon-si (KR); Jae Gwan Yu, Gunpo-si (KR)

(73) Assignees: SAMSUNG ELECTRONICS CO., LTD., Suwon-si (KR); RESEARCH & BUSINESS FOUNDATION SUNGKYUNKWAN UNIVERSITY, Suwon-si (KR)

(*) Notice: Subject to any disclaimer, the term of this patent is extended or adjusted under 35 U.S.C. 154(b) by 332 days.

(21) Appl. No.: 15/146,962

(22) Filed: May 5, 2016

(65) Prior Publication Data
US 2016/0330182 A1 Nov. 10, 2016

(30) Foreign Application Priority Data
May 9, 2015 (KR) .................. 10-2015-0064976

(51) Int. Cl.
*H04L 9/32* (2006.01)
*H04L 29/06* (2006.01)
(Continued)

(52) U.S. Cl.
CPC .......... *H04L 63/062* (2013.01); *A43B 3/0005* (2013.01); *H04L 9/0822* (2013.01);
(Continued)

(58) Field of Classification Search
CPC ........ H04W 4/70; H04W 12/04; H04L 67/12; H04L 9/0838; H04L 9/0841; H04L 9/0844; H04L 9/0861; H04L 63/061
See application file for complete search history.

(56) References Cited

U.S. PATENT DOCUMENTS 8,260,261 B2  9/2012  Teague
8,364,963 B2  1/2013  Lind et al.
(Continued)

FOREIGN PATENT DOCUMENTS

JP  2013-097599 A  5/2013
KR  10-2013-0142871 A  3/2001
(Continued)

*Primary Examiner* — Trong H Nguyen
(74) *Attorney, Agent, or Firm* — Sughrue Mion, PLLC

(57) ABSTRACT

A method of operating a hub used in an internet of things (IoT) network system which includes a first controller and an IoT device is provided. The method includes: performing secure pairing with the first controller using a first communication, receiving first information related to the IoT device from the first controller paired with the hub, authenticating the first controller using the first information, and performing secure pairing with the IoT device using a second communication.

9 Claims, 25 Drawing Sheets

(51) Int. Cl.
*H04W 12/06* (2009.01)
*H04L 9/08* (2006.01)
*H04W 12/04* (2009.01)
*H04W 4/80* (2018.01)
*A43B 3/00* (2006.01)
*H04W 4/70* (2018.01)

(52) U.S. Cl.
CPC ............ *H04L 9/3242* (2013.01); *H04L 63/08* (2013.01); *H04W 4/80* (2018.02); *H04W 12/04* (2013.01); *H04W 12/06* (2013.01); *H04L 2209/805* (2013.01); *H04L 2463/062* (2013.01); *H04W 4/70* (2018.02)

(56) References Cited

U.S. PATENT DOCUMENTS

| | | |
|---|---|---|
| 2004/0172159 A1 | 9/2004 | Noda et al. |
| 2007/0052548 A1 | 3/2007 | Hankin et al. |
| 2011/0210820 A1* | 9/2011 | Talty ................... G06K 7/10237 340/5.8 |
| 2011/0314287 A1* | 12/2011 | Escott ................... H04L 63/061 713/171 |
| 2012/0254987 A1 | 10/2012 | Ge et al. |
| 2015/0095648 A1* | 4/2015 | Nix ......................... H04W 4/70 713/170 |
| 2016/0044032 A1* | 2/2016 | Kim ................... H04L 63/0876 726/5 |

FOREIGN PATENT DOCUMENTS

| | | |
|---|---|---|
| KR | 10-2011-0050932 A | 5/2011 |
| KR | 10-1233254 B1 | 2/2013 |
| KR | 10-2014-0045829 A | 4/2014 |
| KR | 10-1391729 B1 | 5/2014 |
| KR | 10-1486155 B1 | 1/2015 |
| KR | 10-2015-0018490 A | 2/2015 |

* cited by examiner

METHOD OF SHARING KEY BETWEEN DEVICES USING PHYSICAL ACCESS RESTRICTION

CROSS-REFERENCE TO RELATED APPLICATION

This application claims priority from Korean Patent Application No. 10-2015-0064976 filed on May 9, 2015, the disclosure of which is incorporated herein in its entirety by reference.

BACKGROUND

Apparatuses and methods consistent with exemplary embodiments relate to a method of sharing a key between devices, and more particularly, to a method of sharing a key between devices using physical access restriction.

The internet of things (IoT) refers to a network of things embedded with electronics, software, sensors, and network connectivity which enable these things to collect and exchange data. Here, the things may be embedded systems such as home appliances, mobile equipment, and wearable computers. In the IoT, a thing needs to have an accessible address to identify itself when it is connected through a wired or wireless communication interface and needs to have a sensor embedded therein to obtain data from external environments.

Since everything can be an object of hacking, the IoT will develop together with security for the IoT. When at least one of IoT devices is used by a malicious user in an IoT network system, the IoT network system may be badly damaged.

SUMMARY

According to an aspect of an exemplary embodiment, there is provided a method of operating a hub used in an internet of things (IoT) network system which includes a first controller and an IoT device. The method may include performing secure pairing with the first controller using a first communication, receiving first information related to the IoT device from the first controller paired with the hub, authenticating the first controller using the first information, and performing secure pairing with the IoT device using a second communication.

The first communication may comprise at least one type of communication among near field communication (NFC) and Wi-Fi communication. The second communication may comprise one of a wireless local area network (WLAN), a wireless personal area network (WPAN), a wireless universal serial bus (USB), ZigBee, NFC, radio-frequency identification (RFID), and a mobile cellular network.

The performing the secure pairing with the first controller may include transmitting a first secret value of the hub to the first controller; receiving second information from the first controller; generating and transmitting third information to the first controller; generating a first encryption key using the first secret value, the second information, and the third information; and encrypting a domain key using the first encryption key and transmitting an encrypted domain key to the first controller.

The method may further include receiving encrypted device information from the first controller and decrypting the encrypted device information using the first encryption key.

The hub may include an NFC tag configured to store the first secret value.

In response to determining that the first information has been encrypted using the domain key decrypted by the first controller, the authenticating the first controller may include decrypting the first information using the domain key to generate decrypted information.

The performing the secure pairing with the IoT device may include receiving fourth information from the IoT device; generating and transmitting fifth information to the IoT device; generating a second encryption key using the decrypted information, the fourth information, and the fifth information; and encrypting the domain key using the second encryption key and transmitting an encrypted domain key to the IoT device.

The method may further include receiving encrypted IoT device information from the IoT device and decrypting the encrypted IoT device information using the second encryption key.

The method may further include receiving an encrypted first secret value generated using a domain key decrypted by the first controller and changing the first secret value into the encrypted first secret value.

The method may further include transmitting the encrypted first secret value to a second controller, transmitting a second decryption request to the first controller in response to a first decryption request output from the second controller, decrypting the encrypted first secret value using the domain key in response to an approval signal output from the first controller, and transmitting a decrypted first secret value to the second controller.

The encrypted first secret value may be transmitted to the second controller using the first communication.

According to another aspect of an exemplary embodiment, there is provided a method of operating a controller used in an IoT network system which includes a hub and an IoT device. The method may include performing secure pairing with the hub, decrypting an encrypted domain key transmitted from the hub to generate a decrypted domain key during the secure pairing, receiving IoT information regarding the IoT device from the IoT device, and encrypting the IoT information using the decrypted domain key and transmitting encrypted IoT information to the hub.

The performing the secure pairing with the hub and the receiving the IoT information from the IoT device may be carried out a communication comprising at least one type of communication among near field communication (NFC) and Wi-Fi communication.

The performing the secure pairing with the hub may include receiving a secret value from the hub; generating a key using the secret value; generating and transmitting first information to the hub; receiving second information from the hub; generating an encryption key using the secret value, the first information, and the second information; and decrypting the encrypted domain key transmitted from the hub using the encryption key to generate the decrypted domain key.

The method may further include encrypting device information regarding the controller using the decrypted domain key and transmitting encrypted device information to the hub.

The method may further include encrypting the secret value using the decrypted domain key and transmitting an encrypted secret value to the hub.

The method may further include receiving a second decryption request generated by the hub in response to a first decryption request output from a second controller and transmitting an approval signal for instructing to decrypt the encrypted secret value to the hub in response to the second decryption request.

According to another aspect of an exemplary embodiment, there is provided a method of operating an IoT device used in an IoT network system which includes a hub and a controller. The method may include transmitting a secret value of the IoT device to the controller secure-paired with the hub; generating a key using the secret value; generating and transmitting first information to the hub; receiving second information from the hub; generating an encryption key using the secret value, the first information, and the second information; and receiving an encrypted domain key from the hub and decrypting the encrypted domain key using the encryption key.

The IoT device may include an NFC tag configured to store the secret value.

The transmitting the secret value of the IoT device may include transmitting access information indicating a communication method between the hub and the IoT device to the controller together with the secret value.

According to another aspect of an exemplary embodiment, there is provided a method of operating a second controller used in an IoT network system which includes a hub, an IoT device, and a first controller. The method may include receiving an encrypted first secret value from the hub; transmitting a first decryption request and device information regarding the second controller to the hub; and receiving a decrypted first secret value from the hub. The transmitting may include transmitting, by the hub, a second decryption request to the first controller in response to the first decryption request, and decrypting, by the hub, the encrypted first secret value using domain key in response to an approval signal output from the first controller.

The transmitting the device information regarding the second controller comprises transmitting access information indicating a communication method between the hub and the second controller.

BRIEF DESCRIPTION OF THE DRAWINGS

The above and other f aspects will become more apparent from the following description of the exemplary embodiments with reference to the accompanying drawings, in which.

DETAILED DESCRIPTION OF THE EXEMPLARY EMBODIMENTS

Figure 1:
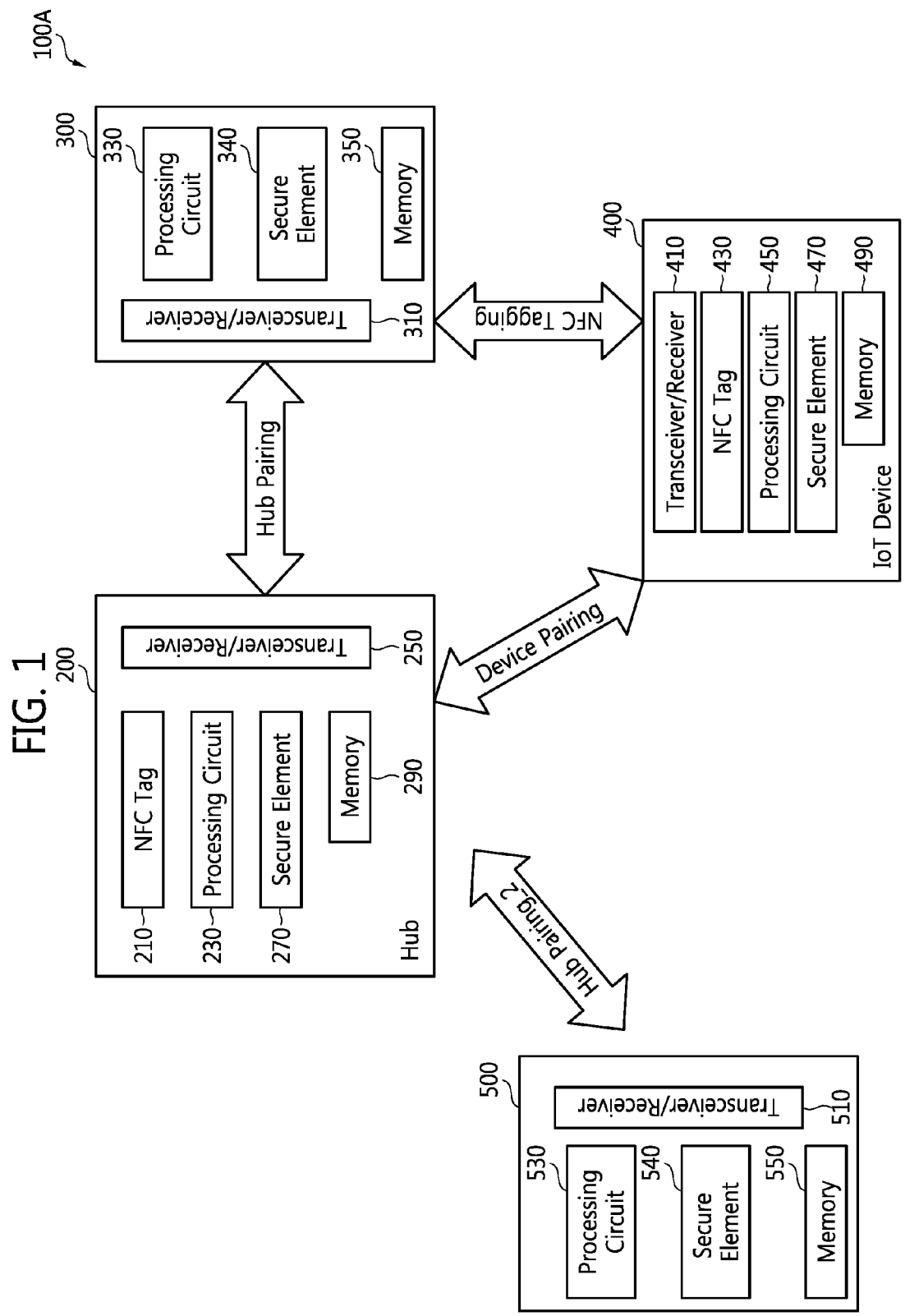
FIG. 1 is a block diagram of an internet of things (IoT) network system according to an exemplary embodiment.

The inventive concept will be described hereinafter with reference to the accompanying drawings, in which exemplary embodiments thereof are shown. This inventive concept may, however, be embodied in many different forms and should not be construed as limited to the embodiments set forth herein. Rather, the exemplary embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular exemplary embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of an internet of things (IoT) network system 100A according to an exemplary embodiment. Referring to FIG. 1, the IoT network system 100A may include a hub 200, a first controller 300, and an IoT device 400. The IoT network system 100A may further include a second controller 500.

After the hub 200 and the first controller 300 complete first secure pairing (i.e., hub pairing), the hub 200 and the IoT device 400 may perform second secure pairing (i.e., device pairing) according to the control (or through the relay) of the first controller 300. Further, after the hub 200 and the second controller 500 complete first secure pairing (i.e., hub pairing), the hub 200 and the IoT device 400 may perform second secure pairing (i.e., device pairing) according to the control (or through the relay) of the second controller 500.

For example, the hub 200 and the first controller 300 may perform first secure pairing (i.e., hub pairing) using at least one of near field communication (NFC) and wireless fidelity (Wi-Fi), but the first secure pairing is not restricted thereto. The hub 200 and the IoT device 400 may perform second secure pairing (i.e., device pairing) using a wireless local area network (WLAN) such as Wi-Fi, a wireless personal area network (WPAN) such as Bluetooth, a wireless universal serial bus (USB), ZigBee, NFC, radio-frequency identification (RFID), or a mobile cellular network, but the inventive concept is not restricted thereto. The mobile cellular network may include third generation (3G) mobile cellular network, a fourth generation (4G) mobile cellular network, a long term evolution (LTE™) mobile cellular network, or LTE-advanced (LTE-A) mobile cellular network, but the inventive concept is not restricted thereto.

Although the elements 200, 300, 400, and 500 are named differently in the description of the exemplary embodiment illustrated in FIG. 1, the elements 200, 300, 400, and 500 may be IoT devices.

An IoT device, which will be described hereinafter, may include an accessible interface (e.g., a wired interface and/or a wireless interface). The IoT device may refer to a device which can communicate data with at least one electronic device (or another IoT device) using the accessible interface. The accessible interface may include a modem communication interface which can be connected to a local area network (LAN), a WLAN such as Wi-Fi, a WPAN such as Bluetooth, a wireless USB, ZigBee, NFC, RFID, power line communication (PLC), or a mobile cellular network. Interface supporting Bluetooth may support Bluetooth low energy (BLE).

The hub 200 may include an NFC tag 210, a processing circuit 230, a communicator 250, a secure element 270, and a memory 290. The NFC tag 210 may store a first secret value S0 for physical access restriction. The processing circuit 230 may control the hub pairing between the hub 200 and the first controller 300, may control the device pairing between the hub 200 and the IoT device 400, and may control the hub pairing between the hub 200 and the second controller 500. The processing circuit 230 may send a second decryption request REQ generated in response to a first decryption request DREQ output from the second controller 500 to the first controller 300, which will be described with reference to FIG. 7; and may decrypt an encrypted first secret value E_DK(S0) in response to an approval signal COF received from the first controller 300 and a domain key DK.

For example, the processing circuit 230 may control secure hub pairing with the first controller 300, may receive information related to the IoT device 400 from the first controller 300 paired with the hub 200, may authenticate the first controller 300 using the received information, and may control secure device pairing with the IoT device 400. The structure and operations of the processing circuit 230 will be described in detail with reference to FIGS. 2 through 7.

The communicator 250 may include a transceiver or a receiver. The transceiver may be a radio transceiver and the receiver may be a radio receiver. Although communicators 250, 310, 410, and 510 are described as radio transceivers in the exemplary embodiments, the inventive concept is not restricted thereto. The communicators 250, 310, 410, and 510 may communicate a command and/or data with one another through the accessible interface described above.

The secure element 270 may generate a session value, e.g., the first secret value S0, in order to increase security of hub or device pairing, may encrypt secure data to be transmitted to the object device 300, 400, or 500, and may decrypt secure data received from the object device 300, 400, or 500. An encryption/decryption engine 239 illustrated in FIG. 3 or 5 may be included in the secure element 270.

The memory 290 may store data necessary for the operation of the hub 200. For example, the memory 290 may store data which will be processed or has been processed by the processing circuit 230. The memory 290 may also store data which will be processed or has been processed by the secure element 270.

Although the secure element 270 and the memory 290 are separated from each other in the exemplary embodiment illustrated in FIG. 1, the secure element 270 may include the memory 290, the memory 290 may include the secure element 270, or at least part of the secure element 270 and at least part of the memory 290 may overlap or share each other. The memory 290 may be a volatile memory and/or a non-volatile memory. Although only one memory 290 is illustrated in FIG. 1, the memory 290 may refer to a group of homogeneous or heterogeneous memories. The volatile memory may be random access memory (RAM), dynamic RAM (DRAM), static RAM (SRAM), thyristor RAM (T-RAM), zero capacitor RAM (Z-RAM), or twin transistor RAM (TTRAM). The non-volatile memory may be electrically erasable programmable read-only memory (EEPROM), flash memory, magnetic RAM (MRAM), spin-transfer torque MRAM, ferroelectric RAM (FeRAM), phase-change RAM (PRAM), or resistive RAM (RRAM), but the inventive concept is not restricted thereto. The memory 290 may be embedded in the hub 200 or may be formed removable from the hub 200.

The first controller 300 may include a communicator 310, a processing circuit 330, a secure element 340, and a memory 350. The processing circuit 330 may control hub pairing between the hub 200 and the first controller 300, may encrypt information received from an NFC tag 430 of the IoT device 400, may transmit the encrypted information to the hub 200, and may transmit the approval signal COF to the hub 200 in response to the second decryption request REQ from the hub 200. The processing circuit 330 may generally control the first controller 300.

The secure element 340 may encrypt secure data to be transmitted to the object device 200, 400, or 500 and may decrypt secure data received from the object device 200, 400, or 500. An encryption/decryption engine 339 illustrated in FIG. 3 may be included in the secure element 340. For example, the secure element 340 may be implemented as a subscriber identity module (SIM) card or a universal SIM (USIM) card, but the inventive concept is not restricted thereto.

The memory 350 may store data necessary for the operation of the first controller 300. For example, the memory 350 may store data which will be processed or has been processed by the processing circuit 330. The memory 350 may also store data which will be processed or has been processed by the secure element 340.

Although the secure element 340 and the memory 350 are separated from each other in the exemplary embodiment illustrated in FIG. 1, the secure element 340 may include the memory 350, the memory 350 may include the secure element 340, or at least part of the secure element 340 and at least part of the memory 350 may overlap or share each other. The memory 350 may be formed of volatile memory and/or non-volatile memory. Although only one memory 350 is illustrated in FIG. 1, the memory 350 may refer to a group of homogeneous or heterogeneous memories.

The IoT device 400 may include a communicator 410, an NFC tag 430, a processing circuit 450, a secure element 470, and a memory 490. The NFC tag 430 may store a second secret value S1 for physical access restriction and connection information DEV.

The processing circuit 450 may control a device pairing between the hub 200 and the IoT device 400. The structure and operations of the processing circuit 450 will be described in detail with reference to FIGS. 4 and 5. The processing circuit 450 may generally control the operation of the IoT device 400.

The secure element 470 may encrypt secure data to be transmitted to the object device 200, 300, or 500 and may decrypt secure data received from the object device 200, 300, or 500. An encryption/decryption engine 459 illustrated in FIG. 5 may be included in the secure element 470.

The memory 490 may store data necessary for the operation of the IoT device 400. For example, the memory 490 may store data which will be processed or has been processed by the processing circuit 450. The memory 490 may also store data which will be processed or has been processed by the secure element 470.

Although the secure element 470 and the memory 490 are separated from each other in the exemplary embodiment illustrated in FIG. 1, the secure element 470 may include the memory 490, the memory 490 may include the secure element 470, or at least part of the secure element 470 and at least part of the memory 490 may overlap or share each other. The memory 490 may be formed of volatile memory and/or non-volatile memory. Although only one memory 490 is illustrated in FIG. 1, the memory 490 may refer to a group of homogeneous or heterogeneous memories. Here, heterogeneous memories have different data storing methods and/or different memory characteristics (e.g., bandwidths or latency).

The second controller 500 may include a communicator 510, a processing circuit 530, a secure element 540, and a memory 550. The processing circuit 530 may control hub pairing between the hub 200 and the second controller 500 and may transmit the first decryption request DREQ to the hub 200. The processing circuit 530 of the second controller 500 paired with the hub 200 may encrypt information received from an NFC tag of an IoT device requesting pairing and may transmit the encrypted information to the hub 200.

The secure element 540 may encrypt secure data to be transmitted to the object device 200, 300, or 400 and may decrypt secure data received from the object device 200, 300, or 400. An encryption/decryption engine substantially the same as the encryption/decryption engine 339 illustrated in FIG. 3 may be included in the secure element 540. For example, the secure element 540 may be implemented as a SIM card or a USIM card, but the inventive concept is not restricted thereto.

The memory 550 may store data necessary for the operation of the second controller 500. The memory 550 may store data which will be processed or has been processed by the processing circuit 530. The memory 550 may also store data which will be processed or has been processed by the secure element 540.

Although the secure element 540 and the memory 550 are separated from each other in the exemplary embodiment illustrated in FIG. 1, the secure element 540 may include the memory 550, the memory 550 may include the secure element 540, or at least part of the secure element 540 and at least part of the memory 550 may overlap or share each other. The memory 550 may be formed of volatile memory and/or non-volatile memory. Although only one memory 550 is illustrated in FIG. 1, the memory 550 may refer to a group of homogeneous or heterogeneous memories.

Figure 2:
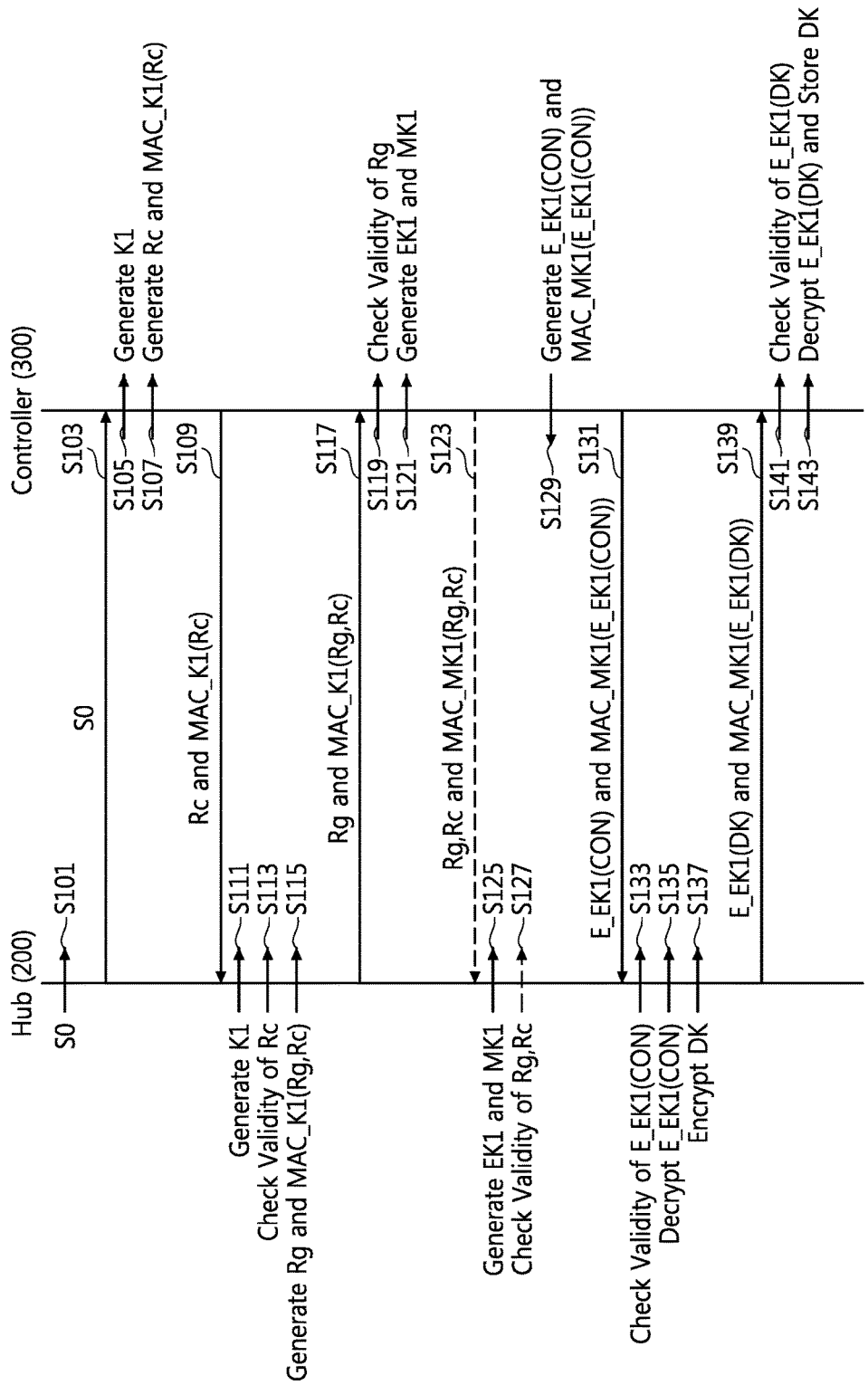
FIG. 2 is a diagram of a data flow for explaining first secure pairing performed between a hub and a first controller illustrated in FIG. 1.
Figure 3:
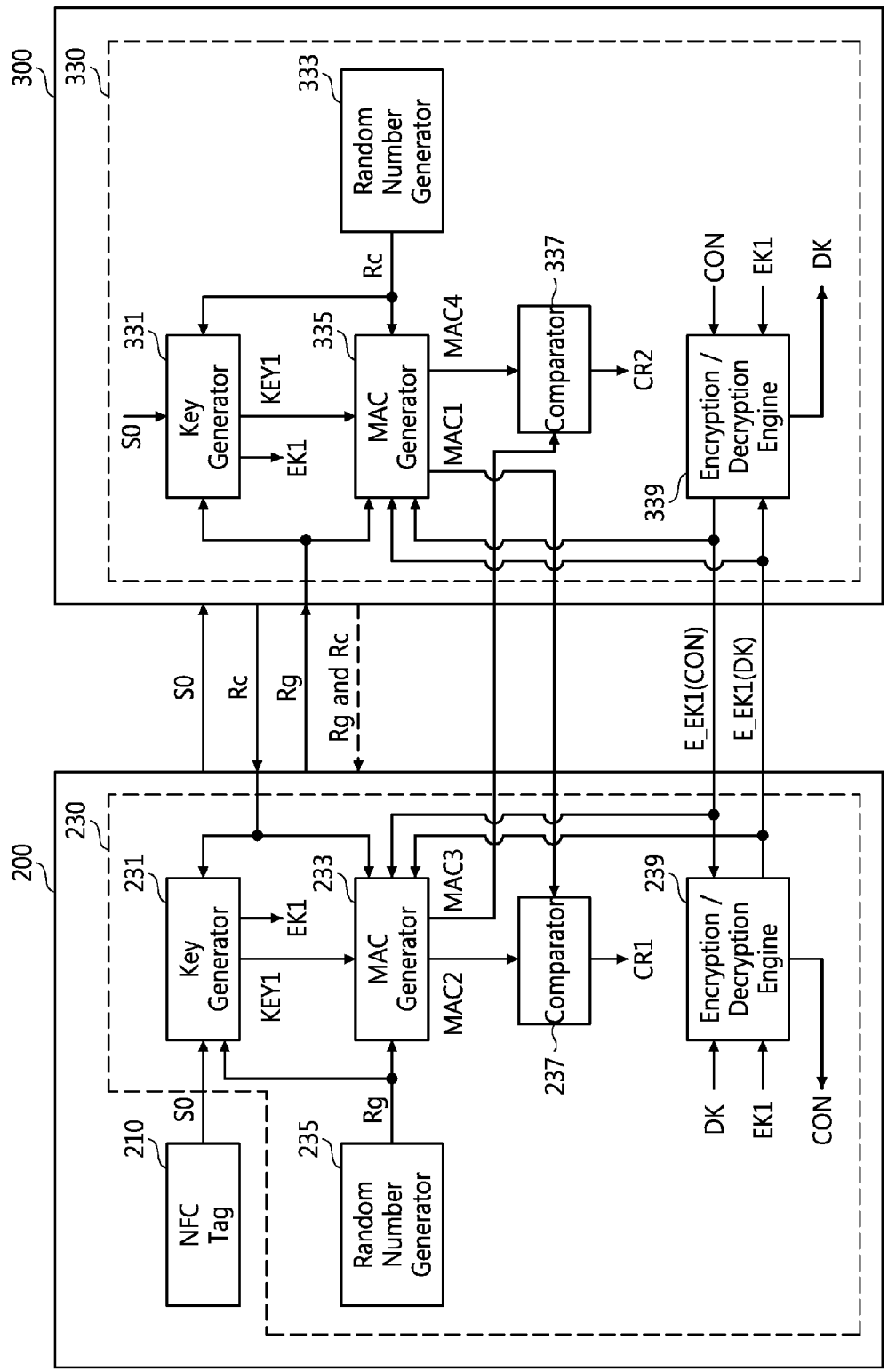
FIG. 3 is a schematic block diagram of the hub and the first controller illustrated in FIG. 1.

FIG. 2 is a diagram of a data flow for explaining the first secure pairing performed between the hub 200 and the first controller 300 illustrated in FIG. 1. FIG. 3 is a schematic block diagram of the hub 200 and the first controller 300 illustrated in FIG. 1.

The processing circuit 230 of the hub 200 and the processing circuit 330 of the first controller 300 may include hardware components and at least one software component executed by at least one of the hardware components. The processing circuit 230 of the hub 200 may include a key generator 231, a message authentication code (MAC) generator 233, a random number generator 235, a first comparator 237, and an encryption/decryption engine 239.

The key generator 231 may generate a first key KEY1 (=K1) using the first secret value S0. The key generator 231 may also generate an encryption key EK1 and a MAC key KEY1 (=MK1) using input values. In other exemplary embodiments, a key generator generating the first key KEY1 (=K1) may be different from a key generator generating the MAC key KEY1 (=MK1).

The MAC generator 233 may generate a MAC MAC2 or MAC3 with respect to an input value using the first key KEY1 (=K1 or MK1). The random number generator 235 may generate a second random number Rg. The random number generator 235 may be included in the secure element 270 in other exemplary embodiments.

The first comparator 237 may compare the MAC MAC2 generated by the processing circuit 230 with a MAC MAC1 output from the first controller 300, and may generate a first comparison signal CR1. The encryption/decryption engine 239 may encrypt or decrypt data in response to the first comparison signal CR1.

The encryption/decryption engine 239 may decrypt information (or data) that has been encrypted by the first controller 300 using a decryption key, may encrypt information to be transmitted to the first controller 300 using an encryption key, and transmit encrypted information to the first controller 300. In addition, the encryption/decryption engine 239 may decrypt information, which has been encrypted by a controller or an IoT device which can communicate with the encryption/decryption engine 239, using a decryption key, and may encrypt information to be transmitted to the controller or the IoT device using an encryption key and transmit encrypted information to the controller or the IoT device.

The processing circuit 330 of the first controller 300 may include a key generator 331, a random number generator 333, a MAC generator 335, a second comparator 337, and the encryption/decryption engine 339. The key generator 331 may generate the first key KEY1 (=K1) using the first secret value S0. The key generator 331 may also generate the encryption key EK1 and the MAC key KEY1 (=MK1) using input values. In other exemplary embodiments, a key generator generating the first key KEY1 (=K1) may be different from a key generator generating the MAC key KEY1 (=MK1).

The random number generator 333 may generate a first random number Rc. The random number generator 333 may be included in the secure element 340 in other exemplary embodiments. The MAC generator 335 may generate a MAC MAC1 or MAC4 with respect to an input value using the first key KEY1 (=K1 or MK1).

The second comparator 337 may compare the MAC MAC4 generated by the processing circuit 330 with the MAC MAC3 output from the hub 200 and may generate a second comparison signal CR2. For example, the encryption/decryption engine 339 may encrypt or decrypt data in response to the second comparison signal CR2.

The encryption/decryption engine 339 may decrypt information that has been encrypted by the hub 200 using a decryption key, may encrypt information to be transmitted to the hub 200 using an encryption key, and transmit encrypted information to the hub 200. In addition, the encryption/decryption engine 339 may decrypt information, which has been encrypted by a controller or an IoT device which can communicate with the encryption/decryption engine 339, using a decryption key, and may encrypt information to be transmitted to the controller or the IoT device using an encryption key and transmit encrypted information to the controller or the IoT device. The encryption key may be the same as the decryption key.

Referring to FIGS. 1 through 3, each device 200, 300, 400, or 500 may communicate data through an accessible interface.

The first secret value S0 may be stored in the NFC tag 210 of the hub 200 in operation S101. The first secret value S0 may be securely generated by the secure element 270 and written to the NFC tag 210 according to the control of the processing circuit 230. Alternatively, the first secret value S0 may be generated by an NFC writer (not shown) and stored in the NFC tag 210 in operation S101. The NFC tag 210 may be embedded in the hub 200 or may be attached to the hub 200 in a form of a sticker.

When the first controller 300 tags or scans the NFC tag 210 of the hub 200, the radio transceiver 250 may transmit the first secret value S0 stored in the NFC tag 210 to the radio transceiver 310 of the first controller 300 according to the control of the processing circuit 230 in operation S103. Operation S103 may be performed through NFC for physical access restriction. A communication method used in operation S103 may be the same as or different from the one used in at least one operation among operations S109, S117, S123, S131, and S139.

The first controller 300 may be implemented as a smart phone or a tablet PC, but the inventive concept is not restricted thereto. The first controller 300 may include an NFC reader which may read the first secret value S0 from the NFC tag 210.

The processing circuit 330 of the first controller 300 may generate the first key KEY1 (=K1) using the first secret value S0 in operation S105. In detail, the radio transceiver 310 of the first controller 300 may transmit the first secret value S0 from the radio transceiver 250 of the hub 200 to the key generator 331, and the key generator 331 may generate the first key KEY1 (=K1) using the first secret value S0 in operation S105. Thereafter, the processing circuit 330 of the first controller 300 may generate the first random number Rc and may generate a first MAC MAC_K1(Rc) using the first key KEY1 (=K1) with respect to the first random number Rc in operation S107. The first random number Rc may be information or a message.

For example, when the processing circuit 330 receives the first secret value S0, the random number generator 333 may generate the first random number Rc, and the MAC generator 335 may generate the first MAC MAC1 (=MAC_K1 (Rc)) using the first key KEY1 (=K1) for the first random number Rc in operation S107. For example, the first random number Rc may be an unencrypted plain text and the first MAC MAC1 (=MAC_K1(Rc)) may be data (or information) used to authenticate the first random number Rc.

The radio transceiver 310 of the first controller 300 may transmit the first random number Rc and the first MAC MAC1 (=MAC_K1(Rc)) to the radio transceiver 250 of the hub 200 according to the control of the processing circuit 330 in operation S109.

The processing circuit 230 of the hub 200 may generate the first key KEY1 (=K1) using the first secret value S0 stored in the NFC tag 210 in operation S111. For instance, when the first secret value S0 stored in the NFC tag 210 is the same as the first secret value S0 transmitted to the first controller 300, each of the key generators 231 and 331 may generate the same key KEY1. Although operation S111 is performed after operation S109 in the exemplary embodiment illustrated in FIG. 2, operation S111 may be performed before or simultaneously with operation S109.

The processing circuit 230 of the hub 200 may check the validity of the first random number Rc in operation S113. For instance, the MAC generator 233 may receive the first random number Rc through the radio transceiver 250, may generate the second MAC MAC2 (=MAC_K1(Rc)) using the first key KEY1 (=K1) output from the key generator 231 for the first random number Rc, and may transmit the second MAC MAC2 (=MAC_K1(Rc)) to the first comparator 237.

The first comparator 237 may compare the first MAC MAC1 (=MAC_K1(Rc)) received through the radio transceiver 250 with the second MAC MAC2 (=MAC_K1(Rc)) output from the MAC generator 233, and may generate the first comparison signal CR1. When the first MAC MAC1 (=MAC_K1(Rc)) is the same as the second MAC MAC2 (=MAC_K1(Rc)), the first random number Rc is authenticated and the integrity of the first random number Rc is confirmed in operation S113.

The random number generator 235 may generate the second random number Rg and the MAC generator 233 may generate the third MAC MAC3 (=MAC_K1(Rg, Rc)) using the first key KEY1 (=K1) output from the key generator 231 for the first and second random numbers Rc and Rg in operation S115. The second random number Rg may be information or a message.

The processing circuit 230 of the hub 200 may transmit the second random number Rg and the third MAC MAC3 (=MAC_K1(Rg, Rc)) to the radio transceiver 310 of the first controller 300 through the radio transceiver 250 in operation S117. For example, the second random number Rg may be an unencrypted plain text and the third MAC MAC3 (=MAC_K1(Rg, Rc)) may be data (or information) used to authenticate the second random number Rg.

The processing circuit 330 of the first controller 300 may check the validity of the second random number Rg in operation S119. For instance, the MAC generator 335 may receive the second random number Rg through the radio transceiver 310, may generate the fourth MAC MAC4 (=MAC_K1(Rg, Rc)) using the first key KEY1 (=K1) output from the key generator 331 for the first and second random numbers Rc and Rg, and may transmit the fourth MAC MAC4 (=MAC_K1(Rg, Rc)) to the second comparator 337.

The second comparator 337 may compare the third MAC MAC3 (=MAC_K1(Rg, Rc)) output from the radio transceiver 310 with the fourth MAC MAC4 (=MAC_K1(Rg, Rc)) output from the MAC generator 335, and may output the second comparison signal CR2. For instance, when the third MAC MAC3 (=MAC_K1(Rg, Rc)) is the same as the fourth MAC MAC4 (=MAC_K1(Rg, Rc)), the second random number Rg is authenticated and the integrity of the second random number Rg is confirmed in operation S119.

Although the MAC generator 233 in the processing circuit 230 of the hub 200 generates the third MAC MAC3 (=MAC_K1(Rg, Rc)) using the first key KEY1 (=K1) output from the key generator 231 for the first and second random numbers Rc and Rg in the exemplary embodiment illustrated in FIG. 3, the MAC generator 233 in the processing circuit 230 of the hub 200 may generate the third MAC MAC3 (=MAC_K1(Rg)) for the second random number Rg using the first key KEY1 (=K1) output from the key generator 231 in other exemplary embodiments. For example, the second random number Rg may be an unencrypted plain text and the third MAC MAC3 (=MAC_K1(Rg)) may be data (or information) used to authenticate the second random number Rg.

The processing circuit 230 of the hub 200 may transmit the second random number Rg and the third MAC MAC3 (=MAC_K1(Rg)) to the radio transceiver 310 of the first controller 300 through the radio transceiver 250 in operation S117.

The processing circuit 330 of the first controller 300 may check the validity of the second random number Rg in operation S119. For instance, the MAC generator 335 may receive the second random number Rg through the radio transceiver 310, may generate the fourth MAC MAC4 (=MAC_K1(Rg)) using the first key KEY1 (=K1) output from the key generator 331 for the second random number Rg, and may transmit the fourth MAC MAC4 (=MAC_K1(Rg)) to the second comparator 337.

The second comparator 337 may compare the third MAC MAC3 (=MAC_K1(Rg)) output from the radio transceiver 310 with the fourth MAC MAC4 (=MAC_K1(Rg)) output from the MAC generator 335, and may output the second comparison signal CR2. For instance, when the third MAC MAC3 (=MAC_K1(Rg)) is the same as the fourth MAC MAC4 (=MAC_K1(Rg)), the second random number Rg is authenticated and the integrity of the second random number Rg is confirmed in operation S119.

The processing circuit 330 of the first controller 300 may generate the encryption key EK1 and the MAC key MK1 using the first secret value S0, the first random number Rc, and the second random number Rg in operation S121. In detail, the key generator 331 of the processing circuit 330 may generate the encryption key EK1 and the MAC key MK1 using the first secret value S0, the first random number Rc, and the second random number Rg in operation S121. The encryption key EK1 may be the same as or different from the MAC key MK1.

The processing circuit 330 of the first controller 300 may transmit the first random number Rc, the second random number Rg, and the first MAC MAC1 (=MAC_MK1(Rg, Rc)) to the radio transceiver 250 of the hub 200 through the radio transceiver 310 in operation S123. In detail, the MAC generator 335 of the processing circuit 330 may generate the first MAC MAC1 (=MAC_MK1(Rg, Rc)) for the first and second random numbers Rc and Rg using the MAC key MK1 output from the key generator 331, and may transmit the first MAC MAC1 (=MAC_MK1(Rg, Rc)) to the radio transceiver 250 of the hub 200 through the radio transceiver 310 in operation S123.

The processing circuit 230 of the hub 200 may generate the encryption key EK1 and MAC key MK1 using the first secret value S0, the first random number Rc, and the second random number Rg in operation S125. In detail, the key generator 231 of the processing circuit 230 may generate the encryption key EK1 and the MAC key MK1 using the first secret value S0, the first random number Rc, and the second random number Rg in operation S125. As described above, the encryption key EK1 may be the same as or different from the MAC key MK1.

The processing circuit 230 of the hub 200 may check the validity of the first and second random numbers Rc and Rg in operation S127. In detail, the MAC generator 233 may generate the second MAC MAC2 (=MAC_MK1(Rg, Rc)) for the first and second random numbers Rc and Rg using the MAC key MK1 output from the key generator 231, and may transmit the second MAC MAC2 (=MAC_MK1(Rg, Rc)) to the first comparator 237.

The first comparator 237 may compare the first MAC MAC1 (=MAC_MK1(Rg, Rc)) output from the radio transceiver 250 with the second MAC MAC2 (=MAC_MK1(Rg, Rc)) output from the MAC generator 233, and may output the first comparison signal CR1. For instance, when the first MAC MAC1 (=MAC_MK1(Rg, Rc)) is the same as the second MAC MAC2 (=MAC_MK1(Rg, Rc)), the first and second random numbers Rc and Rg are authenticated and the integrity of the first and second random numbers Rc and Rg is confirmed in operation S127. Although operations S123 and S127 are performed in the exemplary embodiment illustrated in FIG. 2, these operations of S123 and S127 may be omitted in other exemplary embodiments.

The processing circuit 330 of the first controller 300 may encrypt identification data CON for identifying the first controller 300 using the encryption key EK1 output from the key generator 331, and may generate encrypted identification data E_EK1(CON) and the first MAC MAC1 (=MAC_MK1(E_EK1(CON))) for the encrypted identification data E_EK1(CON) in operation S129. The identification data CON may be device information regarding the first controller 300.

In detail, the encryption/decryption engine 339 of the processing circuit 330 may encrypt the identification data CON using the encryption key EK1 to generate the encrypted identification data E_EK1(CON). The MAC generator 335 may generate the first MAC MAC1 (=MAC_MK1(E_EK1(CON))) for the encrypted identification data E_EK1(CON) using the MAC key KEY1 (=MK1) in operation S129. The radio transceiver 310 of the first controller 300 may transmit the encrypted identification data E_EK1(CON) and the first MAC MAC1 (=MAC_MK1 (E_EK1(CON))) to the radio transceiver 250 of the hub 200 in operation S131.

The processing circuit 230 of the hub 200 may check the validity of the encrypted identification data E_EK1(CON) in operation S133. In detail, the MAC generator 233 may generate the second MAC MAC2 (=MAC_MK1(E_EK1 (CON))) for the encrypted identification data E_EK1(CON) using the MAC key KEY1 (=MK1), and may transmit the second MAC MAC2 (=MAC_MK1(E_EK1(CON))) to the first comparator 237.

The first comparator 237 may compare the first MAC MAC1 (=MAC_MK1(E_EK1(CON))) output from the radio transceiver 250 with the second MAC MAC2 (=MAC_MK1(E_EK1(CON))) output from the MAC generator 233, and may output the first comparison signal CR1. For instance, when the first MAC MAC1 (=MAC_MK1 (E_EK1(CON))) is the same as the second MAC MAC2 (=MAC_MK1(E_EK1(CON))), the encrypted identification data E_EK1(CON) is authenticated and the integrity of the encrypted identification data E_EK1(CON) is confirmed in operation S133.

When the first comparison signal CR1 indicates that the first MAC MAC1 (=MAC_MK1(E_EK1(CON))) is the same as the second MAC MAC2 (=MAC_MK1(E_EK1 (CON))), the encryption/decryption engine 239 of the hub 200 may decrypt the encrypted identification data E_EK1 (CON) using the encryption key EK1 generated by the key generator 231 and may store the encrypted identification data E_EK1(CON) and/or the decrypted identification data CON in the secure element 270 or the memory 290 of the hub 200 in operation S135.

The encryption/decryption engine 239 of the hub 200 may encrypt the domain key DK using the encryption key EK1 generated by the key generator 231 to generate encrypted domain key E_EK1(DK) in operation S137. The hub 200 may authenticate the first controller 300 using the domain key DK before performing second secure pairing (e.g., device pairing). Here, a domain may refer to a region which can be communicated through authentication in one network and the domain key DK may be a key used to authenticate the domain. For example, the domain key DK may be a public key or a private key.

The domain key DK may be generated in the hub 200 and may be stored in the secure element 270 or the memory 290 of the hub 200. The domain key DK may be newly generated periodically or non-periodically in the hub 200. For example, the domain key DK may be generated by the secure element 270, but the inventive concept is not restricted thereto.

The MAC generator 233 of the hub 200 may generate the third MAC MAC3 (=MAC_MK1(E_EK1(DK))) for the encrypted domain key E_EK1(DK) using the MAC key KEY1 (=MK1) generated by the key generator 231. The processing circuit 230 of the hub 200 may transmit the encrypted domain key E_EK1(DK) and the third MAC MAC3 (=MAC_MK1(E_EK1(DK))) to the radio transceiver 310 of the first controller 300 through the radio transceiver 250 in operation S139.

The processing circuit 330 of the first controller 300 may check the validity of the encrypted domain key E_EK1(DK) in operation S141. In detail, the MAC generator 335 may generate the fourth MAC MAC4 (=MAC_MK1(E_EK1 (DK))) for the encrypted domain key E_EK1(DK) using the MAC key KEY1 (=MK1), and may transmit the fourth MAC MAC4 (=MAC_MK1(E_EK1(DK))) to the second comparator 337.

The second comparator 337 may compare the third MAC MAC3 (=MAC_MK1(E_EK1(DK))) output from the radio transceiver 310 with the fourth MAC MAC4 (=MAC_MK1 (E_EK1(DK))) output from the MAC generator 335, and may output the second comparison signal CR2.

For instance, when the third MAC MAC3 (=MAC_MK1 (E_EK1(DK))) is the same as the fourth MAC MAC4 (=MAC_MK1(E_EK1(DK))), the encrypted domain key E_EK1(DK) is authenticated and the integrity of the encrypted domain key E_EK1(DK) is confirmed in operation S141.

When the second comparison signal CR2 indicates that the third MAC MAC3 (=MAC_MK1(E_EK1(DK))) is the same as the fourth MAC MAC4 (=MAC_MK1(E_EK1 (DK))), the encryption/decryption engine 339 of the first controller 300 may decrypt the encrypted domain key E_EK1(DK) using the encryption key EK1 generated by the key generator 331 and may store the encrypted domain key E_EK1(DK) and/or the decrypted domain key DK in the secure element 340 or the memory 350 of the first controller 300 in operation S143. The first controller 300 may include a secure logic circuit to securely store the encrypted domain key E_EK1(DK) and/or the decrypted domain key DK in the memory 350.

As described with reference to FIGS. 1 through 3, the first secure pairing (e.g., hub pairing) may be completed through operations S101 through S143. In the first secure pairing (e.g., hub pairing), the first secret value S0 may be transmitted from the hub 200 to the first controller 300 using NFC in operation S101, and data transmission may be performed using NFC and/or Wi-Fi in operations S109, S117, S123, S131, and S139, but the inventive concept is not restricted thereto.

Figure 4:
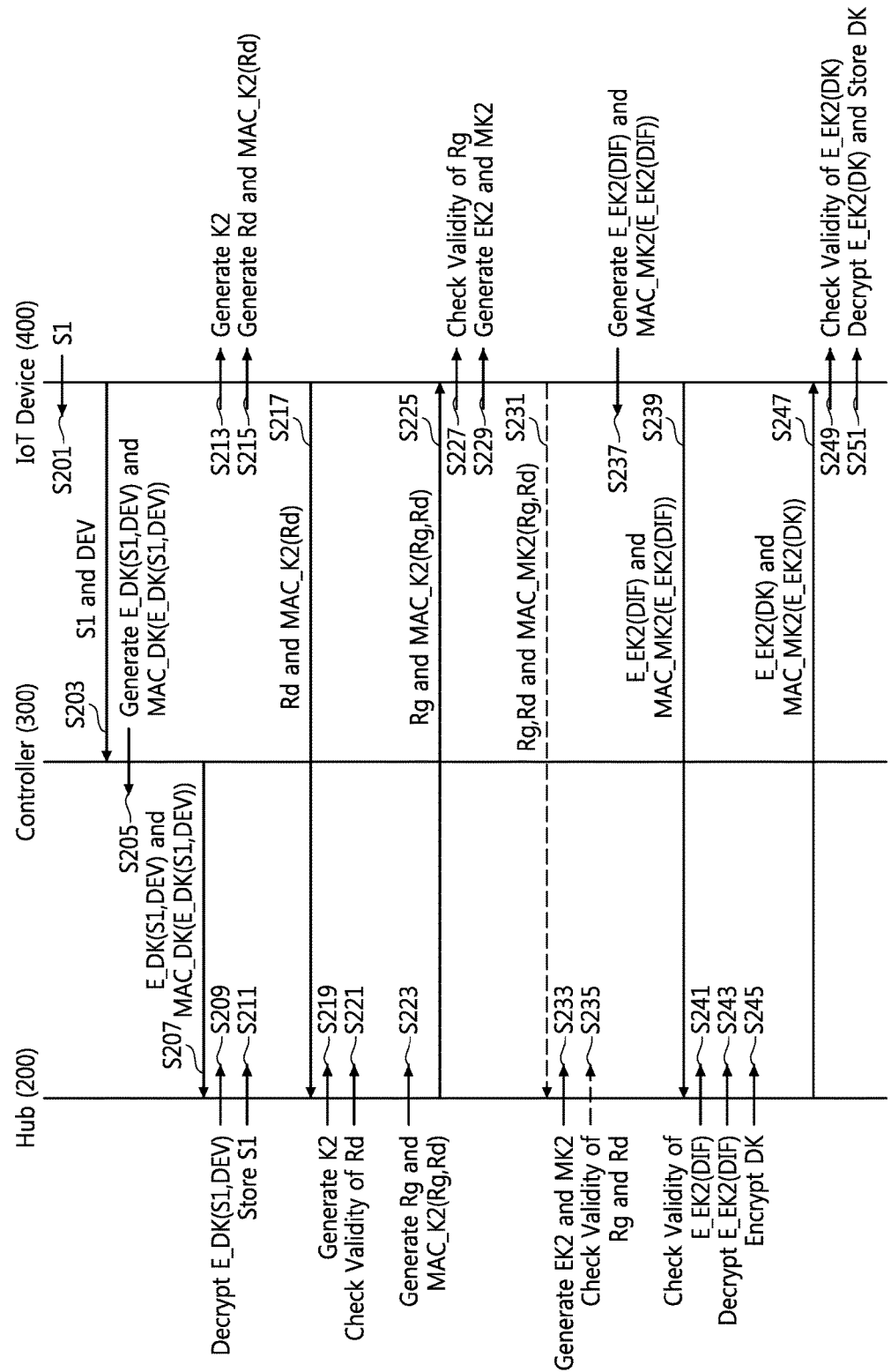
FIG. 4 is a diagram of a data flow for explaining second secure pairing performed between the hub and an IoT device illustrated in FIG. 1.
Figure 5:
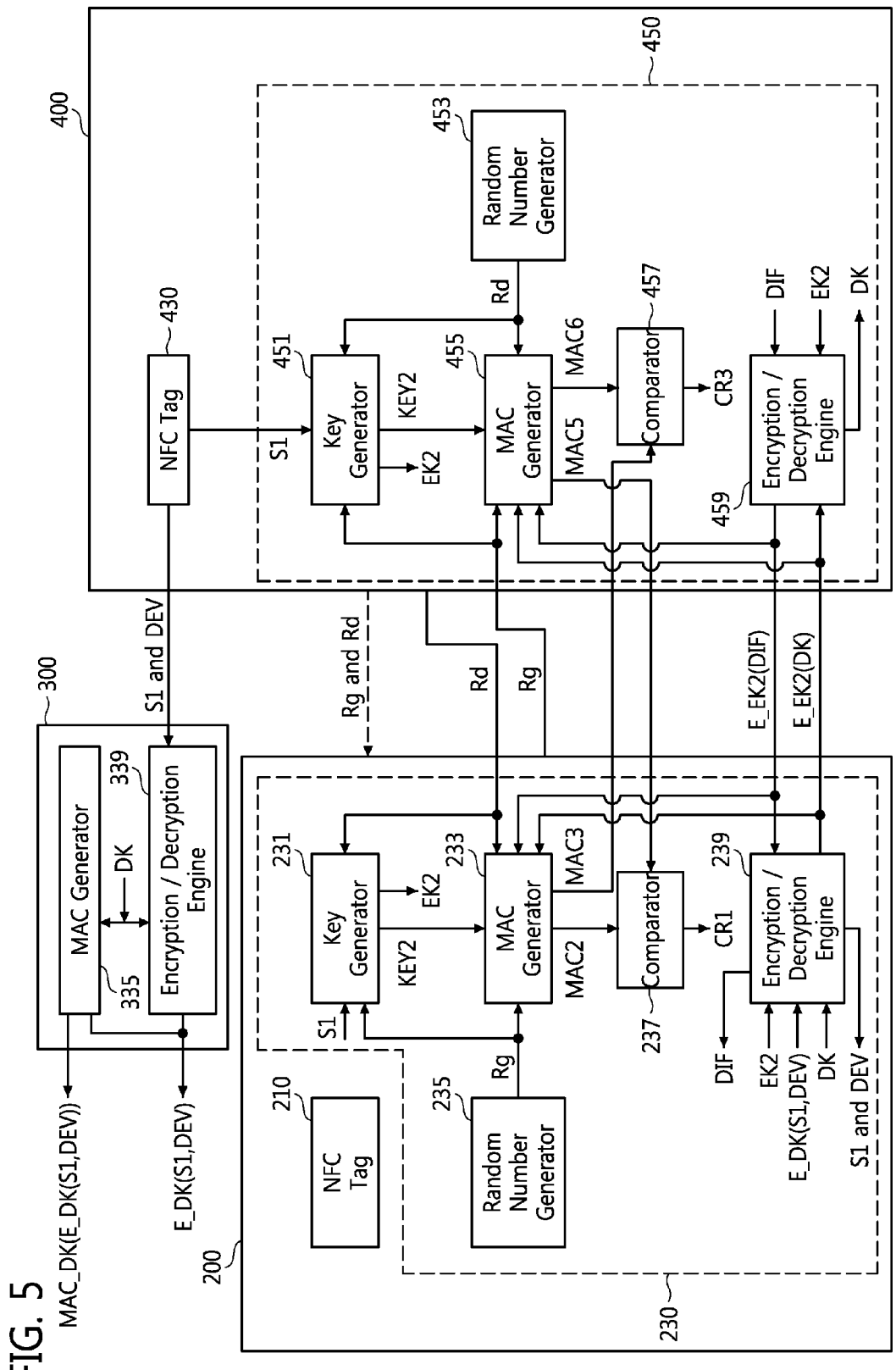
FIG. 5 is a schematic block diagram of the hub, the first controller, and the IoT device illustrated in FIG. 1.

FIG. 4 is a diagram of a data flow for explaining second secure pairing (e.g., device pairing) performed between the hub 200 and the IoT device 400 illustrated in FIG. 1. FIG. 5 is a schematic block diagram of the hub 200, the first controller 300, and the IoT device 400 illustrated in FIG. 1.

Referring to FIGS. 1, 4, and 5, the IoT device 400 may include hardware components and at least one software component executed by at least one of the hardware components. The processing circuit 230 of the hub 200 may include the key generator 231, the MAC generator 233, the random number generator 235, the first comparator 237, and the encryption/decryption engine 239.

The key generator 231 may generate a second key KEY2 (=K2) using the second secret value S1. The key generator 231 may also generate an encryption key EK2 and a MAC key KEY2 (=MK2) using input values. In some exemplary embodiments, a key generator generating the second key KEY2 (=K2) may be different from a key generator generating the MAC key KEY2 (=MK2).

The MAC generator 233 may generate the MAC MAC2 or MAC3 with respect to an input value using the second key KEY2 (=K2 or MK2). The random number generator 235 may generate the second random number Rg. The random number generator 235 may be included in the secure element 270 in other exemplary embodiments.

The first comparator 237 may compare the MAC MAC2 generated by the processing circuit 230 with a MAC MAC5 output from the IoT device 400, and may generate the first comparison signal CR1. For example, the encryption/decryption engine 239 may encrypt or decrypt data in response to the first comparison signal CR1.

The encryption/decryption engine 239 may decrypt information (or data) that has been encrypted by the IoT device 400 using a decryption key and may encrypt information to be transmitted to the IoT device 400 using an encryption key and transmit encrypted information to the IoT device 400. In addition, the encryption/decryption engine 239 may decrypt information, which has been encrypted by a controller or an IoT device which can communicate with the encryption/decryption engine 239, using a decryption key, and may encrypt information to be transmitted to the controller or the IoT device using an encryption key and transmit encrypted information to the controller or the IoT device.

The processing circuit 450 of the IoT device 400 may include a key generator 451, a random number generator 453, a MAC generator 455, a third comparator 457, and an encryption/decryption engine 459. The key generator 451 may generate the second key KEY2 (=K2) using the second secret value S1. The key generator 451 may also generate the encryption key EK2 and the MAC key KEY2 (=MK2) using input values. In some exemplary embodiments, a key generator generating the second key KEY2 (=K2) may be different from a key generator generating the MAC key KEY2 (=MK2).

The random number generator 453 may generate a third random number Rd. The random number generator 453 may be included in the secure element 470 in some exemplary embodiments. The MAC generator 455 may generate a MAC MAC5 or MAC6 with respect to an input value using the second key KEY2 (=K2 or MK2).

The third comparator 457 may compare the MAC MAC6 generated by the processing circuit 450 with the MAC MAC3 output from the hub 200, and may generate a third comparison signal CR3. For example, the encryption/decryption engine 459 may encrypt or decrypt data in response to the third comparison signal CR3.

The encryption/decryption engine 459 may decrypt information that has been encrypted by the hub 200 using a decryption key and may encrypt information to be transmitted to the hub 200 using an encryption key and transmit encrypted information to the hub 200. In addition, the encryption/decryption engine 459 may decrypt information, which has been encrypted by a controller or an IoT device which can communicate with the encryption/decryption engine 459, using a decryption key, and may encrypt information to be transmitted to the controller or the IoT device using an encryption key and transmit encrypted information to the controller or the IoT device. The encryption key may be the same as the decryption key.

The second secret value S1 may be stored in the NFC tag 430 of the IoT device 400 in operation S201. The second secret value S1 may be securely generated by the secure element 470 of the IoT device 400 and written to the NFC tag 430 according to the control of the processing circuit 450 in operation S201. Alternatively, the second secret value S1 may be generated by an NFC writer (not shown) and stored in the NFC tag 430 in operation S201. The NFC tag 430 may be embedded in the IoT device 400 or may be attached to the IoT device 400 in a form of a sticker.

When the first controller 300 tags or scans the NFC tag 430 of the IoT device 400, the radio transceiver 410 of the IoT device 400 may transmit the second secret value S1 and access information DEV stored in the NFC tag 430 to the radio transceiver 310 of the first controller 300 according to the control of the processing circuit 450 in operation S203. Operation S203 may be performed through NFC for physical access restriction. A communication method used in operation S203 may be the same as or different from the one used in at least one operation among operations S217, S225, S231, S239, and S247. The first controller 300 may include an NFC reader which may read the second secret value S1 from the NFC tag 430.

The access information DEV may indicate a communication method between the hub 200 and the IoT device 400. The communication method may use WLAN such as Wi-Fi, WPAN such as Bluetooth, wireless USB, ZigBee, NFC, RFID, or mobile cellular network, but the inventive concept is not restricted thereto. For instance, when the radio transceiver 410 of the IoT device 400 uses or supports Wi-Fi, the access information DEV may be a media access control (MAC) address or an internet protocol (IP) address for Wi-Fi access. When the radio transceiver 410 of the IoT device 400 uses or supports ZigBee, the access information DEV may be a MAC address or an IP address for ZigBee access.

The encryption/decryption engine 339 of the first controller 300 may encrypt the second secret value S1 and the access information DEV using the domain key DK output from the memory 350 to generate encrypted second secret value and access information E_DK(S1, DEV) in operation S205. In addition, the MAC generator 335 of the first controller 300 may generate the first MAC MAC1 (=MAC_DK(E_DK(S1, DEV))) for the encrypted second secret value and access information E_DK(S1, DEV) using the domain key DK output from the memory 350 in operation S205. The processing circuit 330 of the first controller 300 may transmit the encrypted second secret value and access information E_DK(S1, DEV) and the first MAC MAC1 (=MAC_DK(E_DK(S1, DEV))) to the radio transceiver 250 of the hub 200 through the radio transceiver 310 in operation S207.

The encryption/decryption engine 239 of the hub 200 may decrypt the encrypted second secret value and access information E_DK(S1, DEV) using the domain key DK output from the secure element 270 or the memory 290 to generate the second secret value S1 and the access information DEV in operation S209. The processing circuit 230 of the hub 200 may authenticate or confirm the first controller 300 using operation S209.

The processing circuit 230 of the hub 200 may store the second secret value S1 and the access information DEV in the secure element 270 or the memory 290 in operation S211. For instance, the secure element 270 may convert the second secret value S1 and the access information DEV into secure information and may store the secure information therein or in the memory 290 in operation S211.

The processing circuit 450 of the IoT device 400 may generate the second key KEY2 (=K2) using the second secret value S1 output from the NFC tag 430 in operation S213. The processing circuit 450 of the IoT device 400 may generate the third random number Rd and may generate a fifth MAC MAC5 (=MAC_K2(Rd)) for the third random number Rd using the second key KEY2 (=K2) in operation S215. The third random number Rd may be information or a message. The third random number Rd may be an unencrypted plain text and the fifth MAC MAC5 (=MAC_K2(Rd)) may be data (or information) used to authenticate the third random number Rd. The radio transceiver 410 of the IoT device 400 may transmit the third random number Rd and the fifth MAC MAC5 (=MAC_K2(Rd)) to the radio transceiver 250 of the hub 200 in operation S217.

The processing circuit 230 of the hub 200 may generate the second key KEY2 (=K2) using the second secret value S1 that has been decrypted in operation S219. For instance, when the second secret value S1 stored in the NFC tag 430 of the IoT device 400 is the same as the second secret value S1 decrypted by the encryption/decryption engine 239 of the hub 200, each of the key generators 231 and 451 may generate the same key KEY2. Although operation S219 is performed after operation S217 in the exemplary embodiment illustrated in FIG. 4, operation S219 may be performed before or simultaneously with operation S217.

The processing circuit 230 of the hub 200 may check the validity of the third random number Rd in operation S221. For instance, the MAC generator 233 may receive the third random number Rd through the radio transceiver 250, may generate the second MAC MAC2 (=MAC_K2(Rd)) for the third random number Rd using the second key KEY2 (=K2), and may transmit the second MAC MAC2 (=MAC_K2(Rd)) to the first comparator 237.

The first comparator 237 may compare the fifth MAC MAC5 (=MAC_K2(Rd)) received through the radio transceiver 250 with the second MAC MAC2 (=MAC_K2(Rd)) output from the MAC generator 233, and may generate the first comparison signal CR1. When the second MAC MAC2 (=MAC_K2(Rd)) is the same as the fifth MAC MAC5 (=MAC_K2(Rd)), the third random number Rd is authenticated and the integrity of the third random number Rd is confirmed in operation S221.

The random number generator 235 may generate the second random number Rg, and the MAC generator 233 may generate the third MAC MAC3 (=MAC_K2(Rg, Rd)) for the second and third random numbers Rg and Rd using the second key KEY2 (=K2) output from the key generator 231 in operation S223. Although it is shown that the second random number Rg generated in operation S223 illustrated in FIG. 4 is the same as the second random number Rg generated in operation S115 illustrated in FIG. 2, a random number generated in operation S223 in FIG. 4 may be different from a random number generated in operation S115 in FIG. 2.

The processing circuit 230 of the hub 200 may transmit the second random number Rg and the third MAC MAC3 (=MAC_K2(Rg, Rd)) to the radio transceiver 410 of the IoT device 400 through the radio transceiver 250 in operation S225. For example, the second random number Rg may be an unencrypted plain text and the third MAC MAC3 (=MAC_K2(Rg, Rd)) may be data (or information) used to authenticate the second random number Rg.

The processing circuit 450 of the IoT device 400 may check the validity of the second random number Rg in operation S227. For instance, the MAC generator 455 may receive the second random number Rg through the radio transceiver 410, may generate the sixth MAC MAC6 (=MAC_K2(Rg, Rd)) for the second and third random numbers Rg and Rd using the second key KEY2 (=K2) output from the key generator 451, and may transmit the sixth MAC MAC6 (=MAC_K2(Rg, Rd)) to the third comparator 457.

The third comparator 457 may compare the third MAC MAC3 (=MAC_K2(Rg, Rd)) output from the radio transceiver 410 with the sixth MAC MAC6 (=MAC_K2(Rg, Rd)) output from the MAC generator 455, and may output the third comparison signal CR3. For instance, when the third MAC MAC3 (=MAC_K2(Rg, Rd)) is the same as the sixth MAC MAC6 (=MAC_K2(Rg, Rd)), the second random number Rg is authenticated and the integrity of the second random number Rg is confirmed in operation S227.

Although the MAC generator 233 in the processing circuit 230 of the hub 200 generates the third MAC MAC3 (=MAC_K2(Rg, Rd)) for the second and third random numbers Rg and Rd using the second key KEY2 (=K2) output from the key generator 231 in the exemplary embodiment illustrated in FIG. 4, the MAC generator 233 of the processing circuit 230 may generate the third MAC MAC3 (=MAC_K2(Rg)) for the second random number Rg using the second key KEY2 (=K2) output from the key generator 231 in other exemplary embodiments. The second random number Rg may be an unencrypted plain text and the third MAC MAC3 (=MAC_K2(Rg)) may be data (or information) used to authenticate the second random number Rg. The processing circuit 230 of the hub 200 may transmit the second random number Rg and the third MAC MAC3 (=MAC_K2(Rg)) to the radio transceiver 410 of the IoT device 400 through the radio transceiver 250 in operation S225.

The processing circuit 450 of the IoT device 400 may check the validity of the second random number Rg in operation S227. For instance, the MAC generator 455 may receive the second random number Rg through the radio transceiver 410, may generate the sixth MAC MAC6 (=MAC_K2(Rg)) for the second random number Rg using the second key KEY2 (=K2) output from the key generator 451, and may transmit the sixth MAC MAC6 (=MAC_K2(Rg)) to the third comparator 457.

The third comparator 457 may compare the third MAC MAC3 (=MAC_K2(Rg)) output from the radio transceiver 410 with the sixth MAC MAC6 (=MAC_K2(Rg)) output from the MAC generator 455, and may output the third comparison signal CR3. For instance, when the third MAC MAC3 (=MAC_K2(Rg)) is the same as the sixth MAC MAC6 (=MAC_K2(Rg)), the second random number Rg is authenticated and the integrity of the second random number Rg is confirmed in operation S227.

The processing circuit 450 of the IoT device 400 may generate the encryption key EK2 and the MAC key KEY2 (=MK2) using the second secret value S1, the second random number Rg, and the third random number Rd in operation S229. In detail, the key generator 455 of the IoT device 400 may generate the encryption key EK2 and the MAC key KEY2 (=MK2) using the second secret value S1, the second random number Rg, and the third random number Rd in operation S229.

The processing circuit 450 of the IoT device 400 may transmit the second random number Rg, the third random number Rd, and the fifth MAC MAC5 (=MAC_MK2(Rg, Rd)) to the radio transceiver 250 of the hub 200 through the radio transceiver 410 in operation S231. In detail, the MAC generator 455 of the processing circuit 450 may generate the fifth MAC MAC5 (=MAC_MK2(Rg, Rd)) for the second and third random numbers Rg and Rd using the MAC key KEY2 (=MK2) output from the key generator 451 and may transmit the fifth MAC MAC5 (=MAC_MK2(Rg, Rd)) to the radio transceiver 250 of the hub 200 through the radio transceiver 410 in operation S231.

The processing circuit 230 of the hub 200 may generate the encryption key EK2 and MAC key MK2 using the second secret value S1, the second random number Rg, and the third random number Rd in operation S233. In detail, the key generator 231 of the processing circuit 230 may generate the encryption key EK2 and the MAC key KEY2 (=MK2) using the second secret value S1, the second random number Rg, and the third random number Rd in operation S233.

The processing circuit 230 of the hub 200 may check the validity of the second and third random numbers Rg and Rd in operation S235. In detail, the MAC generator 233 may generate the second MAC MAC2 (=MAC_MK2(Rg, Rd)) for the second and third random numbers Rg and Rd using the MAC key KEY2 (=MK2) output from the key generator 231 and may transmit the second MAC MAC2 (=MAC_MK2(Rg, Rd)) to the first comparator 237.

The first comparator 237 may compare the fifth MAC MAC5 (=MAC_MK2(Rg, Rd)) output from the radio transceiver 250 with the second MAC MAC2 (=MAC_MK2(Rg, Rd)) output from the MAC generator 233, and may output the first comparison signal CR1. For instance, when the second MAC MAC2 (=MAC_MK2(Rg, Rd)) is the same as the fifth MAC MAC5 (=MAC_MK2(Rg, Rd)), the second and third random numbers Rg and Rd are authenticated and the integrity of the second and third random numbers Rg and Rd is confirmed in operation S235. Although operations S231 and S235 are performed in the exemplary embodiment illustrated in FIG. 4, these operations S231 and S235 may be omitted in other exemplary embodiments.

The processing circuit 450 of the IoT device 400 may encrypt IoT device identification data DIF for identifying the IoT device 400 using the encryption key EK2 output from the key generator 451 and may generate encrypted IoT device identification data E_EK2(DIF) and the fifth MAC MA51 (=MAC_MK2(E_EK2(DIF))) for the encrypted IoT device identification data E_EK2(DIF) in operation S237.

In detail, the encryption/decryption engine 459 of the IoT device 400 may encrypt the IoT device identification data DIF using the encryption key EK2 to generate the encrypted IoT device identification data E_EK2(DIF). The MAC generator 455 may generate the fifth MAC MAC5 (=MAC_MK2(E_EK2(DIF))) for the encrypted IoT device identification data E_EK2(DIF) using the MAC key KEY2 (=MK2) in operation S237. The radio transceiver 410 of the IoT device 400 may transmit the encrypted IoT device identification data E_EK2(DIF) and the fifth MAC MAC5 (=MAC_MK2(E_EK2(DIF))) to the radio transceiver 250 of the hub 200 in operation S239. The IoT device identification data DIF may be IoT device information.

The processing circuit 230 of the hub 200 may check the validity of the encrypted IoT device identification data E_EK2(DIF) in operation S241. In detail, the MAC generator 233 may generate the second MAC MAC2 (=MAC_MK2(E_EK2(DIF))) for the encrypted IoT device identification data E_EK2(DIF) using the MAC key KEY2 (=MK2) and may transmit the second MAC MAC2 (=MAC_MK2(E_EK2(DIF))) to the first comparator 237.

The first comparator 237 may compare the fifth MAC MAC5 (=MAC_MK2(E_EK2(DIF))) output from the radio transceiver 250 with the second MAC MAC2 (=MAC_MK2(E_EK2(DIF))) output from the MAC generator 233, and may output the first comparison signal CR1. For instance, when the fifth MAC MAC5 (=MAC_MK2(E_EK2(DIF))) is the same as the second MAC MAC2 (=MAC_MK2(E_EK2(DIF))), the encrypted IoT device identification data E_EK2(DIF) is authenticated and the integrity of the encrypted IoT device identification data E_EK2(DIF) is confirmed in operation S241.

When the first comparison signal CR1 indicates that the fifth MAC MAC5 (=MAC_MK2(E_EK2(DIF))) is the same as the second MAC MAC2 (=MAC_MK2(E_EK2(DIF))), the encryption/decryption engine 239 of the hub 200 may decrypt the encrypted IoT device identification data E_EK2(DIF) using the encryption key EK2 generated by the key generator 231 and may store the decrypted IoT device identification data DIF in the secure element 270 or the memory 290 of the hub 200 in operation S243.

The encryption/decryption engine 239 of the hub 200 may encrypt the domain key DK using the encryption key EK2 generated by the key generator 231 to generate encrypted domain key E_EK2(DK) in operation S245. The MAC generator 233 of the hub 200 may generate the third MAC MAC3 (=MAC_MK2(E_EK2(DK))) for the encrypted domain key E_EK2(DK) using the MAC key KEY2 (=MK2) generated by the key generator 231 in operation S245. The processing circuit 230 of the hub 200 may transmit the encrypted domain key E_EK2(DK) and the third MAC MAC3 (=MAC_MK2(E_EK2(DK))) to the radio transceiver 410 of the IoT device 400 through the radio transceiver 250 in operation S247.

The processing circuit 450 of the IoT device 400 may check the validity of the encrypted domain key E_EK2(DK) in operation S249. In detail, the MAC generator 455 may generate the sixth MAC MAC6 (=MAC_MK2(E_EK2(DK))) for the encrypted domain key E_EK2(DK) using the MAC key KEY2 (=MK2) and may transmit the sixth MAC MAC6 (=MAC_MK2(E_EK2(DK))) to the third comparator 457.

The third comparator 457 may compare the third MAC MAC3 (=MAC_MK2(E_EK2(DK))) output from the radio transceiver 410 with the sixth MAC MAC6 (=MAC_MK2(E_EK2(DK))) output from the MAC generator 455, and may output the third comparison signal CR3. For instance, when the third MAC MAC3 (=MAC_MK2(E_EK2(DK))) is the same as the sixth MAC MAC6 (=MAC_MK2(E_EK2(DK))), the encrypted domain key E_EK2(DK) is authenticated and the integrity of the encrypted domain key E_EK2(DK) is confirmed in operation S249.

When the third comparison signal CR3 indicates that the third MAC MAC3 (=MAC_MK2(E_EK2(DK))) is the same as the sixth MAC MAC6 (=MAC_MK2(E_EK2(DK))), the encryption/decryption engine 459 of the IoT device 400 may decrypt the encrypted domain key E_EK2(DK) using the encryption key EK2 generated by the key generator 451 and may store the encrypted domain key E_EK2(DK) and/or the decrypted domain key DK in the secure element 470 or the memory 490 of the IoT device 400 in operation S251.

The hub 200 is paired with the IoT device 400 through operations S201 through S251 described above with reference to FIGS. 4 and 5, so that the hub 200 and the IoT device 400 may communicate a command and/or data with each other. In other words, the hub 200 may be paired with at least one IoT device through operations S201 through S251 described above with reference to FIGS. 4 and 5, so that the hub 200 and the at least one IoT device may communicate a command and/or data with each other.

In the second secure pairing (e.g., device pairing), the second secret value S1 and/or the access information DEV may be transmitted from the IoT device 400 to the first controller 300 using NFC in operation S203, and data transmission may be performed using NFC and/or Wi-Fi in operations S207, S217, S225, S231, S239, and S247, but the inventive concept is not restricted thereto.

Figure 6:
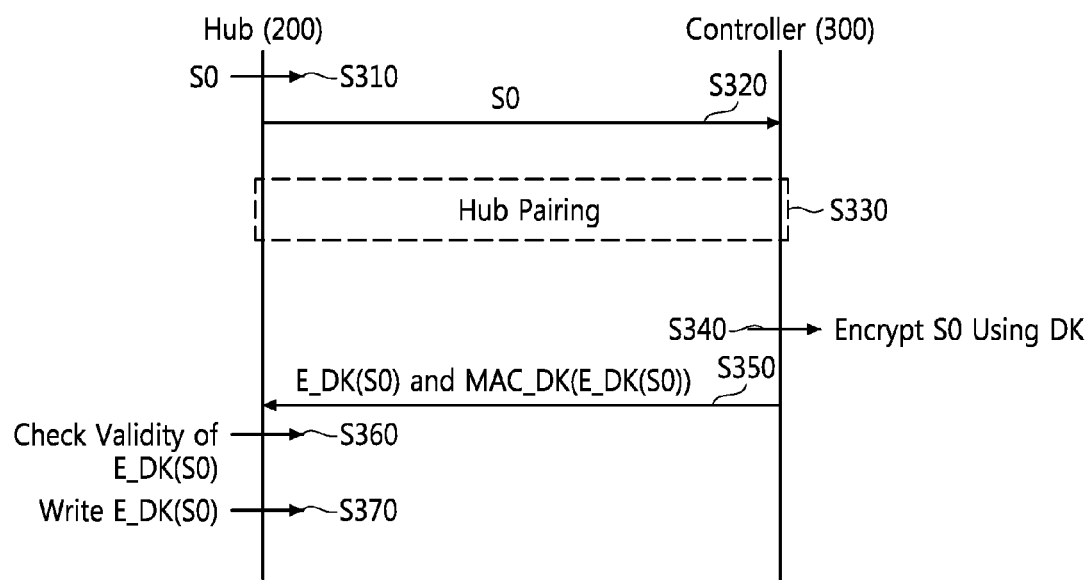
FIG. 6 is a diagram of a data flow for explaining a method of managing a first secret value stored in a near field communication (NFC) tag of the hub illustrated in FIG. 1.

FIG. 6 is a diagram of a data flow for explaining a method of managing the first secret value S0 stored in the NFC tag 210 of the hub 200 illustrated in FIG. 1. Referring to FIGS. 1 through 3 and FIG. 6, the first secret value S0 may be stored in the NFC tag 210 of the hub 200 in operation S310. The first secret value S0 may be securely generated by the secure element 270 and written to the NFC tag 210 according to the control of the processing circuit 230 in operation S310. Alternatively, the first secret value S0 may be generated by an NFC writer (not shown) and stored in the NFC tag 210 in operation S310.

When the first controller 300 tags or scans the NFC tag 210 of the hub 200, the radio transceiver 250 may transmit the first secret value S0 stored in the NFC tag 210 to the radio transceiver 310 of the first controller 300 according to the control of the processing circuit 230 in operation S320.

The hub 200 is paired with the first controller 300 through operations S105 through S143 described with reference to FIGS. 2 and 3 in operation S330. The processing circuit 330 of the first controller 300 may encrypt the first secret value S0 using the domain key DK to generate the encrypted first secret value E_DK(S0) and may generate a first MAC MAC_CK(E_DK(S0)) for the encrypted first secret value E_DK(S0) using the domain key DK in operation S340. The processing circuit 330 of the first controller 300 may transmit the encrypted first secret value E_DK(S0) and the first MAC MAC_CK(E_DK(S0)) to the radio transceiver 250 of the hub 200 through the radio transceiver 310 in operation S350.

The processing circuit 230 of the hub 200 may check the validity of the encrypted first secret value E_DK(S0) in operation S360. A method of checking the validity of the encrypted first secret value E_DK(S0) is the same as or similar to the method described in operations S113, S127, S133, S221, S235, and S241, and therefore, the description of the method will be omitted.

After checking the validity of the encrypted first secret value E_DK(S0), the processing circuit 230 of the hub 200 may change or update the first secret value S0 to the encrypted first secret value E_DK(S0) in the NFC tag 210 in operation S370.

Figure 7:
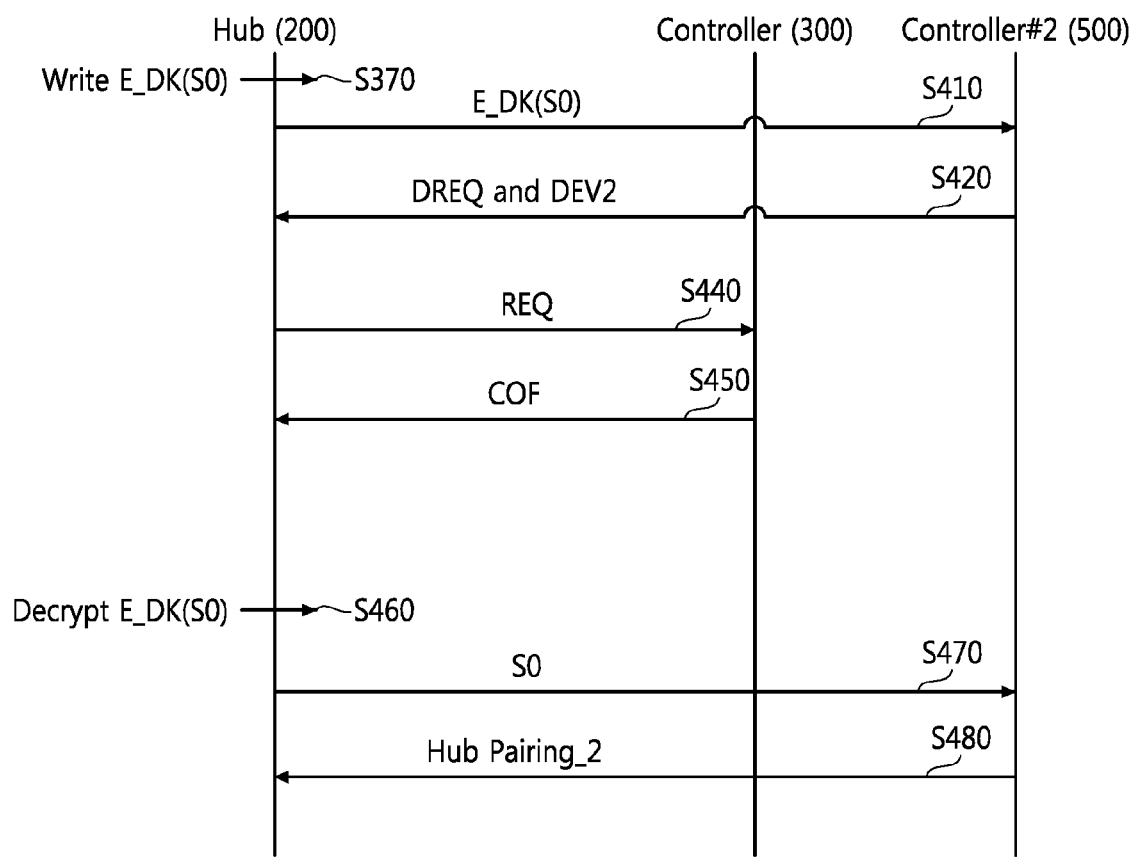
FIG. 7 is a diagram of a data flow for explaining a method by which a second controller illustrated in FIG. 1 requests the first controller to decrypt the first secret value that has been encrypted.

FIG. 7 is a diagram of a data flow for explaining a method by which the second controller 500 illustrated in FIG. 1 requests the first controller 300 to decrypt the encrypted first secret value E_DK(S0). Referring to FIGS. 1 through 3 and FIGS. 6 and 7, after checking the validity of the encrypted first secret value E_DK(S0), the processing circuit 230 of the hub 200 may change or update the first secret value S0 to the encrypted first secret value E_DK(S0) in the NFC tag 210 in operation S370.

When the second controller 500 tags or scans the NFC tag 210 of the hub 200, the radio transceiver 250 may transmit the encrypted first secret value E_DK(S0) stored in the NFC tag 210 to the radio transceiver 510 of the second controller 500 according to the control of the processing circuit 230 in operation S410. Since the second controller 500 has not stored a domain key in the memory 550, the second controller 500 cannot decrypt the encrypted first secret value E_DK(S0). Accordingly, the processing circuit 530 of the second controller 500 may transmit the first decryption request DREQ and access information DEV2 regarding the second controller 500 to the radio transceiver 250 of the hub 200 through the radio transceiver 510 in operation S420.

The access information DEV2 may indicate a communication method between the hub 200 and the second controller 500. The communication method may use WLAN such as Wi-Fi, WPAN such as Bluetooth, wireless USB, ZigBee, NFC, RFID, or mobile cellular network, but the inventive concept is not restricted thereto. For instance, when the radio transceiver 510 of the second controller 500 uses or supports Wi-Fi, the access information DEV2 may be a MAC address or an IP address for Wi-Fi access. When the radio transceiver 510 of the second controller 500 uses or supports ZigBee, the access information DEV2 may be a MAC address or an IP address for ZigBee access.

The processing circuit 230 of the hub 200 may transmit the second decryption request REQ to the first controller 300 in response to the first decryption request DREQ in operation S440. The processing circuit 330 of the first controller 300 may determine whether to approve the second decryption request REQ, and may generate and transmit the approval signal COF to the hub 200 if an approval is determined in operation S450.

The processing circuit 230 of the hub 200 may decrypt the encrypted first secret value E_DK(S0) using the domain key DK in response to the approval signal COF in operation S460. In detail, the encryption/decryption engine 239 may decrypt the encrypted first secret value E_DK(S0) output from the NFC tag 210 using the domain key DK output from the secure element 270 or the memory 290 and may transmit the decrypted first secret value S0 to the second controller 500 according to a communication method determined based on the access information DEV2 in operation S470.

As described above with reference to FIGS. 2 and 3, the hub 200 may be paired with the second controller 500 using operations similar to operations S105 through S143. In other words, a domain key encrypted by the hub 200 may be transmitted to the second controller 500 and the second controller 500 may decrypt an encrypted domain key and may store a decrypted domain key in the memory 550.

Although a secure module is not included in the second controller 500 in FIG. 1, the second controller 500 may include the secure module for storing the decrypted domain key DK in other exemplary embodiments. The second controller 500 may also include a secure logic circuit to securely store the decrypted domain key DK in the memory 550. The first controller 300 and the second controller 500 may perform the methods described with reference to FIGS. 4 through 6.

Figure 8:
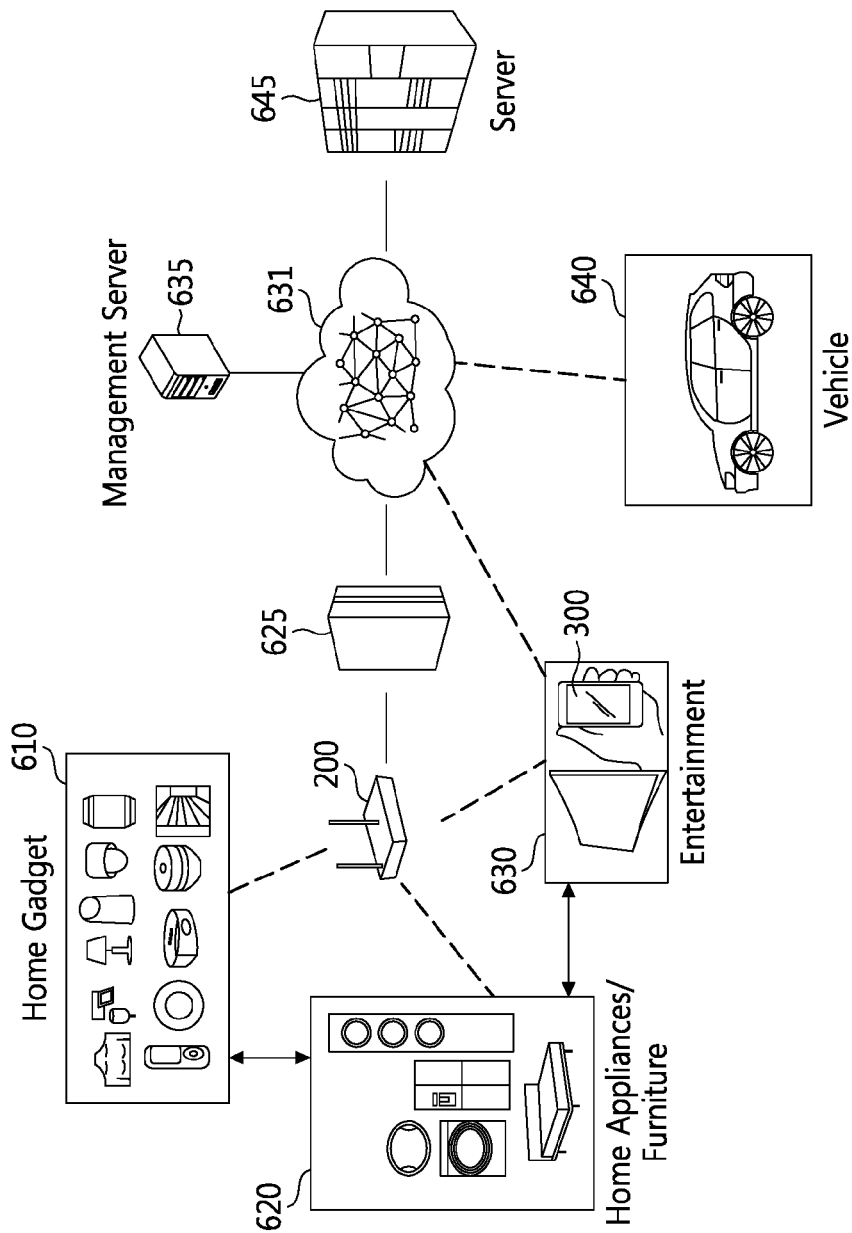
FIG. 8 is a block diagram of an IoT network system including the hub, the first controller, and the IoT device illustrated in FIG. 1 according to an exemplary embodiment.

FIG. 8 is a block diagram of an IoT network system 100B including the hub 200, the first controller 300, and the IoT device 400 illustrated in FIG. 1 according to an exemplary embodiment. Referring to FIGS. 1 through 8, the IoT network system 100B may include the hub 200 and IoT devices 610, 620, 630, and 640. One of the IoT devices 610, 620, 630, and 640 may perform the functions of the first controller 300 and at least another one of the IoT devices 610, 620, 630, and 640 may perform the functions of the IoT device 400. Accordingly, the hub 200 may be paired with each of the IoT devices 610, 620, 630, and 640 using physical access restriction (e.g., NFC).

The IoT may refer to a network of IoT devices that use wired and/or wireless communication. Accordingly, the IoT may be referred to as an IoT network system, a ubiquitous sensor network (USN) communication system, a machine type communication (MTC) system, a machine-oriented communication (MOC) system, a machine-to-machine (M2M) communication system, or a device-to-device (D2D) communication system.

Here, an IoT network system may include elements, such as, an IoT device, a hub, an access point, a gateway, a communication network, and/or a server. However, these elements are defined just to explain the IoT network system and the scope of the IoT network system is not restricted thereto. The IoT network system may use a user datagram protocol (UDP), a transmission protocol such as a transmission control protocol (TCP), an IPv6 low-power wireless personal area networks (6LoWPAN) protocol, an IPv6 internet routing protocol, a constrained application protocol (CoAP), a hypertext transfer protocol (HTTP), a message queue telemetry transport (MQTT), or an MQTT for sensors networks (MQTT-S) for exchange (or communication) of information among at least two elements therewithin.

When the IoT network system is implemented as a wireless sensor network (WSN), each of the IoT devices 610, 620, 630, and 640 may be used as a sink node or a sensor node. The sink node is also called a base station and plays as a gateway connecting the WSN with an external network (e.g., an internet). The sink node may assign a task to the sensor node and gather events sensed by the sensor node. The sensor node is a node within the WSN and may process and gather sensory information. It may communicate with other nodes in the WSN.

The IoT devices 610, 620, 630, and 640 may include an active IoT device which operates using its own power and a passive IoT device which operates using wireless power transferred from an outside source. The active IoT device may include a refrigerator, an air conditioner, a telephone, or an automobile. The passive IoT device may include an RFID tag or an NFC tag. However, when an RFID tag or an NFC tag includes a battery, the RFID or NFC tag may be classified as an active IoT device.

The IoT devices 610, 620, 630, and 640 may include a passive communication interface such as a two-dimensional barcode, a three-dimensional barcode, a QR code, an RFID tag, or an NFC tag. The IoT devices 610, 620, 630, and 640 may also include an active communication interface such as a modem or a transceiver. Although the NFC tags 210 and 430 are illustrated in FIG. 1, at least one of the NFC tags 210 and 430 may be replaced with a two-dimensional barcode, a three-dimensional barcode, a QR code, or an RFID tag.

Figure 12:
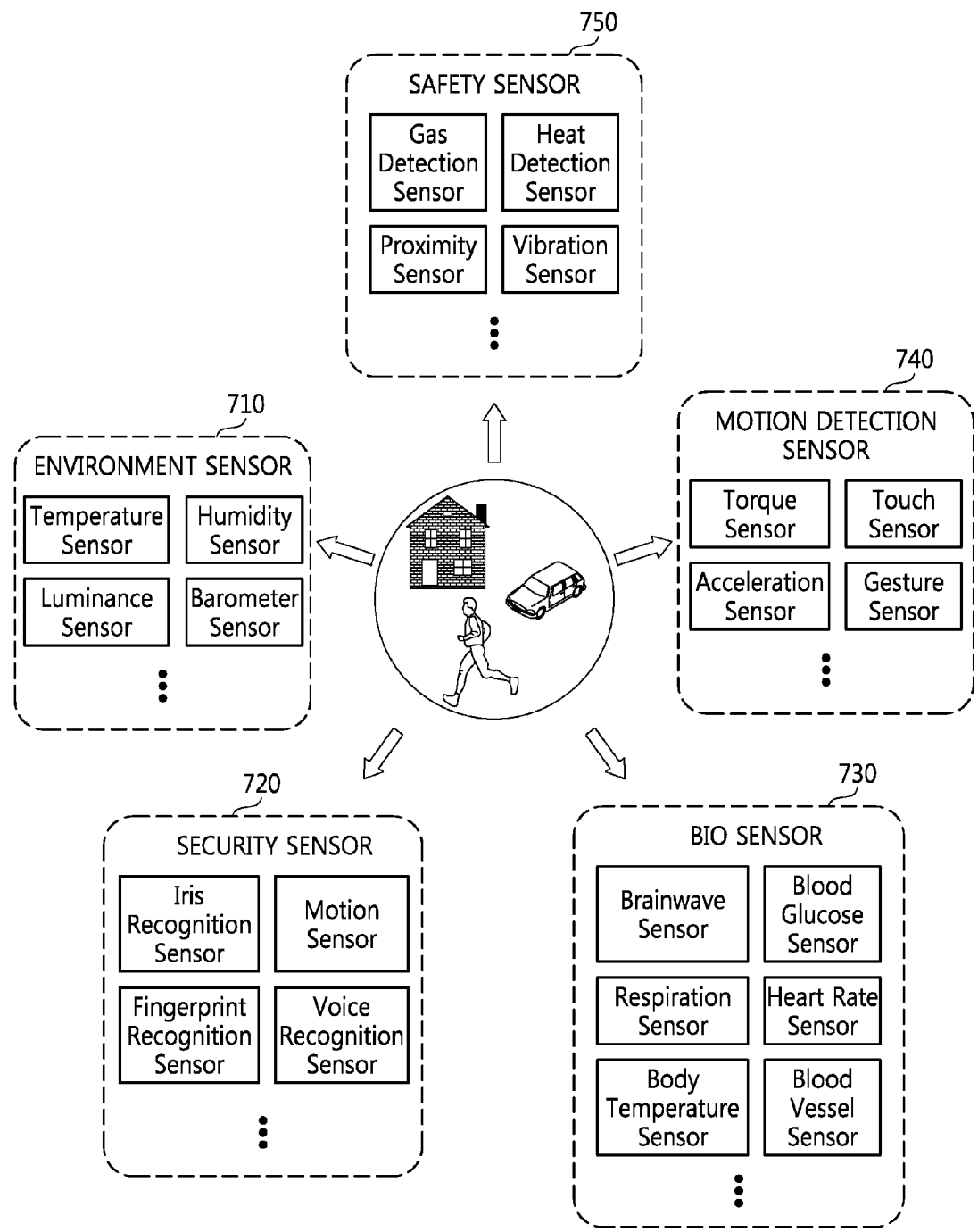
FIG. 12 is a diagram of examples of IoT devices illustrated in FIG. 8, 9, or 10.

At least one of the IoT devices 610, 620, 630, and 640 may gather data using at least one of the sensors illustrated in FIG. 12 and transmit the gathered data to an external device or an external IoT device through a wired or wireless communication interface. At least one of the IoT devices 610, 620, 630, and 640 may transmit and receive control information and/or data through a wired or wireless communication interface. The wired or wireless communication interface may be an example of an accessible interface.

When the first controller 300 paired with the hub 200 tags an NFC tag attached to or embedded in each of the IoT devices 610, 620, 630, and 640, as described above with reference to FIGS. 4 and 5, each of the IoT devices 610, 620, 630, and 640 may be paired with the hub 200. The hub 200 in the IoT network system 100B may function as an access point. The IoT devices 610, 620, 630, and 640 may be connected to a communication network or other IoT devices through the hub 200.

Although the hub 200 is shown as an independent device in FIG. 8, the hub 200 may be embedded in one of the IoT devices 610, 620, 630, and 640. For instance, the hub 200 may be embedded in a television (TV or a smart TV) or a smart refrigerator. A user may be allowed to monitor or control at least one of the IoT devices 610, 620, 630, and 640 connected to the hub 200 through a display of the TV or the smart refrigerator. Alternatively, the hub 200 may be one of the IoT devices 610, 620, 630, and 640. For instance, a smart phone may be an IoT device functioning as the hub 200. The smart phone may perform tethering.

The IoT network system 100B may also include a gateway 625. The gateway 625 may connect the hub 200, which functions as an access point, to an external communication network (e.g., an internet or a public switched network). The IoT devices 610, 620, 630, and 640 may be connected to an external communication network through the gateway 625. The hub 200 and the gateway 625 may be implemented in a single device. Alternatively, the hub 200 may function as a first gateway and the gateway 625 may function as a second gateway.

One of the IoT devices 610, 620, 630, and 640 may function as the gateway 625. For instance, a smart phone may be both an IoT device and the gateway 625. The smart phone may be connected to a mobile cellular network.

The IoT network system 100B may also include at least one communication network 631. The communication network 631 may include an internet and/or a public switched network, but the inventive concept is not restricted thereto. The public switched network may include a mobile cellular network. The communication network 631 may be a communication channel which transfers information gathered by the IoT devices 610, 620, 630, and 640.

The IoT network system 100B may also include a management server 635 and/or a server 645 connected to the communication network 631. The communication network 631 may transmit a signal (or data) detected by at least one of the IoT devices 610, 620, 630, and 640 to the management server 635 and/or the server 645.

The management server 635 and/or the server 645 may store or analyze a signal received from the communication network 631. The management server 635 and/or the server 645 may transmit the analysis result to at least one of the IoT devices 610, 620, 630, and 640 via the communication network 631. The management server 635 may manage the states of the hub 200, the gateway 625, the communication network 631, and/or the IoT devices 610, 620, 630, and 640.

The server 645 may receive and store data related with at least one of the IoT devices 610, 620, 630, and 640 and may analyze the stored data. The server 645 may transmit the analysis result to at least one of the IoT devices 610, 620, 630, and 640 or to a device (e.g., a smart phone) possessed by a user via the communication network 631.

For instance, when one of the IoT devices 610, 620, 630, and 640 is a blood glucose monitoring IoT device which measures a user's blood glucose, the server 645, which stores a blood glucose limit preset by the user, may receive a measured blood glucose level from the glucose monitoring IoT device via the communication network 631. The server 645 may compare the blood glucose limit with the measured blood glucose level and may transmit a warning signal to at least one of the IoT devices 610, 620, 630, and 640 or a user device via the communication network 631 when the measured blood glucose level is higher than the blood glucose limit.

The IoT devices 610, 620, 630, and 640 illustrated in FIG. 8 may be classified into groups according to their characteristics. IoT devices may be classified into the home gadget group 610, the home appliances/furniture group 620, the entertainment group 630, and the vehicle group 640.

The home gadget group 610 may include a heart rate sensor patch, a medical tool for measuring blood glucose, lighting equipment, a hygrometer, a surveillance camera, a smart watch, a security keypad, a temperature controller, an aroma diffuser, and/or a window blind. However, the inventive concept is not restricted thereto.

The home appliances/furniture group 620 may include a robot vacuum cleaner, a washing machine, a refrigerator, an air conditioner, a TV, and/or furniture (e.g., a bed including a sensor), but the inventive concept is not restricted thereto. The entertainment group 630 may include a TV, a smart TV, the smart phone 300, and/or a multimedia video system, but the inventive concept is not restricted thereto.

The IoT devices 610, 620, 630, and 640 may also be divided into a temperature control group which controls indoor temperature, a large appliances group and a small appliances group according to power consumption, a cleanness group which controls indoor cleanness (e.g., air purifying and floor cleaning), a lighting group which controls indoor lights, and an entertainment group which controls entertainment equipment (such as TV and audio systems). For instance the temperature control group may include an air conditioner, a power window, and an electric curtain.

Each of the IoT devices 610, 620, 630, and 640 may belong to at least one group. For instance, an air conditioner may belong to both the home appliances/furniture group 620 and the temperature control group. A TV may belong to both the home appliances/furniture group 620 and the entertainment group 630. The smart phone 300 may belong to both the home gadget group 610 and the entertainment group 630.

Figure 9:
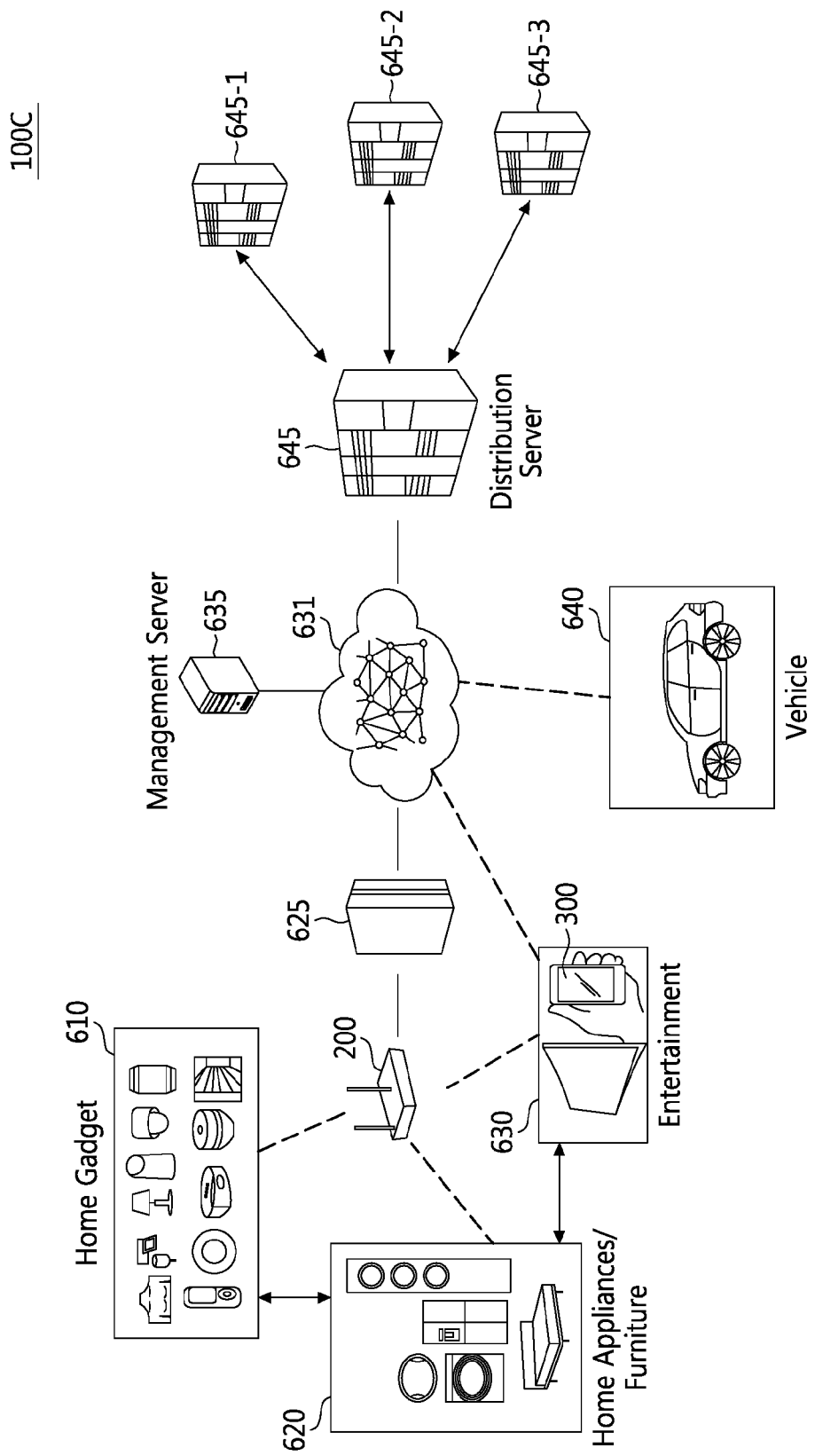
FIG. 9 is a block diagram of an IoT network system including the hub, the first controller, and the IoT device illustrated in FIG. 1 according to another exemplary embodiment.

FIG. 9 is a block diagram of an IoT network system 100C including the hub 200, the first controller 300, and the IoT device 400 illustrated in FIG. 1 according to another exemplary embodiment. Referring to FIGS. 1 through 9, the IoT network system 100C may include the hub 200, the first controller 300, the IoT devices 610, 620, 630, and 640, the gateway 625, the communication network 631, the management server 635, a distribution server 645, and a plurality of servers 645-1, 645-2, and 645-3. Apart from the distribution server 645 and the servers 645-1, 645-2, and 645-3, the IoT network system 100C illustrated in FIG. 9 is substantially the same as or similar to the IoT network system 100B illustrated in FIG. 8.

The distribution server 645 is connected with the servers 645-1, 645-2, and 645-3 and may distribute jobs to the servers 645-1, 645-2, and 645-3. The distribution server 645 may analyze a request transmitted from the entertainment group 630 through scheduling, may predict the amount of data and workload related with a job based on the analysis result, and may communicate with at least one of the servers 645-1, 645-2, and 645-3. The distribution server 645 may receive and analyze state information from the servers 645-1, 645-2, and 645-3 and may reflect the analysis result to the scheduling. The overall performance of the IoT network system 100C can be enhanced through the scheduling of the distribution server 645.

Figure 10:
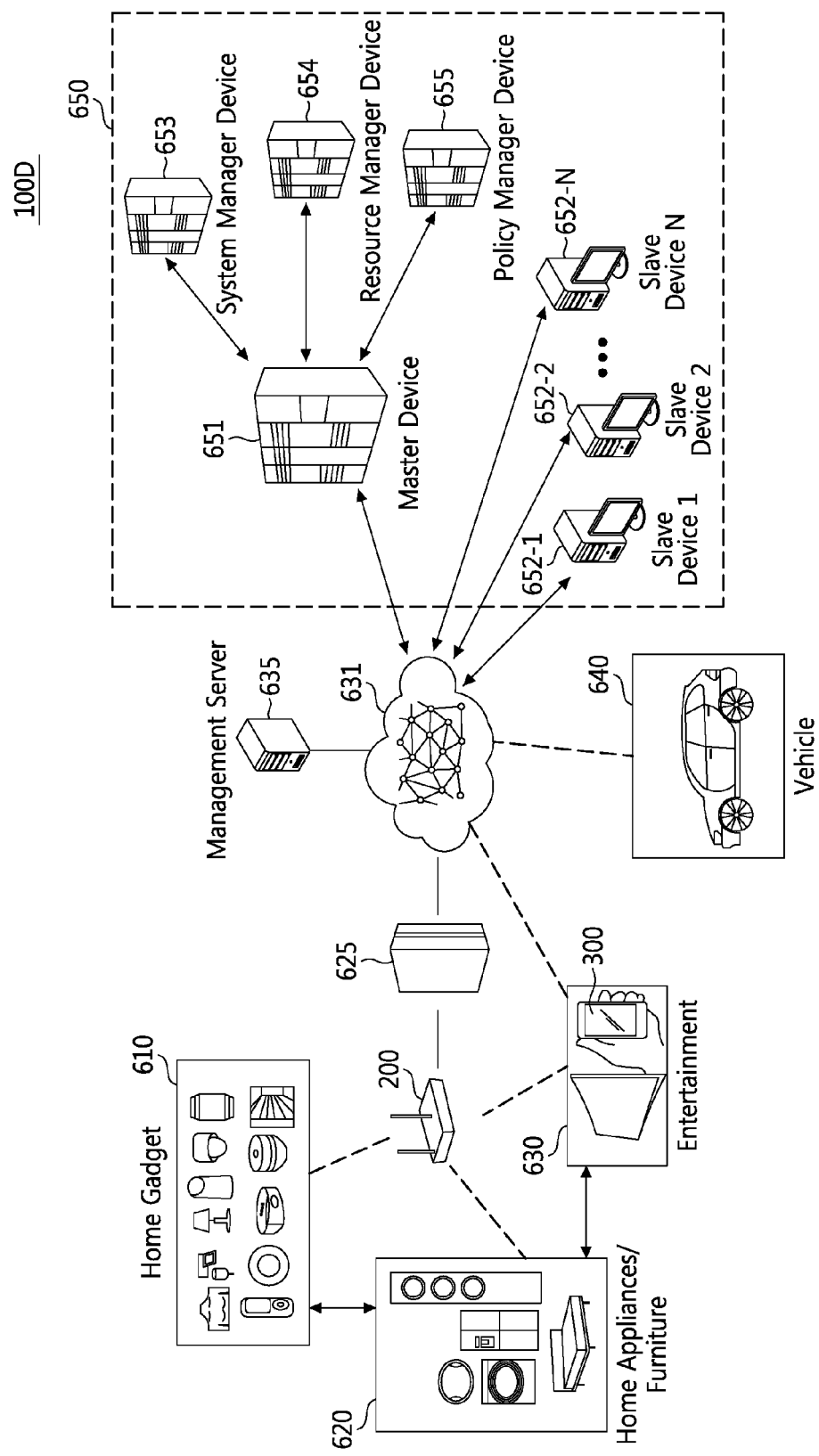
FIG. 10 is a block diagram of an IoT network system including the hub, the first controller, and the IoT device illustrated in FIG. 1 according to another exemplary embodiment.

FIG. 10 is a block diagram of an IoT network system 100D including the hub 200, the first controller 300, and the IoT device 400 illustrated in FIG. 1 according to another exemplary embodiment. Referring to FIGS. 1 through 10, the IoT network system 100D may include the hub 200, the first controller 300, the IoT devices 610, 620, 630, and 640, the gateway 625, the communication network 631, the management server 635, and a distribution server system 650.

The distribution server system 650 may receive and store or analyze data from the communication network 631. The distribution server system 650 may send the stored data or the analyzed data to at least one of the elements 200, 625, 610, 620, 630, 625, and 640 included in the IoT network system 100D via the communication network 631.

The distribution server system 650 may include a distributed computing system driven based on a distributed file system (DFS). The distribution server system 650 may be driven based on at least one among various DFSs such as Hadoop DFS (HDFS), Google file system (GFS), Cloud store, Coda, NFS, and general parallel file system (GPFS), but the inventive concept is not restricted thereto. The distribution server system 650 may include a master device 651, slave devices 652-1 through 652-N (where N is a natural number of at least 3), a system manager device 653, a resource manager device 654, and a policy manager device 655.

Each of the slave devices 652-1 through 652-N may store a data block. For instance, data transmitted via the communication network 631 may be divided into data blocks by the master device 651. The data blocks may be stored in the slave devices 652-1 through 652-N in a distributed manner. When the distribution server system 650 is driven based on the HDFS, each of the slave devices 652-1 through 652-N may execute, as a data node, a task tracker to store at least one data block.

The master device 651 may divide data transmitted via the communication network 631 into data blocks. The master device 651 may provide each of the data blocks for at least one of the slave devices 652-1 through 652-N. When the distribution server system 650 is driven based on the HDFS, the master device 651 may execute, as a name node, a job tracker to schedule the distribution of the data blocks. The master device 651 may manage distributed storage information indicating a stored position of each of the data blocks that have been distributed. The master device 651 may process a data write request and a data read request based on the distributed storage information.

The system manager device 653 may control and manage the overall operation of the distribution server system 650. The resource manager device 654 may manage the resource usage of each of elements included in the distribution server system 650. The policy manager device 655 may manage a policy on an access to each of the IoT devices 610, 620, 630, and 640 which are accessible via the communication network 631.

Each of the master device 651, the slave devices 652-1 through 652-N, the system manager device 653, the resource manager device 654, and the policy manager device 655 may include a universal computer such as a personal computer (PC) and/or a dedicated computer such as a workstation and may include hardware modules for realizing a unique function. Each of the master device 651, the slave devices 652-1 through 652-N, the system manager device 653, the resource manager device 654, and the policy manager device 655 may perform a unique function by running software or firmware using a processor core.

As shown in FIG. 10, the master device 651 and the slave devices 652-1 through 652-N may share the communication network 631 with the IoT devices 610, 620, 630, and 640 and may communicate data (or a data block) with one another via the communication network 631.

Figure 11:
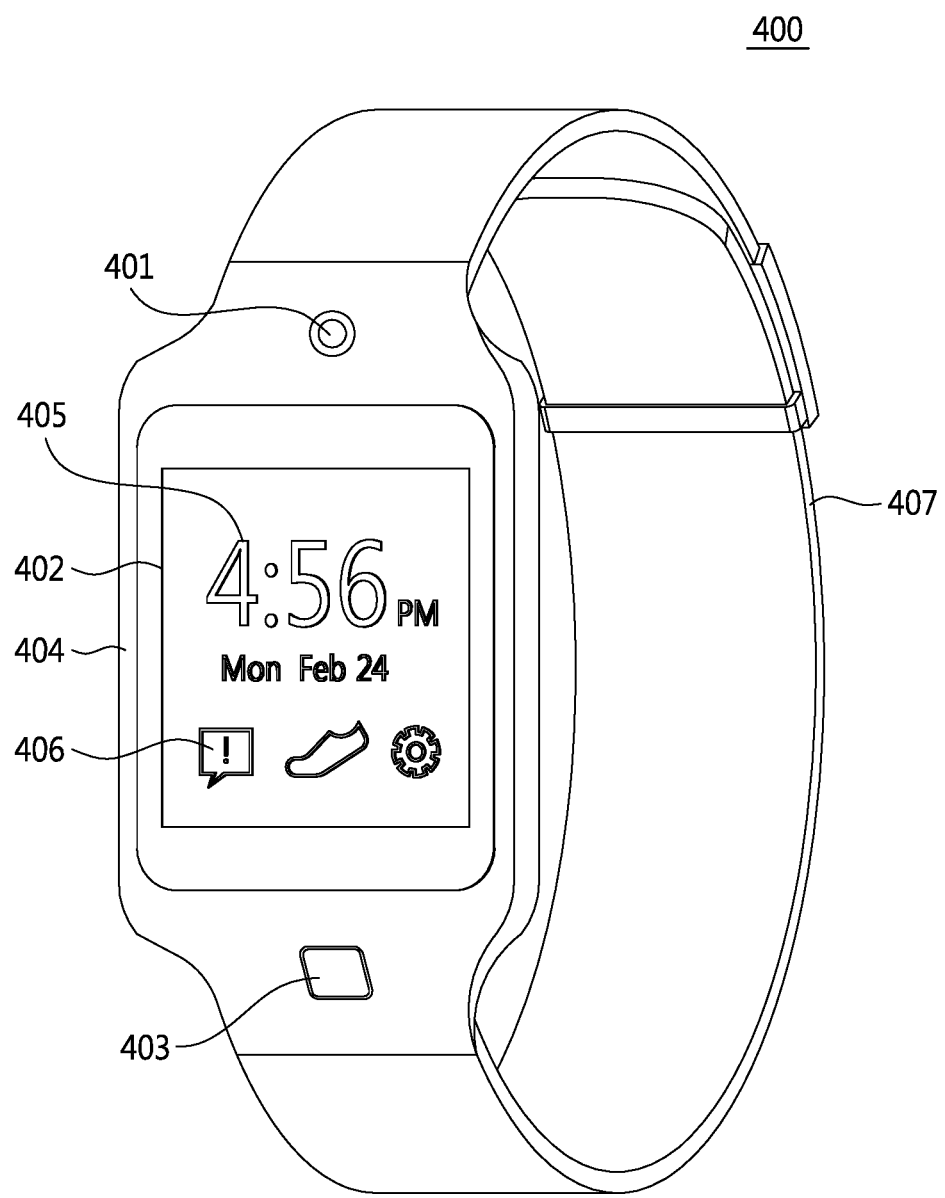
FIG. 11 is a diagram of an example of the IoT device illustrated in FIG. 1.

FIG. 11 is a diagram of an example of the IoT device 400 illustrated in FIG. 1. Referring to FIG. 11, the IoT device 400 may include at least one sensor 401 and the elements 410, 430, 450, 470, and 490 illustrated in FIG. 1. The at least one sensor 401 may gather and transmit surrounding information to the processing circuit 450. The at least one sensor

401 may sense at least one element among ambient temperature, ambient illumination, ultraviolet (UV) index, the moving speed of the IoT device 400, the slope of the IoT device, and an image. The position of the sensor 401 may be determined depending on sensing conditions. For instance, when the sensor 401 is a sensor for measuring a user's heart rate, the sensor 401 may be positioned to measure the user's heart rate. When the sensor 401 is a sensor for measuring a UV index, the sensor 401 may be positioned to sense the light.

The IoT device 400 may also include a display 402. The display 402 may display status information 405 of the IoT device 400. The display 402 may include a touch sensor or a touch screen. The display 402 may sense the position, direction and type of a touch made by a user using the touch sensor or the touch screen. The display 402 may include an input or an output for user interface. For instance, the display 402 may display at least one icon 406 and a menu for input/output. A user may be allowed to control the IoT device 400 through the touch sensor and the user interface.

The IoT device 400 may also include a button 403 used as an input unit. A user may be allowed to change the IoT device 400 into an operable state using the button 403 or turn on the display 402.

The IoT device 400 may also include a housing 404 which supports the sensor 401, the display 402, and the button 403. The housing 404 may be attached to a particular object using a support 407. The support 407 may be a wrist band. Although a smart watch is illustrated as an example of the IoT device 400 in FIG. 11, the IoT device 400 illustrated in FIG. 11 may be used as the first controller 300 illustrated in FIG. 1.

FIG. 12 is a diagram of examples of the IoT devices 610, 620, 630, and 640 illustrated in FIG. 8, 9, or 10. Referring to FIGS. 8 through 10 and FIG. 12, at least one of the IoT devices 610, 620, 630, and 640 may include at least one of the sensors which will be described with reference to FIG. 12. At least one of the IoT devices 610, 620, 630, and 640 may gather data using at least one of the sensors illustrated in FIG. 12 or send the data to an external device or another IoT device through a wired or wireless communication interface.

A sensor may sense various types of signals or information (e.g., a chemical signal and an electrical signal) generated in the outside or inside of an IoT device and generate sensing information. For instance, the sensor may sense the environment information of a building or vehicle including an IoT device or may sense information related to the location of the vehicle, the operating state of the vehicle, and/or the state of internal components of the vehicle. The sensor may be attached to a wearable IoT device to sense the surrounding environment of a user of the wearable IoT device and/or the user's biometric information.

An IoT device may include at least one sensor. Referring to FIG. 12, the IoT device may include an environment sensor 710, a security sensor 720, a biosensor 730, a motion detection sensor 740, and/or a safety sensor 750. The environment sensor 710 is a sensor for sensing an external environment of an object. The environment sensor 710 may sense internal and external environments of a building and a machine or the internal and external environments of the IoT device. The environment sensor 710 may include a temperature sensor, a humidity sensor, a luminance sensor, and a barometer.

The security sensor 720 is a sensor for sensing an external approach to an object (e.g., a building, a vehicle, or an electronic device). The security sensor 720 may include an iris recognition sensor, a fingerprint recognition sensor, a motion sensor, and a voice recognition sensor.

The biosensor 730 is a sensor for measuring bio-information of a living thing (e.g., a human being, an animal, or a plant). The biosensor 730 may include a brainwave sensor, a blood glucose sensor, a heart rate sensor, a respiration sensor, a body temperature sensor, and a blood vessel sensor.

The motion detection sensor 740 is a sensor for sensing a motion or position of a moving object (e.g., a vehicle, a human being, an IoT device, or a mobile device). The motion detection sensor 740 may include an acceleration sensor, a torque sensor, a gesture sensor, and a touch sensor.

The safety sensor 750 is a sensor for sensing heat around an object, chemical substance around the object, and an approach of a thing. The safety sensor 750 may include a gas detection sensor, a heat detection sensor, a proximity sensor, and a vibration sensor.

Although various sensors are classified by functions in the exemplary embodiments illustrated in FIG. 12, the inventive concept is not restricted thereto. Each of the sensors 710, 720, 730, 740, and 750 may include a physical sensor and/or a virtual sensor. The physical sensor may sense a physical signal, a bio signal or a chemical signal to generate an electrical signal. The virtual sensor may process the sensing information received from the physical sensor to extract new sensing information.

For example, the biosensor 730 such as a respiration sensor, a body temperature sensor, or a heart rate sensor may be the physical sensor, and the virtual sensor may be a sensor which extracts a user's bio-stability as sensing information using sensing information provided by the biosensor 730. In another example, the virtual sensor may be a sensor which generates the degree of comfortableness of the interior of a building as sensing information from sensing information provided by the environment sensor 710.

Figure 13:
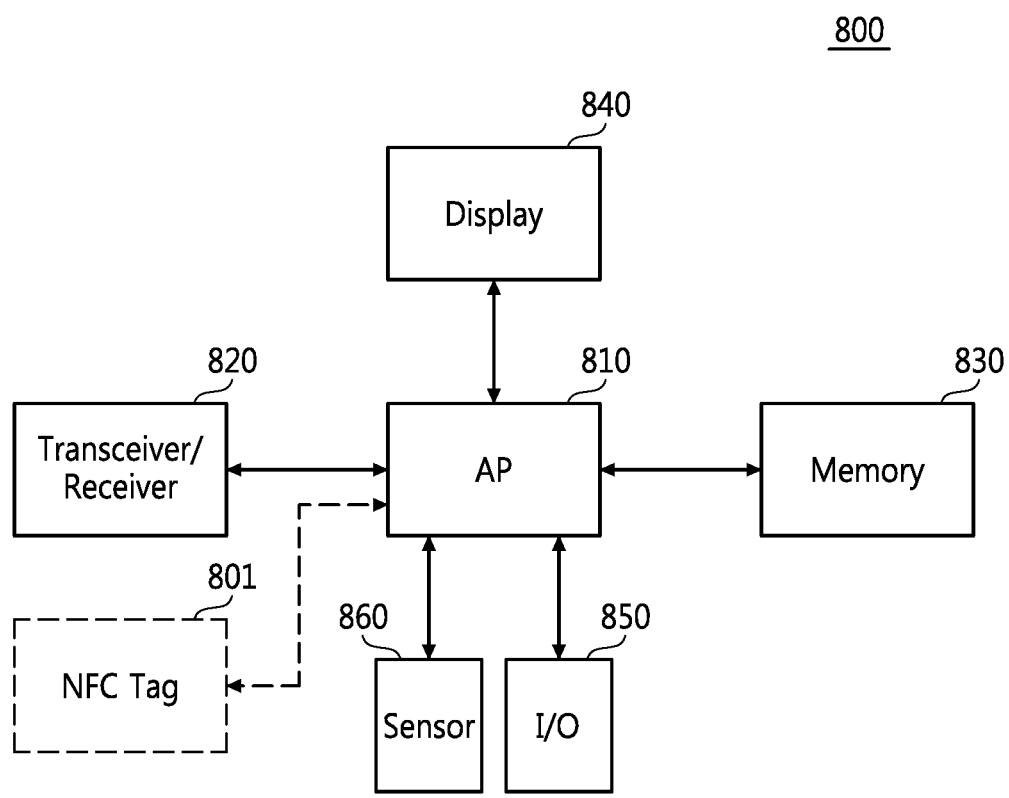
FIG. 13 is a diagram of a semiconductor device which may be implemented as the hub, the first controller, or the IoT device illustrated in FIG. 1 according to an exemplary embodiment.

FIG. 13 is a diagram of a semiconductor device 800 which may be implemented as the hub 200, the first controller 300, or the IoT device 400 illustrated in FIG. 1 according to an exemplary embodiment. Referring to FIGS. 1 through 13, the semiconductor device 800 may be the hub 200, the first controller 300, the IoT device 400, or the second controller 500.

When the semiconductor device 800 is a hardware block of the hub 200, an NFC tag 801 illustrated in FIG. 13 may correspond to the NFC tag 210 illustrated in FIG. 1, an application processor (AP) 810 illustrated in FIG. 13 may correspond to the processing circuit 230 illustrated in FIG. 1, a memory 830 illustrated in FIG. 13 may correspond to the secure element 270 and the memory 290 illustrated in FIG. 1, and a radio transceiver/receiver 820 illustrated in FIG. 13 may correspond to the radio transceiver 250 illustrated in FIG. 1.

When the semiconductor device 800 is a hardware block of the first controller 300, the AP 810 illustrated in FIG. 13 may correspond to the processing circuit 330 illustrated in FIG. 1, the memory 830 illustrated in FIG. 13 may correspond to the memory 350 illustrated in FIG. 1, and the radio transceiver/receiver 820 illustrated in FIG. 13 may correspond to the radio transceiver 310 illustrated in FIG. 1. When the semiconductor device 800 is a hardware block of the second controller 500, the AP 810 illustrated in FIG. 13 may correspond to the processing circuit 530 illustrated in FIG. 1, the memory 830 illustrated in FIG. 13 may correspond to the memory 550 illustrated in FIG. 1, and the radio transceiver/receiver 820 illustrated in FIG. 13 may correspond to the radio transceiver 510 illustrated in FIG. 1.

When the semiconductor device 800 is a hardware block of the IoT device 400, the NFC tag 801 illustrated in FIG. 13 may correspond to the NFC tag 410 illustrated in FIG. 1, the AP 810 illustrated in FIG. 13 may correspond to the processing circuit 450 illustrated in FIG. 1, the memory 830 illustrated in FIG. 13 may correspond to the secure element 470 and the memory 490 illustrated in FIG. 1, and the radio transceiver/receiver 820 illustrated in FIG. 13 may correspond to the radio transceiver 410 illustrated in FIG. 1.

The semiconductor device 800 may include the communication interface 820 for communication with an external device. The communication interface 820 may be a modem communication interface which can be connected to LAN, WLAN such as Wi-Fi, WPAN such as Bluetooth, wireless USB, ZigBee, NFC, RFID, PLC, or a mobile cellular network. The communication interface 820 may include a transceiver or a receiver. The semiconductor device 800 may communicate data with an external device through the communication interface 820. The AP 810 may control the operation of the communication interface 820.

The semiconductor device 800 may include the processor or AP 810 which performs computation. As described above, the AP 810 may perform the functions of the processing circuit 230, 330, 450, or 530.

The semiconductor device 800 may have an embedded rechargeable battery or may include a power supply circuit which externally receives power. The semiconductor device 800 may also include a display 840 which displays data or the internal status of the semiconductor device 800. A user may control the semiconductor device 800 using the user interface (UI) of the display 840. The semiconductor device 800 may transmit the internal status and/or data to an external device and may receive a control command and/or data from the external device through the communication interface 820.

The memory 830 may store a control instruction code, control data, or user data for controlling the semiconductor device 800. The memory 830 may include at least one memory among volatile memory and non-volatile memory. The semiconductor device 800 may also include a storage device, which may be implemented as a hard disk drive (HDD), a solid state disk (SSD), an embedded multimedia card (eMMC), or a universal flash storage (UFS). The memory 830 or the storage device may store information provided through an input/output (I/O) device 850 and/or sensing information gathered through a sensor 860. The sensor 860 may include at least one of the sensors illustrated in FIG. 12.

Figure 14:
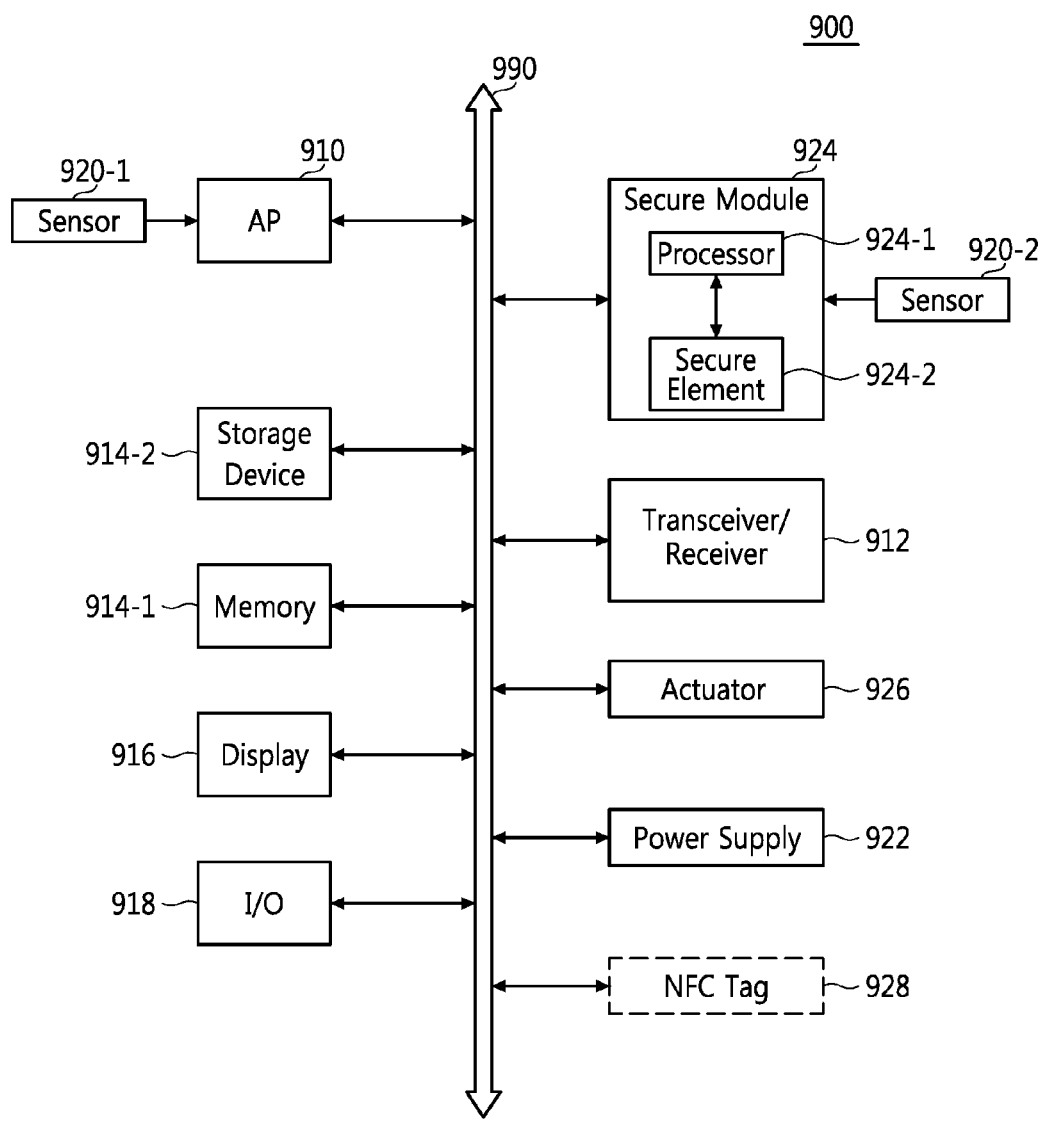
FIG. 14 is a diagram of a semiconductor device which may be implemented as the hub, the first controller, or the IoT device illustrated in FIG. 1 according to another exemplary embodiment.

FIG. 14 is a diagram of a semiconductor device 900 which may be implemented as the hub 200, the first controller 300, or the IoT device 400 illustrated in FIG. 1 according to another exemplary embodiment. Referring to FIGS. 1 through 12 and FIG. 14, the semiconductor device 900 may be the hub 200, the first controller 300, the IoT device 400, or the second controller 500.

Here, a module or a secure element may be hardware (or a hardware component) that can perform functions and/or operations corresponding to their names, software (or a software component) that can execute particular functions and/or operations, or an electronic recording medium (e.g., a processor or a central processing unit (CPU)) equipped with a computer program code which can execute particular functions and/or operations, but the inventive concept is not restricted thereto. The module or secure element may be hardware for realizing the inventive concept or the functional and/or structural combination of the hardware and software for driving the hardware.

An AP 910 may correspond to the processing circuit 230, 330, 450, or 530 illustrated in FIG. 1, a communication interface 912 may correspond to the radio transceiver 250, 310, 410, or 510 illustrated in FIG. 1, a secure element 924-2 may correspond to the secure element 270 or 470 illustrated in FIG. 1, an NFC tag 928 may correspond to the NFC tag 210 or 430 illustrated in FIG. 1, and a memory 914-1 may correspond to memory 290, 350, 490, or 550 illustrated in FIG. 1.

Referring to FIG. 14, the semiconductor device 900 may include the AP 910, the communication interface 912, the memory 914-1, a storage device 914-2, a display 916, an I/O device 918, at least one sensor 920-1 and 920-2, a secure module 924, an actuator 926, a power supply 922, the NFC tag 928, and a bus 990. The elements 910, 912, 914-1, 914-2, 916, 918, 920-1, 920-2, 924, 926, and 928 may communicate a command and/or data with one another via the bus 990.

The AP 910 may control the overall operation of the semiconductor device 900. The AP 910 may perform the functions of the processing circuit 230, 330, 450, or 530 described with reference to FIGS. 1 through 7. The AP 910 may execute an application providing internet browser, game, or moving image. The AP 910 may include a single-core or a multi-core, such as dual-core, quad-core, hexa-core or octa-core. The AP 910 may also include a cache memory.

The communication interface 912 may be a modem communication connectable to LAN, WLAN such as Wi-Fi, WPAN such as Bluetooth, wireless USB, ZigBee, NFC, RFID, PLC, or mobile cellular network. The communication interface 912 may include a transceiver or a receiver. The semiconductor device 900 may communicate data with an external device through the communication interface 912. The AP 910 may control the operation of the communication interface 912.

The memory 914-1 may store data necessary for the operation of the semiconductor device 900. The memory 914-1 may include volatile memory and/or non-volatile memory. The volatile memory may be RAM, DRAM, or SRAM. The non-volatile memory may be read-only memory (ROM), programmable ROM (PROM), electrically programmable ROM (EPROM), EEPROM, flash memory, RRAM, MRAM, RRAM, or FeRAM.

The storage device 914-2 may store a boot image for booting the semiconductor device 900. The storage device 914-2 may be implemented as an HDD, an SSD, an MMC, an eMMC, or a UFS. The display 916 may display data processed by the semiconductor device 900 or may provide UI or graphical UI (GUI) for a user. The I/O device 918 may include an input unit such as a touch pad, a keypad, or an input button, and an output unit such as a speaker.

The sensor 920-1 may be a complementary metal-oxide semiconductor (CMOS) image sensor. The sensor 920-1 may transmit image data generated in the CMOS image sensor to the AP 910. The sensor 920-2 may be a biosensor which detects biometric information. For instance, the sensor 920-2 may detect fingerprint, iris pattern, vein pattern, heart rate, or blood glucose, may generate detection data corresponding to the detection result, and may provide the detection data for a processor 924-1 of the secure module 924. However, the sensor 920-2 is not restricted to the biosensor and may be a luminance sensor, an acoustic sensor, or an acceleration sensor. The at least one sensor 920-1 and 920-2 may include at least one of the sensors illustrated in FIG. 12.

The secure module 924 may include the processor 924-1 and a secure element 924-2. The secure module 924 may be formed in a single package and a bus connecting the processor 924-1 and the secure element 924-2 may be formed within the package. The secure element 924-2 may have a function of defending against external attacks (e.g., lab attacks) and thus be used to safely store secure data. The processor 924-1 may communicate data with the AP 910. For instance, the secure module 924 may store data generated during first secure pairing and/or second secure pairing.

The secure module 924 and the AP 910 may generate a session key through mutual authentication. The secure module 924 may encrypt data using the session key and transmit the encrypted data to the AP 910. The AP 910 may decrypt the encrypted data using the session key and may generate decrypted detection data. Accordingly, the security level of data transmission in the semiconductor device 900 is increased. The secure element 924-2 may be formed in a single package together with the AP 910.

The processor 924-1 of the secure module 924 may encrypt detection data output from the sensor 920-2 and may store the encrypted data in the secure element 924-2. The processor 924-1 may control communication between the AP 910 and the secure element 924-2.

The actuator 926 may include various elements necessary for the physical driving of the semiconductor device 900. For instance, the actuator 926 may include a motor driving circuit and a motor controlled by the motor driving circuit. The power supply 922 may provide an operating voltage necessary for the operation of the semiconductor device 900. The power supply 922 may include a battery.

Figure 15:
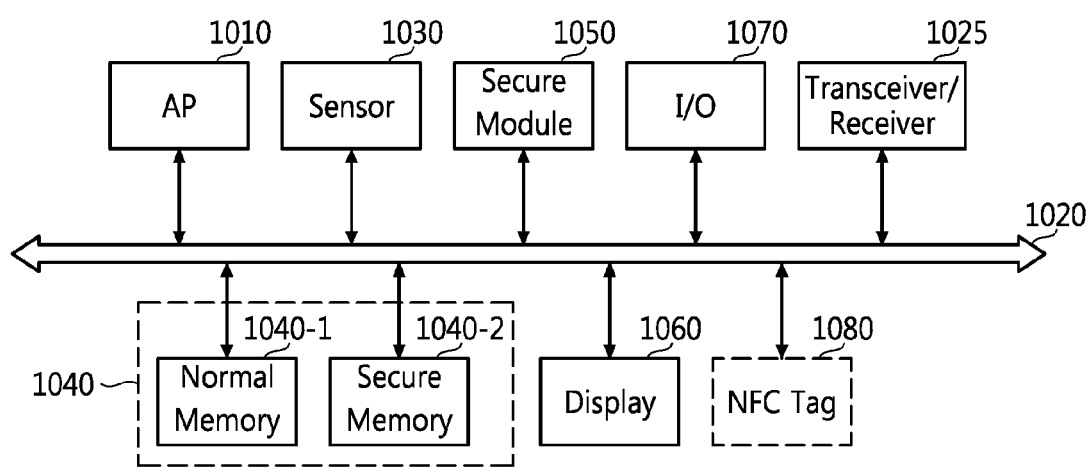
FIG. 15 is a diagram of a semiconductor device which may be implemented as the hub, the first controller, or the IoT device illustrated in FIG. 1 according to another exemplary embodiment.

FIG. 15 is a diagram of a semiconductor device 1000-1 which may be implemented as the hub 200, the first controller 300, or the IoT device 400 illustrated in FIG. 1 according to another exemplary embodiment. Referring to FIGS. 1 through 12 and FIG. 15, the semiconductor device 1000-1 may be the hub 200, the first controller 300, the IoT device 400, or the second controller 500.

An AP 1010 may correspond to the processing circuit 230, 330, 450, or 530 illustrated in FIG. 1, a secure module 1050 may correspond to the secure element 270 or 470 illustrated in FIG. 1, an NFC tag 1080 may correspond to the NFC tag 210 or 430 illustrated in FIG. 1, and a memory 1040 may correspond to memory 290, 350, 490, or 550 illustrated in FIG. 1. A communication interface 1025 connected to a bus 1020 may correspond to the radio transceiver 250, 310, 410, or 510 illustrated in FIG. 1.

Referring to FIG. 15, the semiconductor device 1000-1 may include the AP 1010, the bus 1020, a sensor 1030, the memory 1040 including a normal memory 1040-1 and a secure memory 1040-2, the secure module 1050, a display 1060, an I/O device 1070, and the NFC tag 1080. The elements 1010, 1030, 1040, 1050, 1060, 1070, and 1080 may communicate data with one another via the bus 1020.

The AP 1010 may control the overall operation of the semiconductor device 1000-1. The AP 1010 illustrated in FIG. 15 may perform functions substantially the same as or similar to those performed by the AP 910 illustrated in FIG. 14. The sensor 1030 illustrated in FIG. 15 may perform functions substantially the same as or similar to those performed by the sensor 920-1 or 920-2 illustrated in FIG. 14.

The normal memory 1040-1 may store data necessary for the operation of the semiconductor device 1000-1. The normal memory 1040-1 may be formed of volatile memory or non-volatile memory which stores data that does not require security. The secure memory 1040-2 may store data that requires security in the operation of the semiconductor device 1000-1. For instance, the secure memory 1040-2 may store data generated during first secure pairing and/or second secure pairing. Although the normal memory 1040-1 and the secure memory 1040-2 are separated from each other in the exemplary embodiment illustrated in FIG. 15, the normal memory 1040-1 and the secure memory 1040-2 may be formed in a single physical memory. The memory 1040 including the normal memory 1040-1 and the secure memory 1040-2 may be removably coupled to the semiconductor device 1000-1.

The structure and functions of the secure module 1050 illustrated in FIG. 15 may be the same as or similar to those of the secure module 924 illustrated in FIG. 14. The display 1060 may display data. For instance, the display 1060 may display data output from the sensor 1030 or display data output from the AP 1010. The I/O device 1070 may include an input unit such as a touch pad, a keypad, or an input button, and an output unit such as a speaker.

Figure 16:
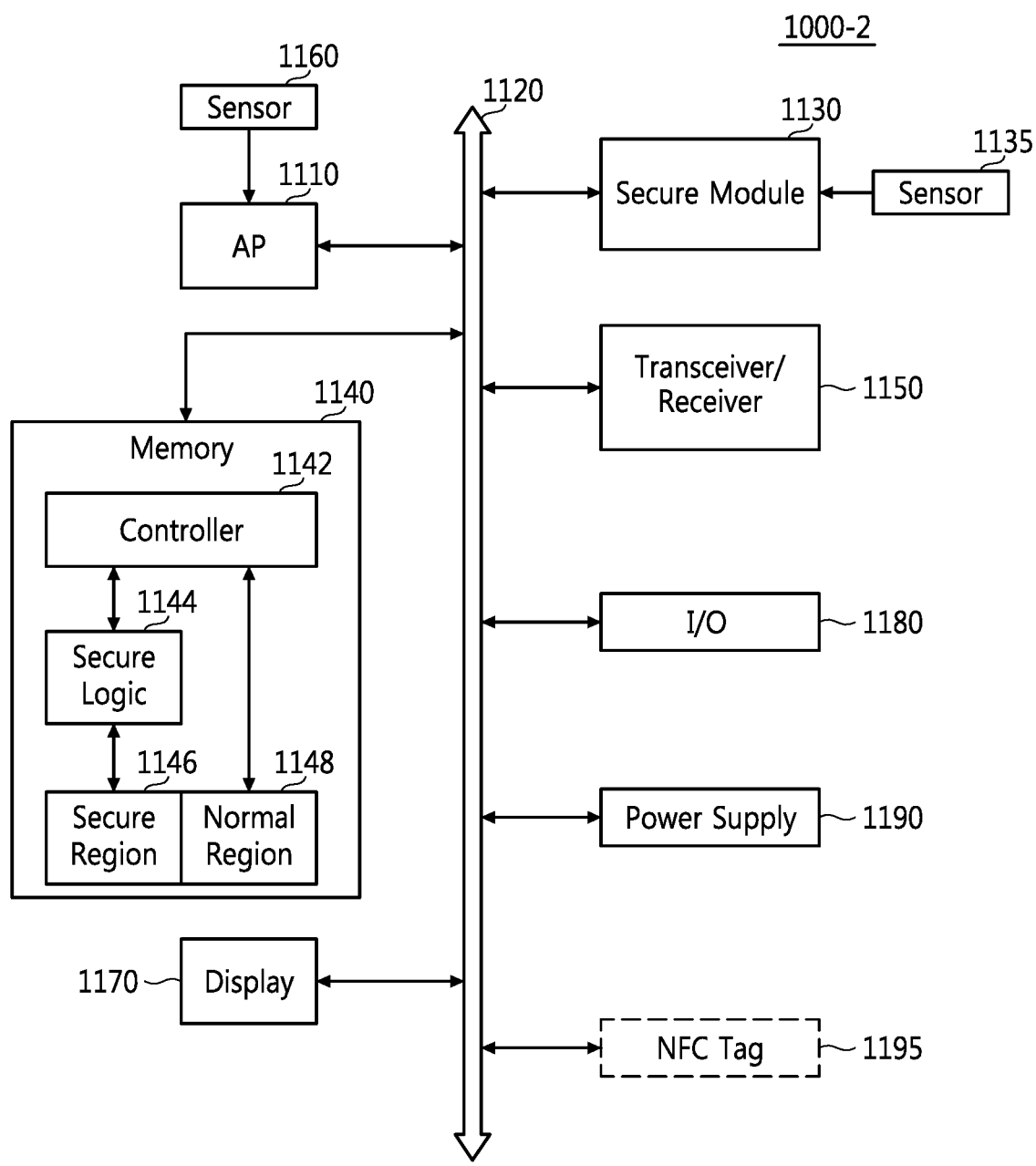
FIG. 16 is a diagram of a semiconductor device which may be implemented as the hub, the first controller, or the IoT device illustrated in FIG. 1 according to another exemplary embodiment.

FIG. 16 is a diagram of a semiconductor device 1000-2 which may be implemented as the hub 200, the first controller 300, or the IoT device 400 illustrated in FIG. 1 according to another exemplary embodiment. Referring to FIGS. 1 through 12 and FIG. 16, the semiconductor device 1000-2 may be the hub 200, the first controller 300, the IoT device 400, or the second controller 500.

An AP 1110 may correspond to the processing circuit 230, 330, 450, or 530 illustrated in FIG. 1, a secure module 1130 may correspond to the secure element 270 or 470 illustrated in FIG. 1, an NFC tag 1195 may correspond to the NFC tag 210 or 430 illustrated in FIG. 1, and a memory 1140 may correspond to the memory 290, 350, 490, or 550 illustrated in FIG. 1. A communication interface 1150 may correspond to the radio transceiver 250, 310, 410, or 510 illustrated in FIG. 1.

Referring to FIG. 16, the semiconductor device 1000-2 may include the AP 1110, a data bus 1120, the secure module 1130, the memory 1140, the communication interface 1150, at least one sensor 1135 and 1160, a display 1170, an I/O device 1180, a power supply 1190, and the NFC tag 1195. The elements 1110, 1130, 1140, 1150, 1170, 1180, and 1195 may communicate data with one another via the bus 1120.

The AP 1110 may control the overall operation of the semiconductor device 1000-2. The AP 1110 illustrated in FIG. 16 may perform functions substantially the same as or similar to those performed by the AP 910 illustrated in FIG. 14.

The sensor 1160 may be a CMOS image sensor. Image data output from the CMOS image sensor may be transmitted to the AP 1110. The sensor 1135 may be a biosensor for sensing biometric information. The sensor 1135 illustrated in FIG. 16 may perform functions substantially the same as or similar to those performed by the sensor 920-2 illustrated in FIG. 14. The structure and functions of the secure module 1130 may be substantially the same as or similar to those of the secure module 824 illustrated in FIG. 14.

The memory 1140 may store a boot image for booting the semiconductor device 1000-2. The memory 1140 may be implemented as flash memory, SSD, eMMC, or UFS. The memory 1140 may include a secure region 1146 and a normal region 1148. A controller 1142 may directly access the normal region 1148 but may access the secure region 1146 via a secure logic circuit 1144. In other words, the controller 1142 can access the secure region 1146 only via the secure logic circuit 1144.

The secure module 1130 may store data output from the sensor 1135 in the secure region 1146 of the memory 1140 through communication with the secure logic circuit 1144 of the memory 1140. The communication interface 1150 may be a modem communication connectable to LAN, WLAN such as Wi-Fi, WPAN such as Bluetooth, wireless USB, ZigBee, NFC, RFID, PLC, or mobile cellular network.

The display 1170 may display data. For instance, the display 1170 may display data output from the sensor 1160 or display data output from the AP 1110. The I/O device 1180 may include an input unit such as a touch pad, a keypad, or an input button, and an output unit such as a speaker. The power supply 1190 may provide an operating voltage necessary for the operation of the semiconductor device 1000-2.

The NFC tag 801, 928, 1080, or 1195 illustrated in FIG. 13, 14, 15, or 16 may be included within the semiconductor device 800, 900, 1000-1, or 1000-2. Information stored in the NFC tag 801, 928, 1080, or 1195 may be processed by the AP 810, 910, 1010, or 1110. Alternatively, the NFC tag 801, 928, 1080, or 1195 may be attached to the external surface of the semiconductor device 800, 900, 1000-1, or 1000-2.

Figure 17:
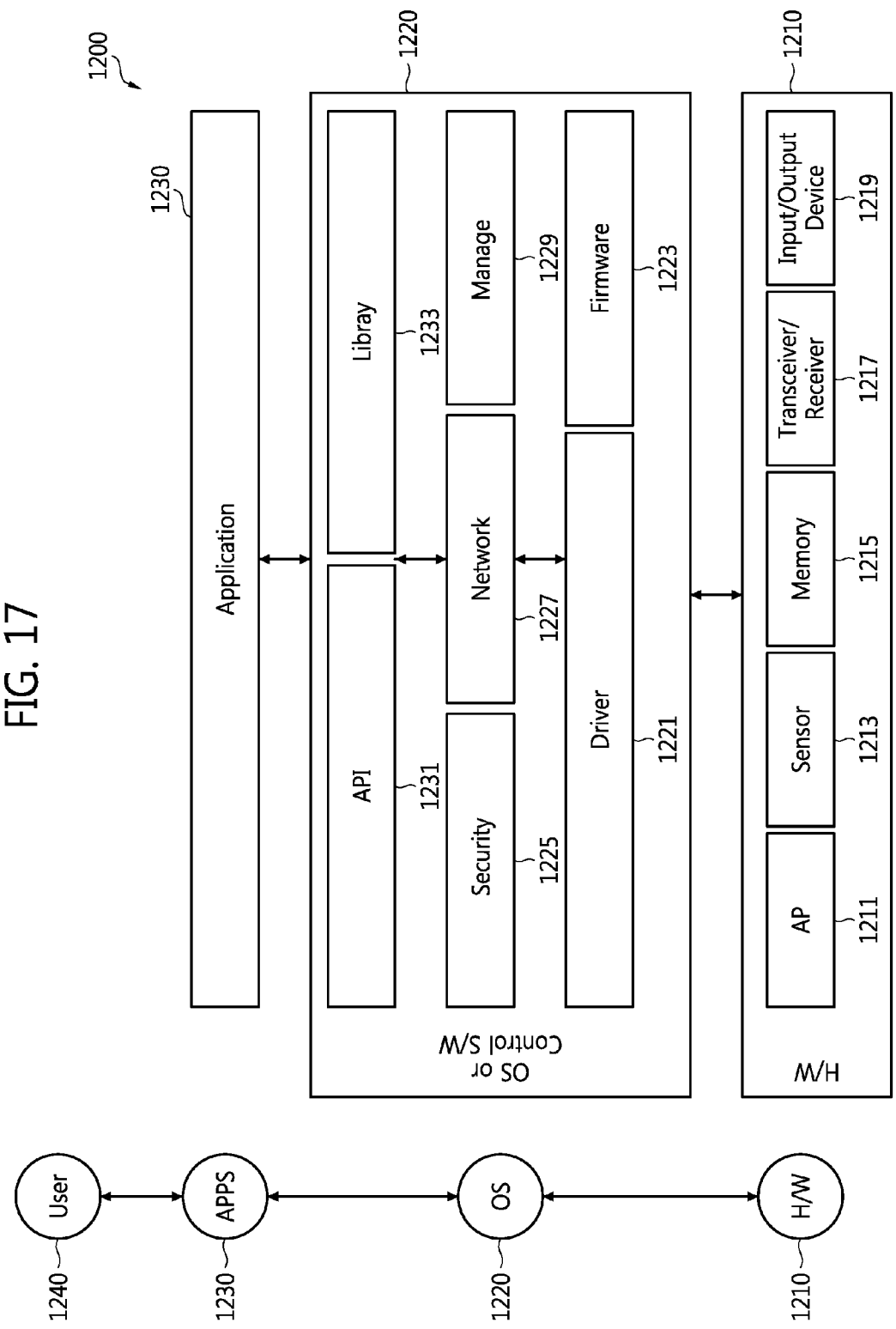
FIG. 17 is a conceptual diagram of the hardware and software of the hub, the first controller, or the IoT device illustrated in FIG. 1 according to an exemplary embodiment.

FIG. 17 is a conceptual diagram of the hardware and software of the hub 200, the first controller 300, or the IoT device 400 illustrated in FIG. 1 according to an exemplary embodiment. Referring to FIGS. 1 through 17, a semiconductor device 1200 may be the hub 200, the first controller 300, the IoT device 400, or the second controller 500.

Referring to FIG. 17, the semiconductor device 1200 may include various kinds of components. The semiconductor device 1200 may include an AP 1211, a sensor 1213, a memory 1215, a communication interface 1217, and an I/O device 1219. The processing circuit 230, 330, 450, or 530 or the AP 810, 910, 1010, or 1110 may correspond to the AP 1211. The sensor 860, 920-1, 920-2, 1030, 1135, or 1160 may correspond to the sensor 1213. The memory 290, 350, 490, 550, 830, 914-1, 1040, or 114, the secure element 270 or 470, or the secure module 924, 1050, or 1130 may correspond to the memory 1215. The radio transceiver 250, 310, 410, or 510 or the communication interface 820, 912, or 1150 may correspond to the communication interface 1217.

The semiconductor device 1200 may also include an operating system (OS) 1220 and an application 1230. FIG. 17 shows the layers of hardware 1210, the OS 1220, the application 1230, and a user 1240.

The application 1230 may refer to software and service which performs a particular function. The user 1240 may refer to an object using the application 1230. The user 1240 may communicate with the application 1230 using UI.

The application 1230 may be created based on a service purpose and may interact with the user 1240 through the UI corresponding to the service purpose. The application 1230 may perform an operation requested by the user 1240 and may call the content of a library 1233 and an application protocol interface (API) 1231.

The API 1231 and/or the library 1233 may perform a macro operation for a particular function or, when communication with a lower layer is necessary, may provide interface. When the application 1230 requests a lower layer to operate through the API 1231 and/or the library 1233, the API 1231 and/or the library 1233 may classify the request as a security 1225, a network 1227, or a manager 1229.

The API 1231 and/or the library 1233 may run a necessary layer according to the request. For instance, when the application 1230 requests a function related with the network 1227, the API 1231 may transmit a parameter necessary for the network 1227 to the network 1227 and may call the relevant function. The network 1227 may communicate with a relevant lower layer to perform a requested task. When there is no lower layer, the API 1231 and/or the library 1233 may perform the task by itself.

A driver 1221 may manage the hardware 1210 and monitor the state of the hardware 1210. The driver 1221 may receive a classified request from an upper layer and may deliver the request to the layer of the hardware 1210.

When the driver 1221 requests the layer of the hardware 1210 to perform a task, firmware 1223 may convert the request so that the layer of the hardware 1210 can accept the request. The firmware 1223 which transmits the converted request to the hardware 1210 may be included in the driver 1221 or executed by the hardware 1210.

The semiconductor device 1200 may include the API 1231, the driver 1221, and the firmware 1223 and may be equipped with an OS that manages these elements. The OS may be stored in the memory 1215 in a form of control command codes and data. When the semiconductor device 1200 is a low-price product, the semiconductor device 1200 may include control software instead of the OS since the size of the memory 1214 is small.

The hardware 1210 may execute requests (or commands) received from the driver 1221 and/or the firmware 1223 in order or out of order and may store the results of executing the requests in an internal register (not shown) of the hardware 1210 or in the memory 1215. The results that have been stored may be returned to the driver 1221 and/or the firmware 1223.

The hardware 1210 may generate an interrupt to request an upper layer to perform an operation. When the interrupt is generated, the interrupt is checked in the manager 1229 of the OS 1220 and processed by the hardware 1210.

Figure 18:
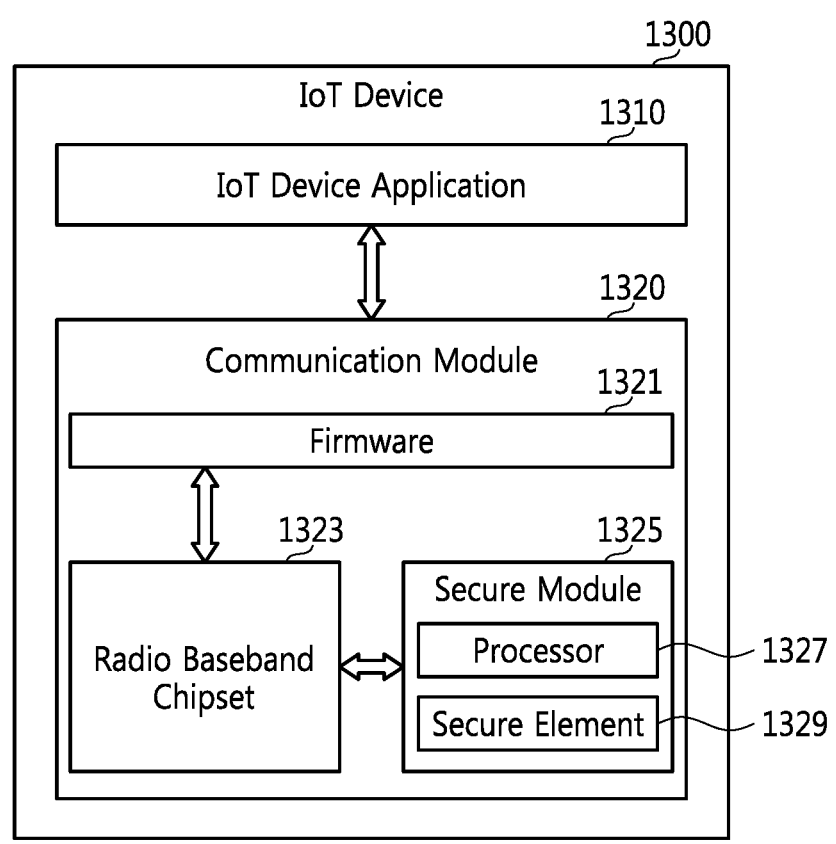
FIG. 18 is a conceptual diagram of the hardware and software of the hub, the first controller, or the IoT device illustrated in FIG. 1 according to another exemplary embodiment.

FIG. 18 is a conceptual diagram of the hardware and software of the hub 200, the first controller 300, or the IoT device 400 illustrated in FIG. 1 according to another exemplary embodiment. Referring to FIGS. 1 through 18, an IoT device 1300 may be the hub 200, the first controller 300, the IoT device 400, or the second controller 500. The IoT device 1300 may include an IoT device application 1310 and a communication module 1320. The communication module 1320 may include a firmware 1321, a radio baseband chipset 1323 and a secure module 1325.

The IoT device application 1310, as a software component, may control the communication module 1320 and may be executed by a CPU of the IoT device 1300. The CPU may be included in the processing circuit 230, 330, 450, or 530 such as an AP. The communication module 1320 may be a modem communication connectable to LAN, WLAN such as Wi-Fi, WPAN such as Bluetooth, wireless USB, ZigBee, NFC, RFID, PLC, or mobile cellular network. The communication module 1320 may correspond to the radio transceiver 250, 310, 410, or 510 or the communication interface 820, 912, 1150, or 1217.

The firmware 1321 may provide the IoT device application 1310 and application programming interface and may control the radio baseband chipset 1323 according to the control of the IoT device application 1310. The radio baseband chipset 1323 may provide connectivity for a wireless communication network. The secure module 1325 may include a processor 1327 and a secure element 1329. The secure module 1325 may authenticate the IoT device 1300 in order to connect to the wireless communication network or to access a wireless network service. The secure module 1325 may be implemented as an eMMC. The secure element 1329 may correspond to the secure element 270 or 470 illustrated in FIG. 1.

Figure 19:
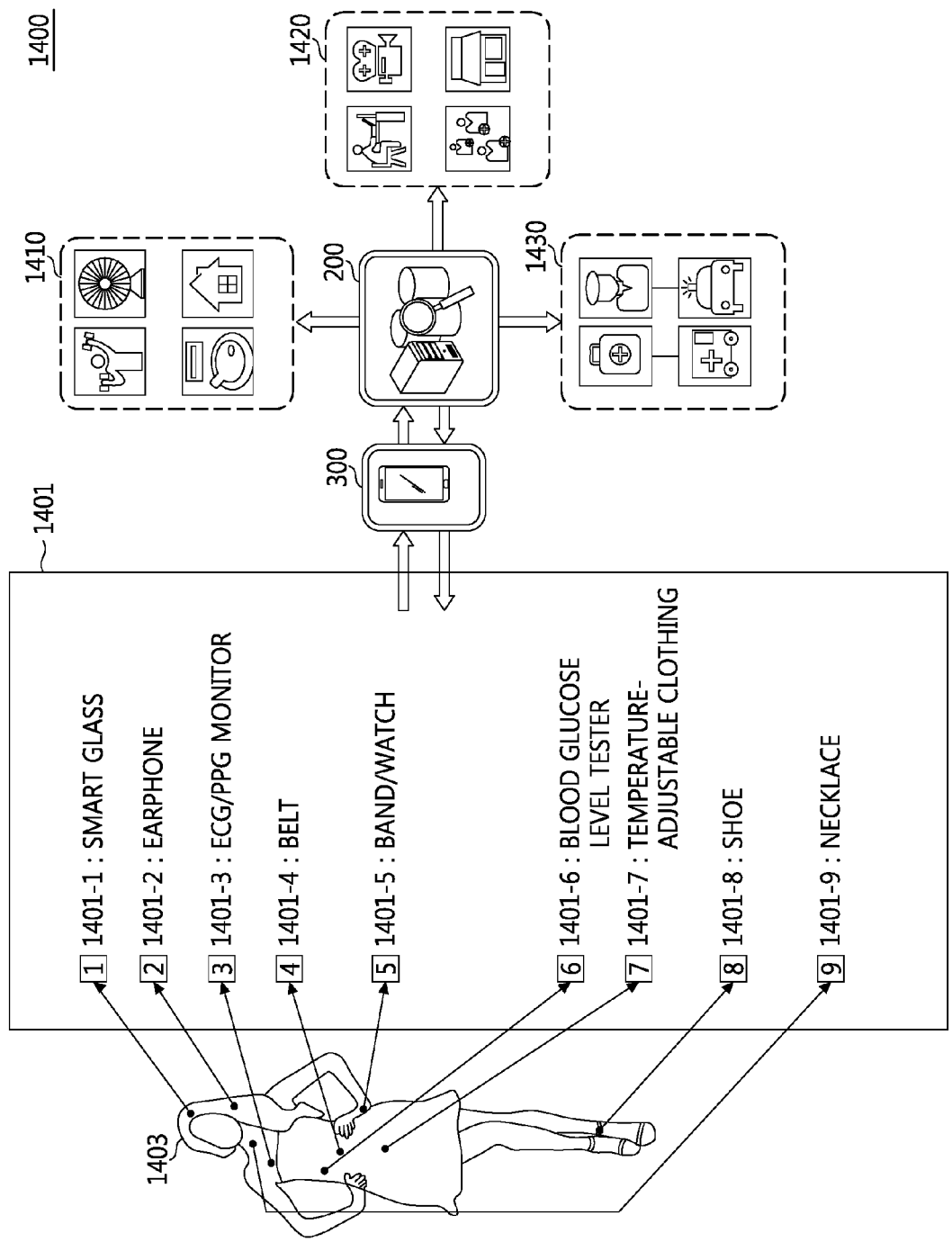
FIG. 19 is a block diagram of an IoT network system according to another exemplary embodiment.

FIG. 19 is a block diagram of an IoT network system 1400 according to another exemplary embodiment. The IoT network system 1400 may be any one of various service systems in which wearable IoT devices can be used. FIG. 19 shows a usage scenario for health, personal safety, social network service (SNS), information provision, smart home service, and so on. Referring to FIG. 19, the IoT network system 1400 may include the hub 200, the first controller 300, IoT devices 1401, and service providers 1410, 1420, and 1430. The hub 200 may function as a server and the first controller 300 may function as a gateway.

The IoT devices 1401 may include a smart glass 1401-1, an earphone 1401-2, an electrocardiogram/photoplethysmogram (ECG/PPG) monitor 1401-3, a belt 1401-4, a band/watch 1401-5, a blood glucose level tester 1401-6, temperature-adjustable clothing 1401-7, a shoe 1401-8, and a necklace 1401-9. The IoT devices 1401 may be wearable and may be paired with the hub 200, as described above with reference to FIGS. 4 and 5. Each of the IoT devices 1401 may correspond to the IoT device 400.

Each of the IoT devices 1401 may include a sensor for sensing the health condition of a user 1403, a surrounding environment, and/or a user command. The sensor may include at least one of the sensors illustrated in FIG. 12. Each of the IoT devices 1401 may include a rechargeable or wirelessly rechargeable battery which supplies an operating voltage and may have a radio communication function to wirelessly communicate with an external device. The structure and functions of each of the IoT devices 1401 may be substantially the same as or similar to those of the IoT device 1300 described with reference to FIG. 18.

The first controller 300 functioning as a gateway may tag an NFC tag of each of the IoT devices 1401 to allow each IoT device 1401 to be paired with the hub 200. The first controller 300 may transmit information gathered by at least one of the IoT devices 1401 to the hub 200 functioning as a server through a communication network or may transmit information analyzed by the hub 200 to at least one of the IoT devices 1401. For instance, the first controller 300 may communicate data with the IoT devices 1401 using a wireless communication protocol. The first controller 300 may be a smart phone which can access a radio communication network using Wi-Fi, 3G, or LTE, but the inventive concept is not restricted thereto. The first controller 300 may be connected to the hub 200 through an internet or a radio communication network.

The hub 200 may store the gathered information, may analyze the information and generate relevant service information, or may provide the stored information and/or the analyzed information for the service providers 1410, 1420, and 1430. The service providers 1410, 1420, and 1430 may analyze information received from the hub 200 and may transmit the analysis result to at least one of the IoT devices 1401 through the hub 200 and/or the first controller 300. The user 1403 may use the information transmitted to the at least one of the IoT devices 1401 as a service. Here, the service may refer to providing useful information, giving an alarm, providing personal protection information, or providing control information regarding at least one of the wearable IoT devices 1401.

The smart home service provider 1410 may authenticate user information output from at least one of the wearable IoT devices 1401 and may control IoT devices at home of the user 1403 using a value set in the hub 200. For instance, the smart home service provider 1410 may provide a smart home service which controls IoT devices involved in a cooling/heating system installed at home of the user 1403, IoT devices involved in energy resources (e.g., gas, water, and/or electricity), IoT devices involved in indoor conditions (e.g., lighting, humidity, and/or air cleanness), and/or IoT devices involved in exercise prescription taking the volume of daily activity of the user 1403 into account based on information output from at least one of the wearable IoT devices 1401.

The leisure activity service provider 1420 may receive information from at least one of the wearable IoT devices 1401 through the hub 200 and may provide the user 1403 a service related to the leisure activity of the user 1403 based on the information. For instance, the leisure activity service provider 1420 may receive information about the physical state or location of the user 1403 through the first controller 300 and/or the hub 200, may analyze the information, and may provide the user 1403 food information, shopping information, or restaurant information according to the analysis result.

The health and safety service provider 1430 may receive information from at least one of the wearable IoT devices 1401 through the hub 200, may analyze the state (e.g., the physical condition or the state of mind and body) of the user 1403 based on the information, and may provide an emergency medical service or an emergency public safety service based on the analysis result.

The smart glass 1401-1 may include an eye dryness sensor, an eye blink sensor, an image sensor, a brainwave sensor, a touch sensor, a voice recognition sensor, and/or a GPS sensor, and may sense the surrounding environment of the user 1403, the state of the user 1403, and/or the command of the user 1403 using at least one of the sensors. The sensed information may be transmitted to the hub 200 through the first controller 300 which functions as an access point. The hub 200 may analyze the information and may provide service information generated based on the analysis result for the user 1403. For instance, the hub 200 may transmit electro stimulation information for curing the abnormal brainwave of the user 1403 to the smart glass 1401-1 based on the brainwave information of the user 1403 that has been received.

The earphone 1401-2 may include a temperature sensor, an image sensor, and/or a touch sensor, may sense physical information of the user 1403 using at least one of these sensors, and may transmit the sensed information to the first controller 300 or the hub 200.

The ECG/PPG monitor 1401-3 may measure the ECG of the user 1403 and may transmit the measurement result to the first controller 300 or the hub 200.

The belt 1401-4 may include a sensor for measuring the waist, respiration and/or obesity of the user 1403, and may have a vibration or electro stimulation function for treating the obesity or pain. The band/watch 1401-5 may include a sensor for measuring temperature, air pressure, and/or UV rays. The blood glucose level tester 1401-6 may include a blood glucose meter sensor for measuring the blood glucose level of the user 1403. The blood glucose meter sensor may be a non-invasive sensor. The measured glucose level may be transmitted to the service provider 1410, 1420, or 1430 through the first controller 300 or the hub 200.

The temperature-adjustable clothing 1401-7 may include a sensor for measuring the body temperature or surrounding temperature of the user 1403. The temperature-adjustable clothing 1401-7 may compare a preset temperature with a measured temperature and may control its cooling or heating function according to the comparison result. For instance, the temperature-adjustable clothing 1401-7 may be a diaper for babies, a diaper for adults, or underwear. The diaper or underwear may have a skin conductance sensor, a temperature sensor, a test paper detection sensor, or a hydraulic sensor embedded therein, may sense the state of the user 1403, and may notify the change time of the diaper or underwear or may cool down or heat up the user 1403 according to the sensing result. The diaper or underwear may have an embedded hot wire for heating or an embedded cooling pipe for cooling.

The shoe 1401-8 may include a sensor or a GPS sensor for sensing the weight of the user 1403, the pressures at different parts of the sole, or air contamination, humidity or odor inside the shoe 1401-8. Information gathered by the sensor may be transmitted to the first controller 300 or the hub 200. The hub 200 may transmit information about the correction of the posture of the user 1403, the washing time of the shoe 1401-8, or the replacement time of the shoe 1401-8 to the first controller 300. The first controller 300 may be a smart phone of the user 1403.

The necklace 1401-9 is put on the neck of the user 1403 and may include a sensor for sensing the respiration, pulse or temperature, the volume of activity, consumed calories, GPS, brainwave, voice, ECG or PPG of the user 1403. Information gathered from the sensor may be analyzed in the necklace 1401-9 or may be transmitted to the first controller 300 or the hub 200.

The service provider 1410, 1420, or 1430 may provide a relevant service for the first controller 300 based on information (e.g., sensed information and user information) output from the hub 200.

Figure 20:
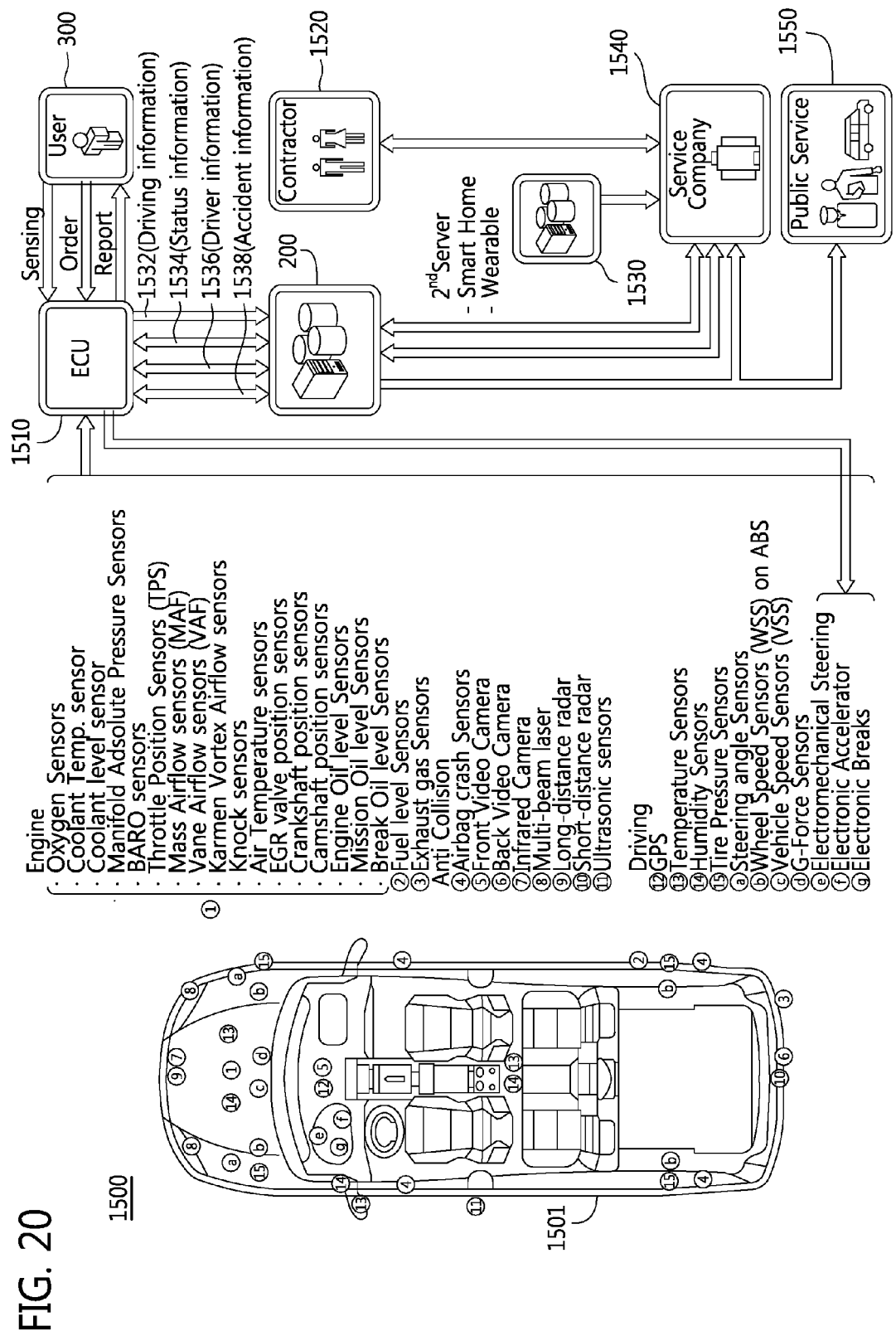
FIG. 20 is a block diagram of an IoT network system according to another exemplary embodiment.

FIG. 20 is a block diagram of an IoT network system 1500 according to another exemplary embodiment. FIG. 20 is a conceptual diagram of the IoT network system 1500 which can be applied to a vehicle. A user may use the first controller 300 paired with the hub 200 to pair each of IoT devices installed in a vehicle with the hub 200. It is assumed that each sensor illustrated in FIG. 20 is an IoT device which can be paired with the hub 200.

The IoT network system 1500 represents a usage scenario of vehicle management, collision prevention, or vehicle driving service. Referring to FIG. 20, the IoT network system 1500 may include a vehicle 1501 including sensors. The IoT network system 1500 may also include an engine control unit (ECU) 1510, the hub 200 functioning as a server, and at least one service provider 1540 and/or 1550.

The sensors may include an engine unit sensor ①, collision prevention sensors ④ through ⑪, and vehicle driving sensors ⑫ through ⑮ and ⓐ through ⓖ. The sensors may also include a fuel level sensor ② and/or an exhaust gas sensor ③.

The ECU 1510 may gather driving information 1532 output from the sensors and may transmit the driving information 1532 to the hub 200 via a communication network. The ECU 1510 and the hub 200 may communicate vehicle status information 1534, driver information 1536, and/or accident information 1538 with each other.

The server of the service company 1540 may provide the first controller 300, as a service, information obtained by analyzing the vehicle 1501 with reference to the vehicle status information 1534, the driver information 1536, and/or the accident information 1538 stored in the hub 200. The service may include information about accidents on the roads, a guide to the fast route, notification of accident handling, accident claim value calculation information, human-error rate estimation information, and/or emergency rescue service.

The server of the service company 1540 may share vehicle-related information stored in the hub 200 with a user who has subscribed to the service. The user may make a contract with the service company 1540 based on the shared information.

The server of the service company 1540 may receive a driver's personal information from a second server 1530 and may activate an access control and service function for the vehicle 1501 of the driver using the personal information. For instance, the server of the service company 1540 may receive NFC tag information stored in a user's wrist watch, compare the NFC tag information with NFC tag information stored in the second server 1530, and unlock the door lock of the vehicle 1501. The server of the service company 1540 or the second server 1530 may transmit the arrival information of the vehicle 1501 to an IoT device installed at the user's home when the vehicle 1501 arrives at the user's home.

A server of the public service provider 1550 may send traffic information to an IoT device of the driver of the vehicle 1501 based on the accident information 1538 stored in the hub 200.

Figure 21:
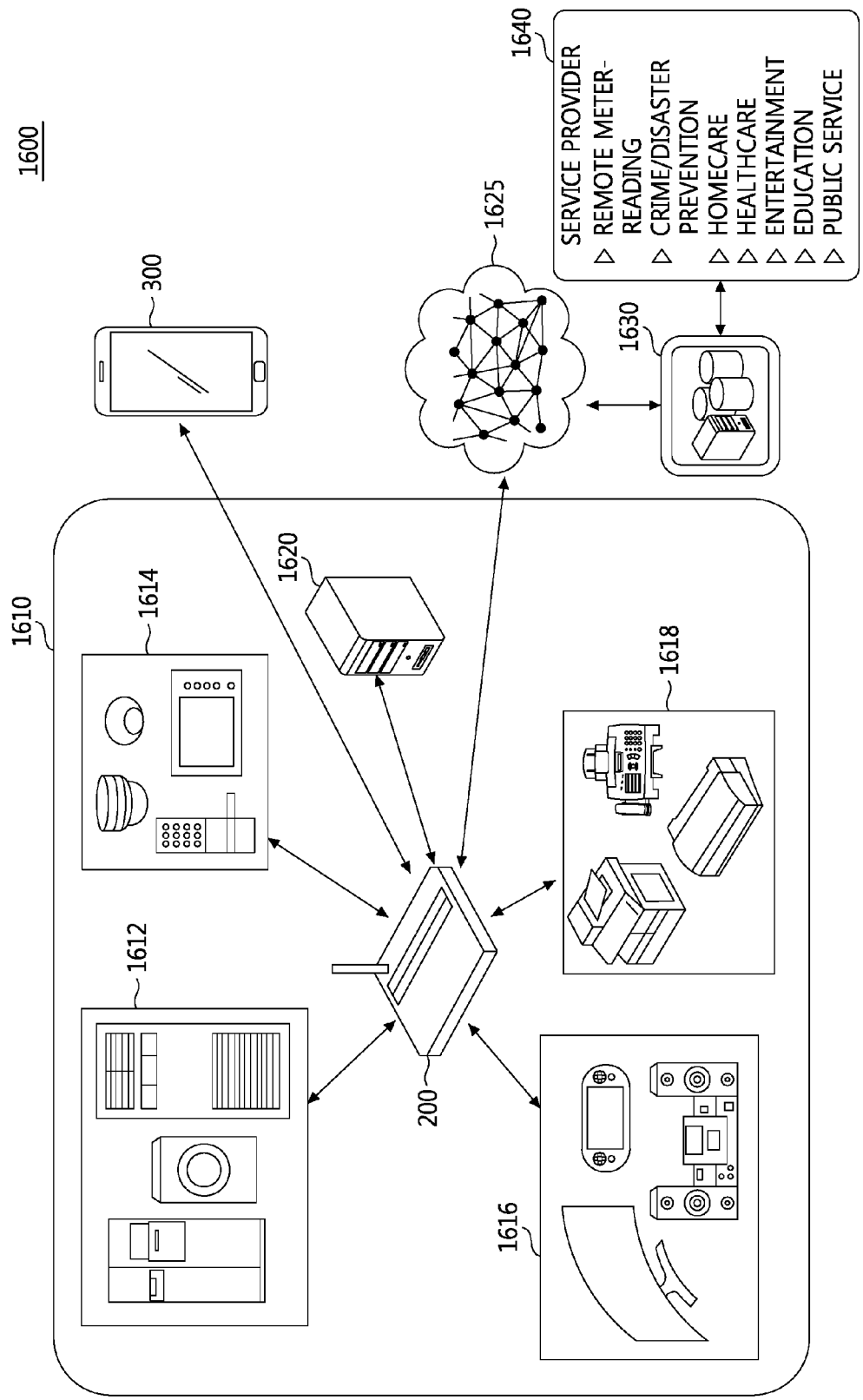
FIG. 21 is a block diagram of an IoT network system according to another exemplary embodiment.

FIG. 21 is a block diagram of an IoT network system 1600 according to another exemplary embodiment. Referring to FIG. 21, the IoT network system 1600 may include the first controller 300 and a home network system 1610 including IoT devices 1612, 1614, 1616, and 1618. The IoT network system 1600 may also include a communication network 1625, a server 1630, and a service provider 1640.

The home network system 1610 may control various kinds of IoT devices in a building (e.g., a house, an apartment, or a high-rise) via a wired/wireless network and may share contents with the IoT devices. The home network system 1610 may include the hub 200, the IoT devices 1612, 1614, 1616, and 1618, and a home server 1620.

The home appliance 1612 may include a smart refrigerator, a smart washing machine, or an air conditioner. The security/safety equipment 1614 may include a door lock, a CCTV, an interphone, a window sensor, a fire detection sensor, or an electric plug. The entertainment equipment 1616 may include a smart TV, an audio unit, a game machine, or a computer. The office equipment 1618 may include a printer, a projector, or a copy machine. Each of the elements 1612, 1614, 1616, and 1618 may be an IoT device and may include at least one of the sensors illustrated in FIG. 12.

Each of the IoT devices 1612, 1614, 1616, and 1618 may communicate with one another through the hub 200. Each of the IoT devices 1612, 1614, 1616, and 1618 may communicate detection data or control information with the hub 200.

The IoT devices 1612, 1614, 1616, and 1618 may communicate with the hub 200 via a communication network. The home network system 1610 may use a sensor network, an M2M network, an internet protocol (IP) based network, or a non-IP based network. The home network system 1610 may be implemented as a home phone line networking alliance (PNA), IEEE1394, a USB, a PLC, Ethernet, infrared data association (IrDA), Bluetooth, Wi-Fi, WLAN, ultra wide band (UWB), ZigBee, wireless 1394, wireless USB, NFC, RFID, or a mobile cellular network.

The IoT devices 1612, 1614, 1616, and 1618 may be connected to the communication network 1625 through the hub 200 which functions as a home gateway. The hub 200 may convert a protocol between the home network system 1610 and the communication network 1625. The hub 200 may convert a protocol among various types of communication networks included in the home network system 1610 and may connect the IoT devices 1612, 1614, 1616, and 1618 with the home server 1620.

The home server 1620 may be installed at home or in an apartment block. The home server 1620 may store or analyze data output from the hub 200. The home server 1620 may provide a service relevant to the analyzed information for at least one of the IoT devices 1612, 1614, 1616, and 1618 or the first controller 300 or may transmit the analyzed information to the communication network 1625 through the hub 200. The home server 1620 may receive and store external contents through the hub 200, may process data, and may provide the processed data for at least one of the IoT devices 1612, 1614, 1616, and 1618 or the first controller 300.

The home server 1620 may store I/O data transmitted from the security/safety equipment 1614 or may provide an automatic security service or power management service for the IoT devices 1612, 1614, 1616, and 1618 based on the I/O data. When each of the IoT devices 1612, 1614, 1616, and 1618 includes a sensor for sensing luminance, humidity, or contamination, the home server 1620 may analyze data output from each IoT devices 1612, 1614, 1616, or 1618 including the sensor and may provide environment control service according the analysis result or send the analysis result to the first controller 300.

The communication network 1625 may include an internet and/or or a public communication network. The public communication network may include a mobile cellular network. The communication network 1625 may be a communication channel which transmits information gathered by the IoT devices 1612, 1614, 1616, and 1618 of the home network system 1610.

The server 1630 may store or analyze the gathered information and may generate service information related with the analysis result or may provide the stored or analyzed information for the service provider 1640 and/or the first controller 300.

The service provider 1640 may analyze gathered information and may provide various services for a user according to the analysis result. The service provider 1640 may provide a service, such as remote meter-reading, crime/disaster prevention, homecare, healthcare, entertainment, education, or civil service, for at least one of the IoT devices 1612, 1614, 1616, and 1618 or the first controller 300 through the home network system 1610.

The service provider 1640 may receive information generated by at least one of the IoT devices 1612, 1614, 1616, and 1618 from the server 1630 and may provide a service of remotely reading information related with an energy resource (such as gas, water, or electricity) based on the received information. The service provider 1640 may receive information generated by at least one of the IoT devices 1612, 1614, 1616, and 1618 from the server 1630, may generate energy resource-related information, indoor environment information, or user status information based on the received information, and may provide the generated information for at least one of the IoT devices 1612, 1614, 1616, and 1618 or the first controller 300.

The service provider 1640 may provide an emergency rescue service for crime/disaster prevention based on security-related information, information about fire outbreak, or safety-related information or may send the information to the first controller 300. The service provider 1640 may also provide entertainment, education or administration service based on information received from at least one of the IoT devices 1612, 1614, 1616, and 1618 and may provide a two-way service through at least one of the IoT devices 1612, 1614, 1616, and 1618.

Figure 22:
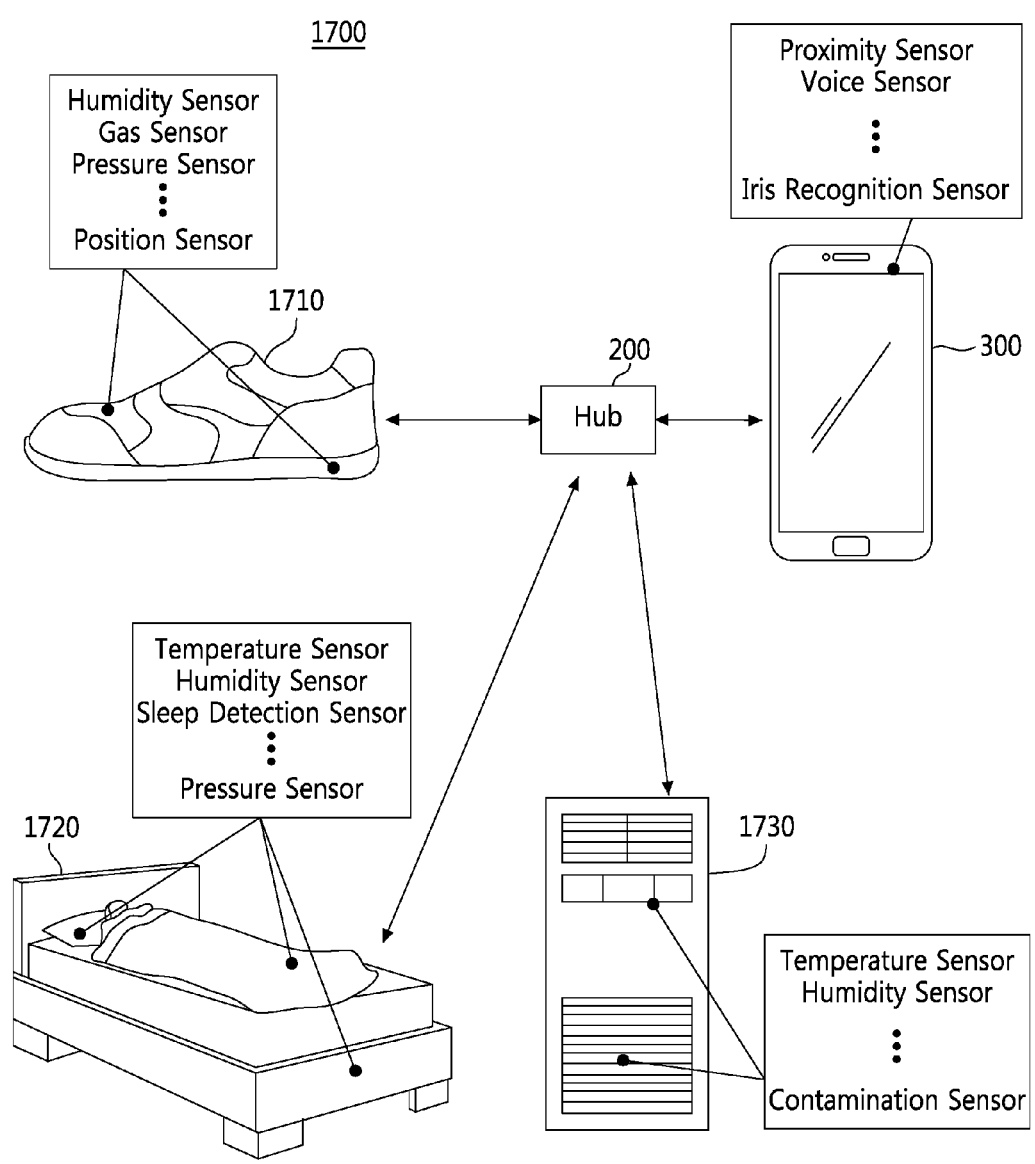
FIG. 22 is a block diagram of an IoT network system according to another exemplary embodiment.

FIG. 22 is a block diagram of an IoT network system 1700 according to another exemplary embodiment. Referring to FIGS. 1 through 7 and FIG. 22, the IoT network system 1700 may form a network among things. The IoT network system 1700 may include the hub 200, the first controller 300, and IoT devices 1710, 1720, and 1730. It is assumed that the IoT devices 1710, 1720, and 1730 are paired with the hub 200 according to the control of the first controller 300 paired with the hub 200. When the pairing is completed, the IoT devices 1710, 1720, and 1730 can communicate data with the hub 200.

The IoT devices 1710, 1720, and 1730 may include the shoe 1710, the bed/bedding 1720, and an electronic appliance such as the air conditioner 1730. The shoe 1710 and the bed/bedding 1720 may include at least one sensor. Each of the IoT devices 1710, 1720, and 1730 may include the elements 410, 430, 450, 470, and 490 included in the IoT device 400 illustrated in FIG. 1. Each of the IoT devices 1710, 1720, and 1730 may include at least one sensor, which may sense information generated in the inside or outside of each IoT devices 1710, 1720, or 1730.

The hub 200 may generate a control signal or a notification signal based on information received from at least one of the IoT devices 1710, 1720, and 1730. The control signal may be a signal for controlling at least one of the IoT devices 1710, 1720, and 1730. The notification signal may be a signal for indicating the state of at least one of the IoT devices 1710, 1720, and 1730.

For instance, the hub 200 may receive sensing information regarding temperature, humidity, or a user's respiration or heart rate form at least one sensor attached to the bed/bedding 1720 and may determine the sleep state or surrounding environment of the user based on the sensing information. The hub 200 may generate a control signal for controlling the operation of the air conditioner 1730 based on the determination result and may send the control signal to the air conditioner 1730. In detail, the hub 200 may send the control signal to the first controller 300, and in response to the control signal, the first controller 300 may transmit a control signal for controlling the air conditioner 1730 to the air conditioner 1730.

In another instance, the hub 200 may generate a notification signal indicating the contamination level of the shoe 1710 or a notification signal indicating the volume of activity or consumed calories of a user of the shoe 1710 based on sensing information regarding humidity, odor, pressure, or position, which has been received from at least one sensor attached to the shoe 1710, and may send the notification signal to the first controller 300.

Figure 23:
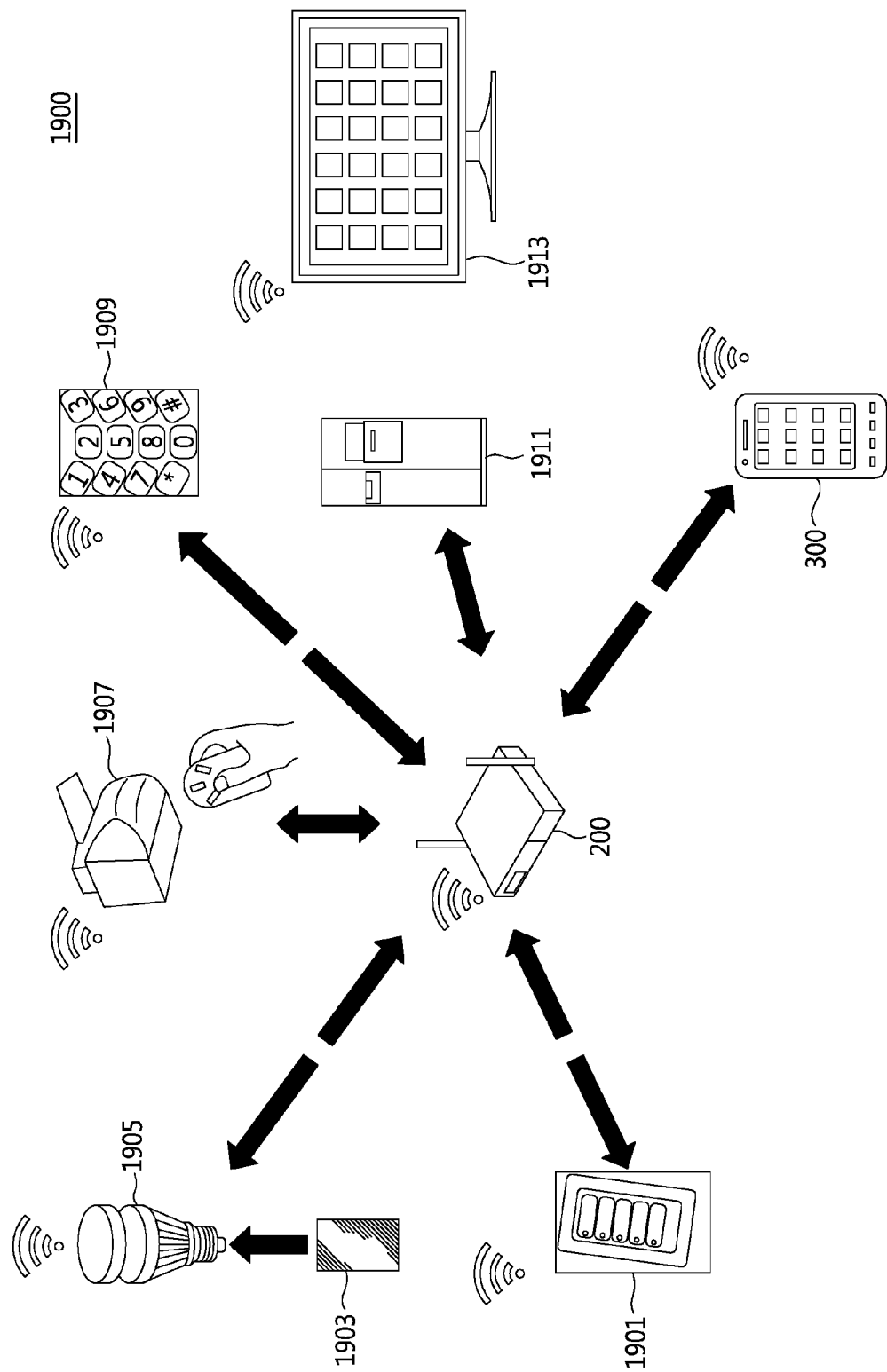
FIG. 23 is a block diagram of an IoT network system according to an exemplary embodiment.

FIG. 23 is a block diagram of an IoT network system 1900 according to an exemplary embodiment. Referring to FIGS. 1 through 7 and FIG. 23, the IoT network system 1900 may be a smart lighting-network system which controls a light emitting device (e.g., a light emitting diode (LED)). The IoT network system 1900 may be formed using various kinds of lighting fixtures and wired/wireless communication devices and may include a sensor, a controller, a communicator, and a software component (e.g., software for network control and maintenance).

The IoT network system 1900 may be used in a closed space defined as an inside of a building, such as home or an office, and in an open space, such as a park or a street, as well. The IoT network system 1900 may be implemented to gather and/or process various kinds of information output from at least one sensor and provide the information to a user or the first controller 300.

An LED lamp 1905 included in the IoT network system 1900 may receive information about a surrounding environment from the hub 200 or the first controller 300 and may control its light based on the information. The LED lamp 1905 may also check and control the operation state of at least one of IoT devices 1901, 1903, 1907, 1909, 1911, and 1913 included in the IoT network system 1900 based on a communication protocol, e.g., a visible light communication protocol, of the LED lamp 1905.

Referring to FIG. 23, the IoT network system 1900 may include the hub 200 which performs the function of a gateway processing data transferred according to different communication protocols, the first controller 300 paired with the hub 200, the LED lamp 1905 which can communicate with the hub 200 and includes a light emitting element, and the IoT devices 1901, 1903, 1907, 1909, 1911, and 1913 which can communicate with the hub 200 according to various kinds of radio communication methods. Each of the IoT devices 1901, 1903, 1907, 1909, 1911, and 1913 may be the IoT device 400 illustrated in FIG. 1 and thus include the elements 410 through 490 of the IoT device 400. The LED lamp 1905 may include a lamp communicator 1903, which may function as the radio transceiver 410.

Each of the IoT devices 1901, 1907, 1909, 1911, and 1913 may include the light switch 1901, the garage door lock 1907, the digital door lock 1909, the refrigerator 1911, and the TV 1913.

In the IoT network system 1900, the LED lamp 1905 may check the operation status of at least one of the IoT devices 1901, 1907, 1909, 1911, and 1913 using a radio communication network or may automatically adjust its own luminance according to a surrounding environment or circumstance. The LED lamp 1905 may also control the operation of at least one of the IoT devices 1901, 1907, 1909, 1911, and 1913 using LED Wi-Fi (LiFi) using visible rays emitted from the LED lamp 1905.

The LED lamp 1905 may automatically adjust its own luminance based on surrounding environment information transmitted from the hub 200 or the first controller 300 through the lamp communicator 1903 or based on surrounding environment information gathered from a sensor attached to the LED lamp 1905. For instance, the brightness of the LED lamp 1905 may be automatically adjusted according to the type of a program on the TV 1913 or the brightness of the screen of the TV 1913. For this operation, the LED lamp 1905 may receive operation information of the TV 1913 through the lamp communicator 1903 wirelessly connected with the hub 200 or the first controller 300. The lamp communicator 1903 may be integrated with a sensor included in the LED lamp 1905 and/or a controller included in the LED lamp 1905 into a module.

When a predetermined period of time elapses after the digital door lock 1909 is locked with no one at home, the LED lamp 1905 can be turned off according to the control of the hub 200 or the first controller 300. As a result, power waste is reduced. When a security mode is set according to the control of the hub 200 or the first controller 300, the LED lamp 1905 is maintained in an on-state even if the digital door lock 1909 is locked with no one at home.

On or off of the LED lamp 1905 may be controlled according to surrounding environment information gathered through sensors included in the IoT network system 1900. The LED lamp 1905 including at least one sensor, a storage device, and the lamp communicator 1903 may keep a building secure or may detect an emergency. For instance, when the LED lamp 1905 includes a sensor for detecting smoke, $CO_2$, or temperature, the LED lamp 1905 may detect fire and output a detection signal through an output unit or send the detection signal to the hub 200 or the first controller 300.

Figure 24:
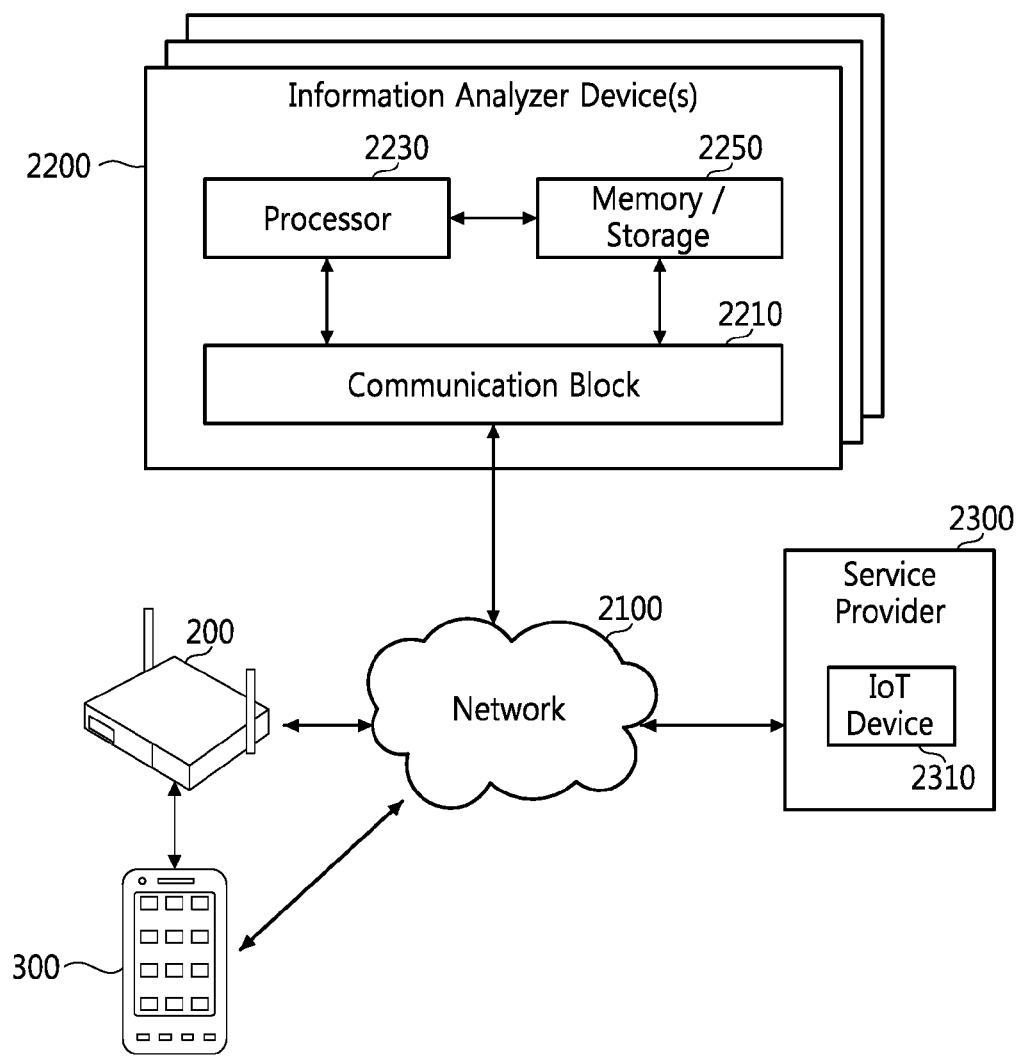
FIG. 24 is a block diagram of an IoT network system according to an exemplary embodiment.

FIG. 24 is a block diagram of an IoT network system 2000A according to an exemplary embodiment. Referring to FIGS. 1 through 7 and FIG. 24, the IoT network system 2000A may be implemented as a service system providing services for users. The IoT network system 2000A may include the hub 200, the first controller 300, a communication network 2100, an information analyzer device 2200, and a service provider 2300.

The first controller 300 may be used by an object who requests at least one service. The user may request a service using the first controller 300 and provided with the service.

The service provider 2300 may be an object which provides a user with services through the first controller 300. The service provider 2300 may provide various services such as medical services, broadcasting services, and education services, but the inventive concept is not restricted thereto.

The service provider 2300 may provide a user with a service using an IoT device 2310. When a service request output from the hub 200 or the first controller 300 is transmitted to the service provider 2300 through the communication network 2100, the service provider 2300 may provide a service corresponding to the service request for the hub 200 or the first controller 300 using the IoT device 2310.

The information analyzer device 2200 may analyze information to provide a service. The information analyzer device 2200 may analyze information necessary to achieve the goal of the service. For instance, when the service provider 2300 provides a location-based service, the information analyzer device 2200 may receive information on a user's current location from the hub 200 or the first controller 300 through the communication network 2100.

The information analyzer device 2200 may include a universal computer such as a PC and/or a dedicated computer such as a workstation. The information analyzer device 2200 may include at least one computing device. For instance, the information analyzer device 2200 may include a communication block 2210, a processor 2230, and a memory/storage 2250.

The communication block 2210 may communicate with the first controller 300 and/or the IoT device 2310 via the communication network 2100. The communication block 2210 may be provided with information and data through the communication network 2100. The processor 2230 may receive and process information and data and output the processing result to provide the service. The memory/storage 2250 may store data that has been processed or will be processed by the processor 2230. The communication block 2210 may transmit the result necessary to provide the service to the first controller 300 through the communication network 2100.

Figure 25:
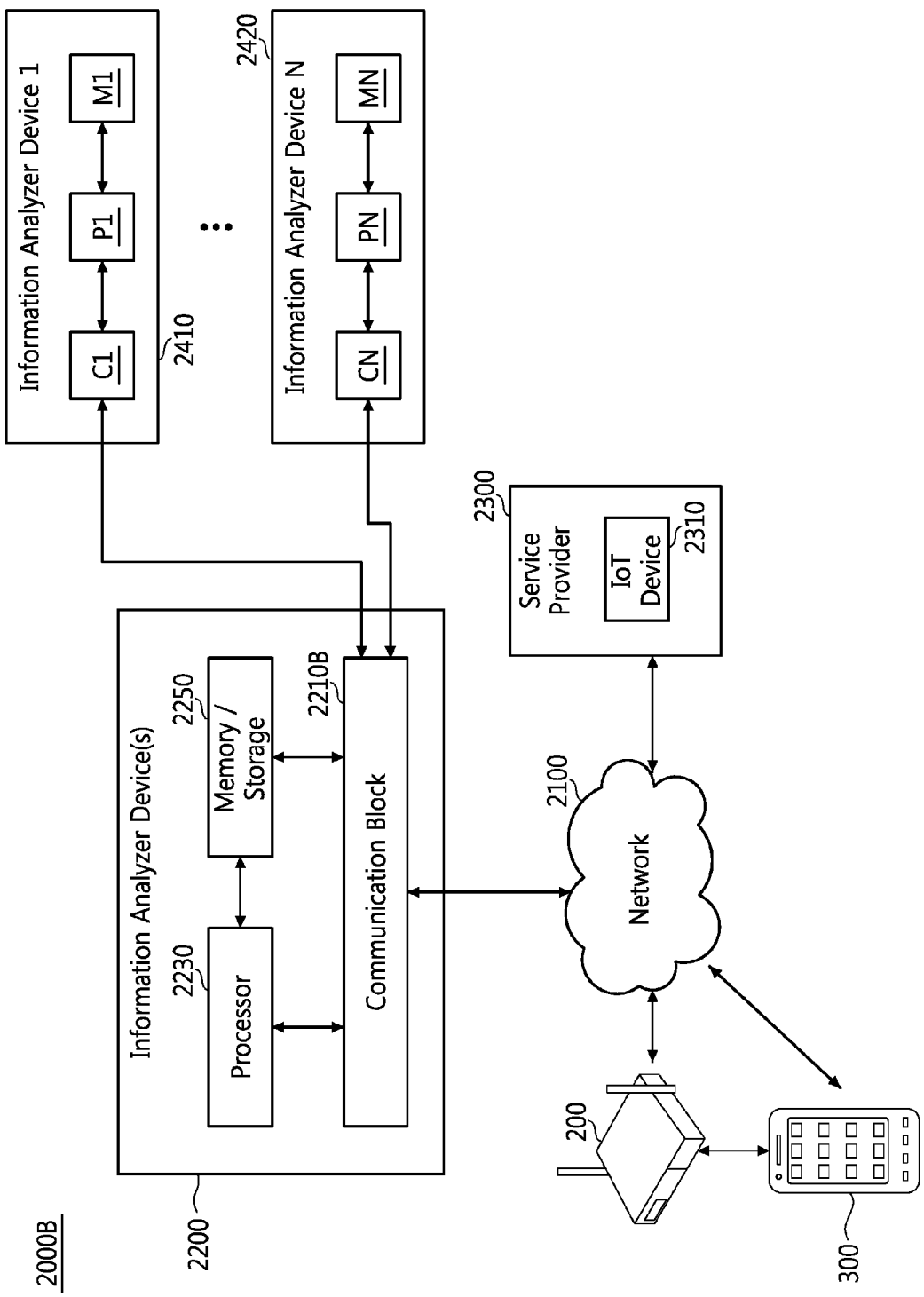
FIG. 25 is a block diagram of an IoT network system according to an exemplary embodiment.

FIG. 25 is a block diagram of an IoT network system 2000B according to an exemplary embodiment. Referring to FIGS. 1 through 7 and FIGS. 24 and 25, the IoT network system 2000B may include the hub 200, the first controller 300, the communication network 2100, the information analyzer device 2200, the service provider 2300, and other information analyzer devices 2410 through 2420. Apart from the other information analyzer devices 2410 through 2420, the IoT network system 2000B illustrated in FIG. 25 is the same as or similar to the IoT network system 2000A illustrated in FIG. 24.

While the IoT network system 2000A illustrated in FIG. 24 includes at least one information analyzer device 2200, the IoT network system 2000B illustrated in FIG. 25 may include the other information analyzer devices 2410 through 2420. The first information analyzer device 2410 may include a communication block C1, a processor P1, and a memory/storage M1, and the N-th information analyzer device 2420 may include a communication block CN, a processor PN, and a memory/storage MN.

The structure and operations of each of the other information analyzer devices 2410 through 2420 may substantially be the same as or similar to those of the information analyzer device 2200 illustrated in FIG. 24. Each of the other information analyzer devices 2410 through 2420 may analyze information necessary to provide a service for a user.

The information analyzer device 2200 may manage the operation of the other information analyzer devices 2410 through 2420. The information analyzer device 2200 may distribute information or data subjected to analysis to the other information analyzer devices 2410 through 2420. Information necessary to provide a service for a user may be processed in the information analyzer devices 2200 and 2410 through 2420 in a distributed manner.

The information analyzer device 2200 may include a communication block 2210B, the processor 2230, and the memory/storage 2250. The information analyzer device 2200 may communicate with the communication blocks C1 through CN of the respective other information analyzer devices 2410 through 2420 through the communication block 2210B. The information analyzer device 2200 may also communicate with other elements 200, 300, and 2310 through the communication block 2210B. The information analyzer device 2200 may manage and schedule the information analyzing and/or processing performed by the other information analyzer devices 2410 through 2420 according to the operations of the processor 2230 and the memory/storage 2250.

As described above, when a method of sharing a key between devices using physical access restriction in an IoT network system according to an exemplary embodiment is used, a session value for pairing is protected from an attack, for instance, carried out to fetch information from a target device using a laser or a voltage difference in hardware. The session value is stored in a secure module or a secure element formed in an IoT device and is transmitted to other IoT devices using NFC for the physical access restriction. Accordingly, the method leads to an increase in security and usability between paired IoT devices. As the security of the IoT devices increases, the security of the IoT network system including the IoT devices also increases.

While not restricted thereto, an exemplary embodiment can be embodied as computer readable code on a non-transitory computer readable recording medium. The non-transitory computer readable recording medium is any data storage device that can store data which can be thereafter read by a computer system. Examples of the non-transitory computer readable recording medium may include read-only memory (ROM), random-access memory (RAM), flash memory, CD-ROMs, magnetic tapes, floppy disks, and optical data storage devices. A program code for executing a method of the exemplary embodiment may be transmitted in carrier waves (such as data transmission through the internet).

The non-transitory computer readable recording medium can also be distributed over network coupled computer systems so that the computer readable code is stored and executed in a distributed manner. Moreover, one or more components or elements of the above-described apparatuses may include a processor or microprocessor executing a computer program stored in a computer-readable medium.

While the inventive concept has been particularly shown and described with reference to exemplary embodiments thereof, it will be understood by those of ordinary skill in the art that various changes in forms and details may be made therein without departing from the spirit and scope of the inventive concept as defined by the appended claims.

What is claimed is:

1. A method of operating a hub used in an internet of things (IoT) network system which includes a first controller and an IoT device, the method comprising:
    performing secure pairing with the first controller using a first communication;
    receiving first information related to the IoT device from the first controller paired with the hub;
    authenticating the first controller using the first information; and
    performing secure pairing with the IoT device using a second communication,
    wherein in response to determining that the first information has been encrypted using a domain key decrypted by the first controller, the authenticating the first controller comprises decrypting the first information using the domain key to generate decrypted information, and
    wherein the performing the secure pairing with the IoT device comprises:
        receiving second information from the IoT device;
        generating and transmitting third information to the IoT device;
        generating a first encryption key using the decrypted information, the second information, and the third information; and
        encrypting the domain key using the first encryption key to generate a second encrypted domain key and transmitting the second encrypted domain key to the IoT device.

2. The method of claim 1, wherein the first communication comprises at least one type of communication among near field communication (NFC) and Wi-Fi communication; and
    the second communication comprises one of a wireless local area network (WLAN), a wireless personal area network (WPAN), a wireless universal serial bus (USB), ZigBee, NFC, radio-frequency identification (RFID), and a mobile cellular network.

3. The method of claim 1, wherein the performing the secure pairing with the first controller comprises:
    transmitting a first secret value of the hub to the first controller;
    receiving fourth information from the first controller;
    generating and transmitting fifth information to the first controller;
    generating a second encryption key using the first secret value, the fourth information, and the fifth information; and
    encrypting the domain key using the second encryption key to generate a first encrypted domain key and transmitting the first encrypted domain key to the first controller.

4. The method of claim 3, further comprising:
    receiving encrypted device information from the first controller; and
    decrypting the encrypted device information using the second encryption key.

5. The method of claim 3, wherein the hub comprises an NFC tag configured to store the first secret value.

6. The method of claim 3, further comprising:
receiving an encrypted first secret value generated using the domain key obtained from decrypting the first encrypted domain key by the first controller; and
changing the first secret value into the encrypted first secret value.

7. The method of claim 6, further comprising:
transmitting the encrypted first secret value to a second controller;
transmitting a second decryption request to the first controller in response to a first decryption request output from the second controller;
decrypting the encrypted first secret value using the domain key in response to an approval signal output from the first controller; and
transmitting the decrypted first secret value to the second controller.

8. The method of claim 7, wherein the encrypted first secret value is transmitted to the second controller using the first communication.

9. The method of claim 1, further comprising:
receiving encrypted IoT device information from the IoT device; and
decrypting the encrypted IoT device information using the first encryption key.

* * * * *